(12) United States Patent
Yun et al.

(10) Patent No.: US 10,040,998 B2
(45) Date of Patent: *Aug. 7, 2018

(54) LIQUID CRYSTAL COMPOSITION AND APPLICATION THEREOF

(71) Applicant: SHIJIAZHUANG CHENGZHI YONGHUA DISPLAY MATERIALS CO., LTD., Hebei (CN)

(72) Inventors: Guoliang Yun, Hebei (CN); Yunxia Qiao, Hebei (CN); Ruimao Hua, Hebei (CN); Xing Zhang, Hebei (CN); Ming Li, Hebei (CN); Jin Wang, Hebei (CN); Yajie Duan, Hebei (CN); Hongmei Cui, Hebei (CN); Yamin Li, Hebei (CN); Jingyi Feng, Hebei (CN)

(73) Assignee: Shijiazhuang Chengzhi Yonghua Display Materials Co., Ltd., Shijiazhuang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/035,203

(22) PCT Filed: Nov. 15, 2013

(86) PCT No.: PCT/CN2013/001396
§ 371 (c)(1),
(2) Date: May 6, 2016

(87) PCT Pub. No.: WO2015/066833
PCT Pub. Date: May 14, 2015

(65) Prior Publication Data
US 2016/0326435 A1 Nov. 10, 2016

(30) Foreign Application Priority Data

Nov. 7, 2013 (CN) .......................... 2013 1 0549222

(51) Int. Cl.
*G02F 1/1333* (2006.01)
*C09K 19/34* (2006.01)
*C09K 19/20* (2006.01)
*C09K 19/30* (2006.01)
*C09K 19/42* (2006.01)
*C09K 19/02* (2006.01)
(Continued)

(52) U.S. Cl.
CPC ...... *C09K 19/3402* (2013.01); *C09K 19/0208* (2013.01); *C09K 19/20* (2013.01); *C09K 19/30* (2013.01); *C09K 19/3066* (2013.01); *C09K 19/3068* (2013.01); *C09K 19/42* (2013.01); *G02F 1/1362* (2013.01); *C09K 2019/0466* (2013.01); *C09K 2019/3078* (2013.01); *C09K 2019/3096* (2013.01); *C09K 2019/3422* (2013.01)

(58) Field of Classification Search
CPC .... C09K 19/3402; C09K 19/20; C09K 19/30; C09K 19/3066; C09K 19/42; C09K 19/3068; C09K 19/0208; C09K 2019/0466; C09K 2019/3096; C09K 2019/3422; C09K 2019/3078; G02F 1/1333; G02F 1/1362
USPC ....................................... 252/299.61; 428/1.1
See application file for complete search history.

(56) References Cited

U.S. PATENT DOCUMENTS 9,028,714 B2 * 5/2015 Xu ..................... C09K 19/3402
                                                    252/299.61
9,458,381 B2 * 10/2016 Hou ................... C09K 19/3402
(Continued)

FOREIGN PATENT DOCUMENTS

CN          1628165 A       6/2005
CN         103254903 A      8/2013
(Continued)

OTHER PUBLICATIONS

ISA State Intellectual Property Office of the People's Republic of China, International Search Report Issued in Application No. PCT/CN2013/001396, dated Jun. 10, 2014, WIPO, 4 pages.

*Primary Examiner* — Geraldina Visconti
(74) *Attorney, Agent, or Firm* — McCoy Russell LLP

(57) ABSTRACT

Disclosed is a liquid crystal composition and use thereof. The liquid crystal composition comprises components a, b and c; wherein component a is selected from one of the compounds represented by formula I; component b is a liquid crystal composition having a dielectric anisotropy of greater than 3; and component c is a liquid crystal composition having a dielectric anisotropy of −3 to 3. The liquid crystal composition has a high contrast ratio property, and has a low change rate at a low temperature, that is, the decrease of contrast ratio at a low temperature (such as −20° C.) is smaller as compared to a normal temperature. The composition has suitable properties with regard to practical applications, including a broader nematic phase range, an appropriate dielectric anisotropy, optical anisotropy and operating voltage, an excellent response time, a high electrical resistivity and voltage holding ratio, a low rotary viscosity, etc.

Formula I

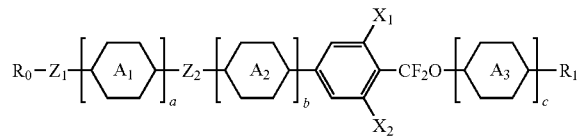

16 Claims, No Drawings

(51) Int. Cl.
*G02F 1/1362* (2006.01)
*C09K 19/04* (2006.01)

(56) References Cited

U.S. PATENT DOCUMENTS 9,481,828 B2 * 11/2016 Yun .................. C07D 309/06
2006/0204674 A1   9/2006 Heckmeier et al.

FOREIGN PATENT DOCUMENTS

| CN | 103254912 A | 8/2013 |
| CN | 103555348 A | 2/2014 |

* cited by examiner

LIQUID CRYSTAL COMPOSITION AND APPLICATION THEREOF

CROSS REFERENCE TO RELATED APPLICATIONS

The present application is a U.S. National Phase of International Patent Application Serial No. PCT/CN2013/001396, entitled "LIQUID CRYSTAL COMPOSITION AND APPLICATION THEREOF," filed on Nov. 15, 2013, which claims priority to Chinese Patent Application No. 201310549222.4, entitled "LIQUID CRYSTAL COMPOSITION AND APPLICATION THEREOF," filed on Nov. 7, 2013, the entire contents of each of which are hereby incorporated by reference for all purposes.

TECHNICAL FIELD

The present invention relates to a liquid crystal composition and the use thereof.

BACKGROUND ART

At present, the range of application of liquid crystal compounds is expanded wider and wider, and liquid crystal compounds can be used in various types of displays, electro-optical devices, sensors, etc. There are a great variety of liquid crystal compounds used in the above-mentioned display field, wherein nematic liquid crystals are used most extensively. Nematic liquid crystals have been used in passive TN and STN matrix displays and systems having a TFT active matrix.

As for the application field of the thin film transistor techniques (TFT-LCD), although the market in recent years has been very huge and techniques also become mature gradually, requirements on display techniques continuously increase as well, especially in aspects of achieving a quick response, reducing the driving voltage to reduce the power consumption, etc. Liquid crystal materials, as one of important optoelectronic materials for liquid crystal displays, play an important role in improving the performance of a liquid crystal display.

As liquid crystal materials, they need to have good chemical and thermal stability and stability with respect to electric fields and electromagnetic radiations. Moreover, as liquid crystal materials used for thin film transistor techniques (TFT-LCD), they not only need to have the stabilities as mentioned above, but also should have properties, such as a broader nematic phase temperature range, a suitable birefringence anisotropy, a very high electrical resistivity, a good anti-ultraviolet property, a high charge retention rate, a low vapor pressure, etc.

As for the application of dynamic picture displays, elimination of ghosting and trailing of display pictures the liquid crystal is required to have a very fast response speed, and therefore the liquid crystal is required to have a lower rotary viscosity $\gamma_1$; in addition, in order to reduce the equipment energy consumption, the driving voltage of a liquid crystal is desired to be as low as possible.

In order to achieve a high quality display, a high contrast ratio is another important performance parameter of a liquid crystal display, and the contrast ratio is in fact a specific value of luminance, defined as: the luminance of a white picture (when at the brightest) divided by the luminance of a black picture (when at the darkest) in a dark room. More accurately, the contrast ratio is namely a numerical value obtained by, from the saturations when the white signal is at 100%, subtracting that at 0% and then dividing same by the white value (the white signal at 0% is actually black) at 0% with Lux (illuminance, i.e., lx, the lumen value per square meter) as the unit of measurement. Contrast ratio is a value by dividing the blackest luminance unit by the whitest luminance unit. Therefore, the brighter the white color and the darker the black color, the higher the contrast ratio. Contrast ratio is an important parameter of a liquid crystal display, and under a reasonable luminance value, the higher the contrast ratio, the more abundant the color gradation displayed thereby.

With regard to these displays, a new liquid crystal composition with improved performance is required. A high contrast ratio is a property that such a mixture must have. In addition, such a mixture should further have an appropriate dielectric anisotropy (Δε), an optical anisotropy (Δn) and a threshold voltage.

Therefore, there is a need for a new liquid crystal composition having suitable properties with regard to practical applications, such as a broader nematic phase range, an appropriate dielectric anisotropy (Δε), optical anisotropy (Δn) and operating voltage, a low rotary viscosity, and in addition, having a high contrast ratio property, especially where the contrast ratio has a low change rate at a low temperature.

SUMMARY OF THE INVENTION

The objects of the invention are providing a liquid crystal composition and the use thereof.

The liquid crystal composition provided by the present invention comprises components A, B and C;
wherein said component A is selected from at least one of compounds as represented by formula I;
said component B is a liquid crystal composition having a dielectric anisotropy of greater than 3; and
said component C is a liquid crystal composition having a dielectric anisotropy of −3 to 3;

Formula I

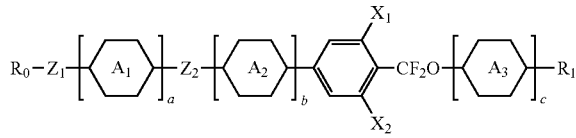

in said formula I, $R_0$ is selected from any one of an H atom, C1-C10 alkyls, fluoro-substituted C1-C10 alkyls, C1-C10 alkoxys, fluoro-substituted C1-C10 alkoxys, C2-C10 alkenyls, fluoro-substituted C2-C10 alkenyls, C3-C8 alkenoxys, fluoro-substituted C3-C8 alkenoxys, cyclopentyl, cyclobutyl, cyclohexyl, and cycloheptyl;

$R_1$ is selected from the following groups a, b or c:
a. groups selected from any one of H, Cl, F, —CN, —OCN, —OCF₃, —CF₃, —CHF₂, —CH₂F, —OCHF₂, —SCN, —NCS, —SF₅, C1-C15 alkyls, C1-C15 alkoxys, C2-C15 alkenyls, or C2-C15 alkenoxys;
b. groups obtained by substitution of at least one —CH₂— in said group a by at least one of the following groups without oxygen atoms being directly connected: —CH=CH—, —COO—, —OOC—, cyclobutyl, cyclopentyl, —O—, and —S—; and
c. groups obtained by substitution of at least one hydrogen in said group a by fluorine or chlorine;

$X_1$ and $X_2$, which are identical or different, are each selected from either of atoms H and fluorine;

$Z_1$ and $Z_2$, which are identical or different, are each selected from at least one of single bonds, —$CH_2$—$CH_2$—, —$(CH_2)_4$—, —CH=CH—, —COO—, —OOC—, —$CF_2O$—, —$OCH_2$—, —$CH_2O$—, —$OCF_2$—, —$CF_2CH_2$—, —$CH_2CF_2$—, —$C_2F_4$—, and —CF=CF—;

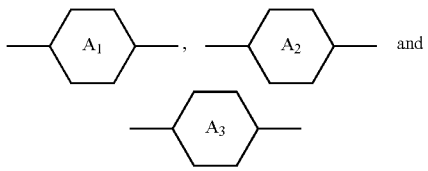

is each selected from at least one of single bonds, and the following groups:

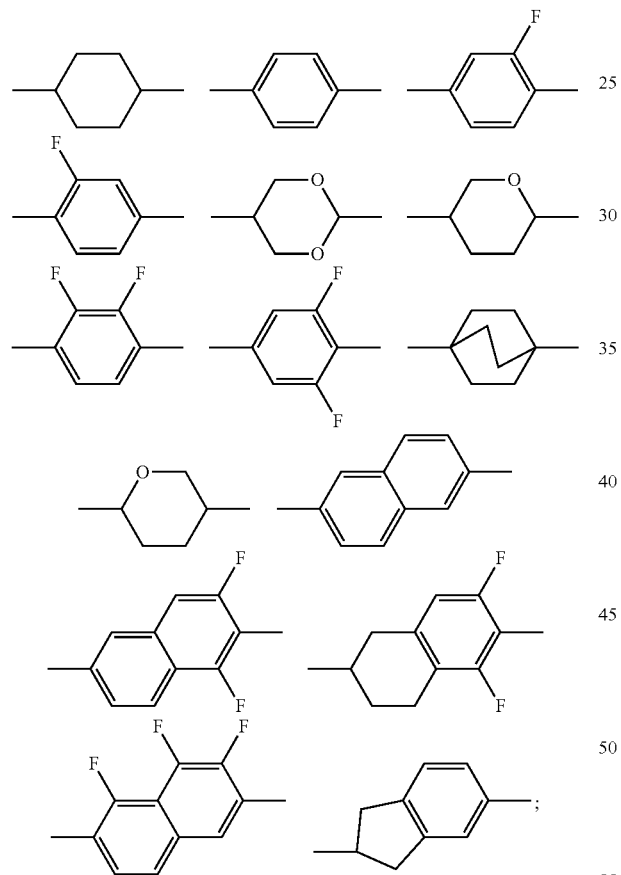

both a and b are an integer selected from 0-3; and
c is 1 or 2, and a+b+c≤5.

The above-mentioned liquid crystal composition may also only consist of components A, B and C.

The mass ratio of said components A to B to C is 10-70:2-70:5-70, particularly 10-69:2-70:5-70, 15-39:15-61:10-48, 20-35:23-59:21-41, or 30-69:35-61:34-50;

in the above-mentioned formula I, said C1-C10 alkyl is particularly selected from at least one of C2-C10 alkyls, C3-C10 alkyls, C4-C10 alkyls, C5-C10 alkyls, C6-C10 alkyls, C1-C6 alkyls, C2-C6 alkyls, C3-C6 alkyls, C4-C6 alkyls, C5-C6 alkyls, C1-C5 alkyls, C2-C5 alkyls, C3-C5 alkyls, C4-C5 alkyls, C1-C4 alkyls, C2-C4 alkyls, C3-C4 alkyls, C1-C3 alkyls, C1-C2 alkyls, and C2-C3 alkyls;

said C1-C10 alkoxy is particularly selected from at least one of C2-C10 alkoxys, C3-C10 alkoxys, C4-C10 alkoxys, C5-C10 alkoxys, C6-C10 alkoxys, C1-C6 alkoxys, C2-C6 alkoxys, C3-C6 alkoxys, C4-C6 alkoxys, C5-C6 alkoxys, C1-05 alkoxys, C2-C5 alkoxys, C3-C5 alkoxys, C4-C5 alkoxys, C1-C4 alkoxys, C2-C4 alkoxys, C3-C4 alkoxys, C1-C3 alkoxys, C1-C2 alkoxys, and C2-C3 alkoxys;

said C2-C10 alkenyl is particularly selected from at least one of C2-C6 alkenyls, C3-C6 alkenyls, C4-C6 alkenyls, C5-C6 alkenyls, C3-C5 alkenyls, C4-C5 alkenyls, C3-C4 alkenyls, C3-C10 alkenyls, C2-C8 alkenyls, and C2-C3 alkenyls; and said C3-C8 alkenoxy is particularly selected from at least one of alkenoxys of C3-C6 alkenoxys, C4-C6 alkenoxys, C5-C6 alkenoxys, C3-05 alkenoxys, C4-05 alkenoxys, C3-C4 alkenoxys, and C3-C8 alkenoxys;

said compound as represented by the formula I is any one of compounds as represented by I1-I37 as below:

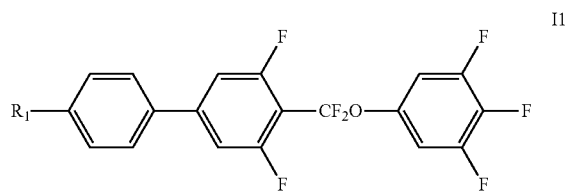

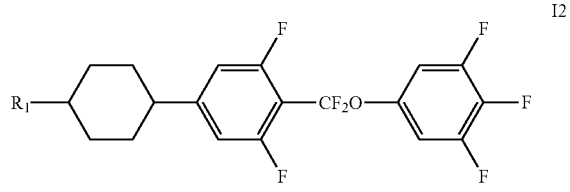

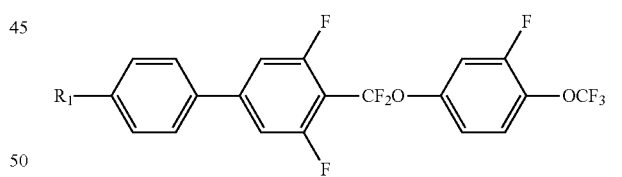

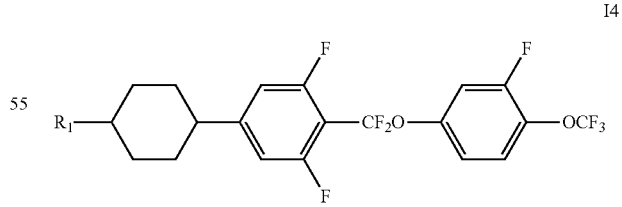

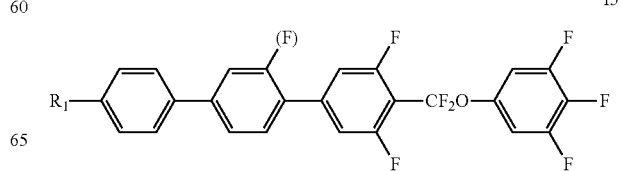

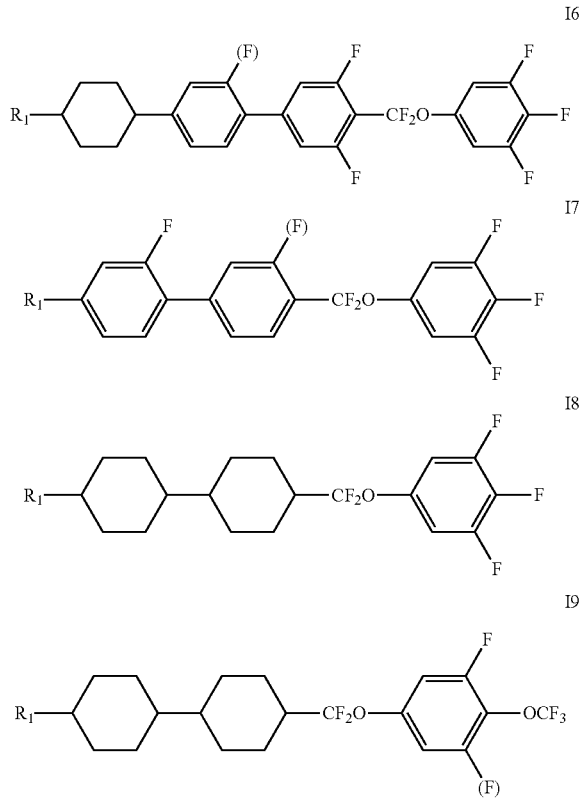
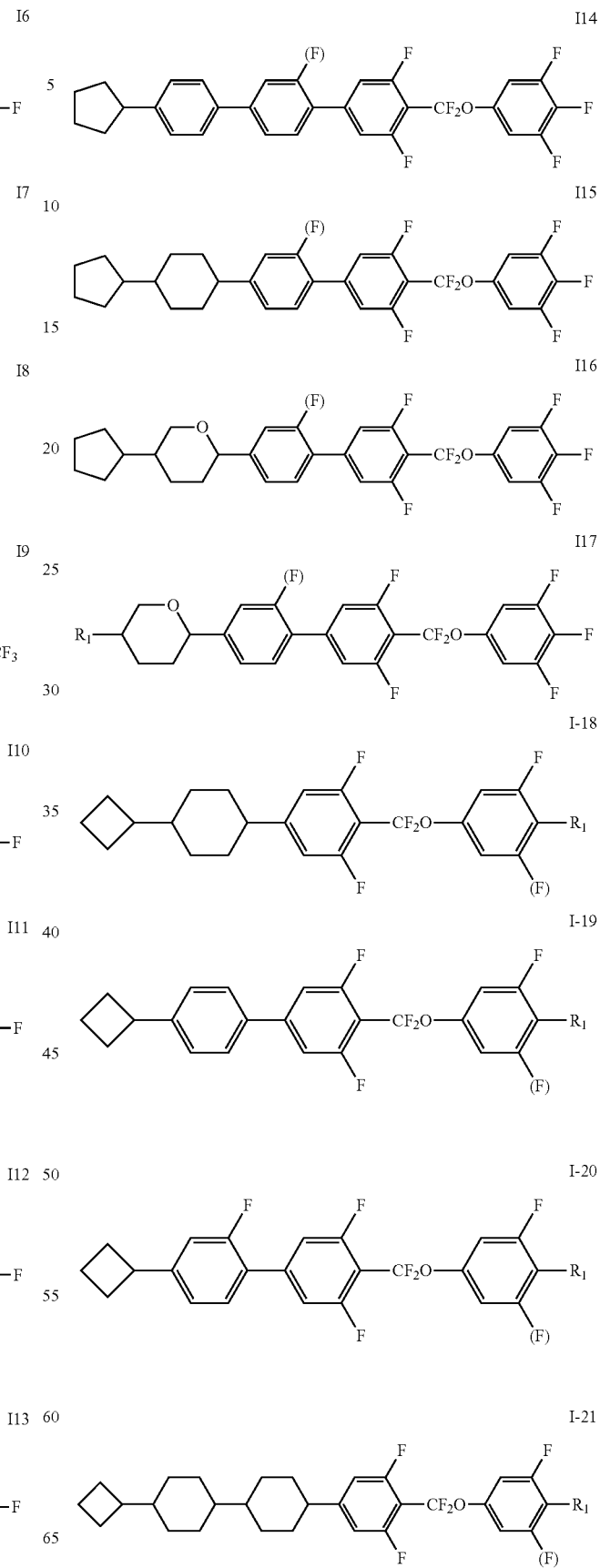

I-22
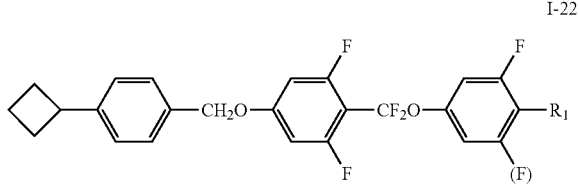
I-23
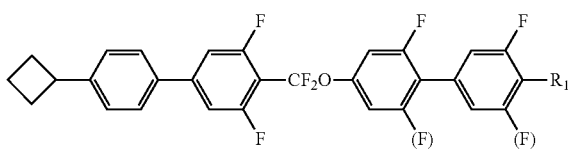
I-24
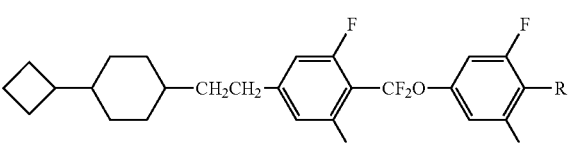
I-25
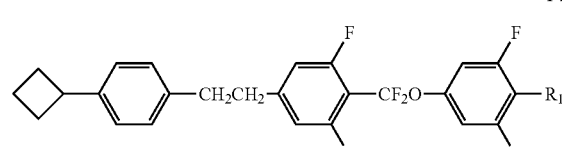
I-26
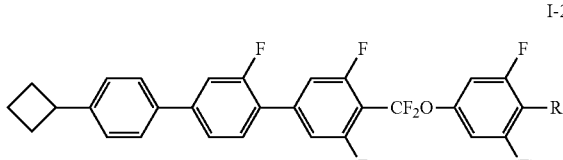
I-27
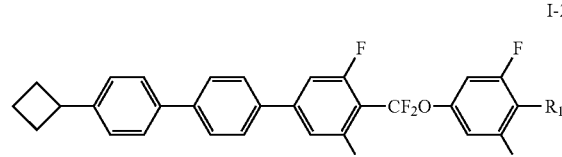
I-28
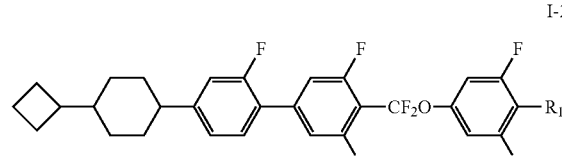
I-29
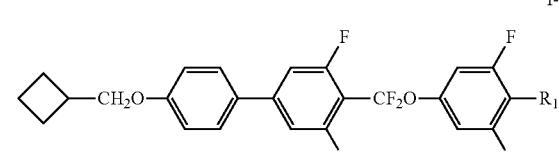
I-30
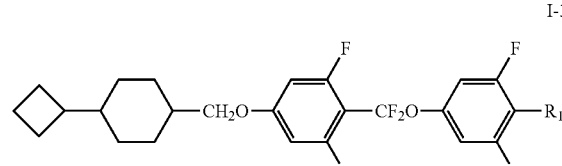
I-31
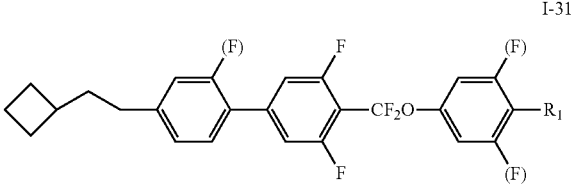
I-32
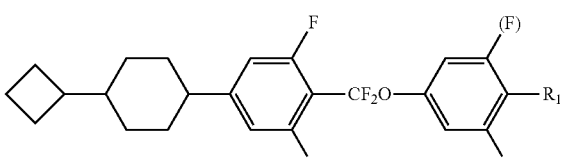
I-33
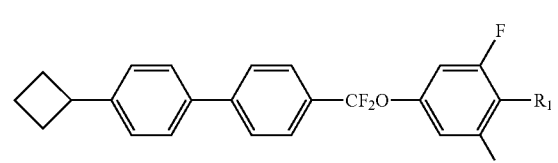
I-34
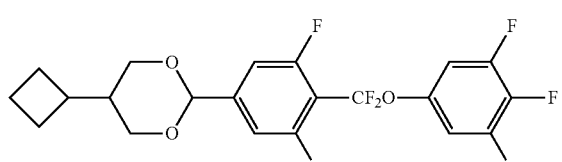
I-35
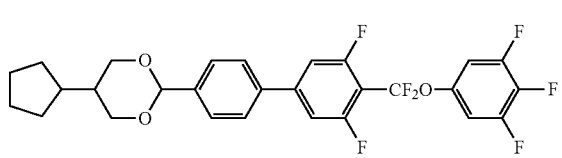
I-36
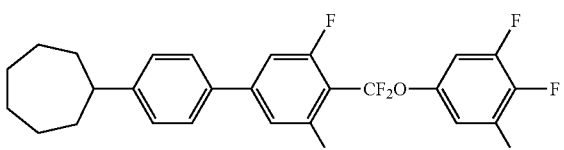
I-37
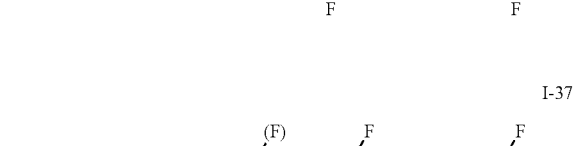
in said formulas I1-I37, the definition of $R_1$ is the same as that of the $R_1$ in formula I; and —(F) represents —F or —H;
said component B is selected from at least one of compounds as represented by formula II:

Formula II

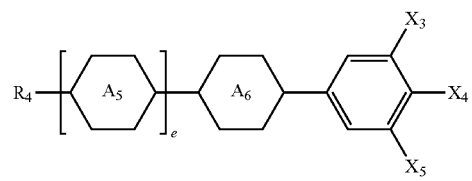

in said formula II, the definition of R$_4$ is the same as that of the R$_0$;

the definitions of

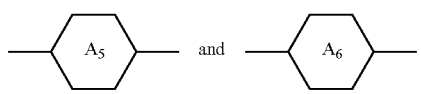 and 

are the same as that of

;

the definitions of X$_3$ and X$_5$ are the same as that of X$_1$;
the definition of X$_4$ is the same as that of R$_1$; and
e is an integer of 0-3;
said compound as represented by the formula II is particularly any one of compounds as represented by formulas II-1 to II-13 as below:

II-1
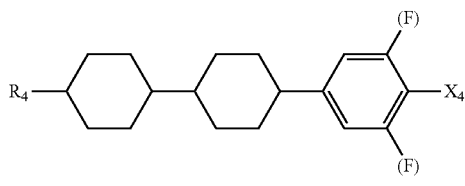

II-2
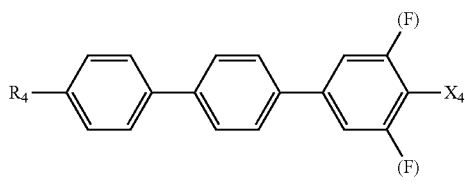

II-3
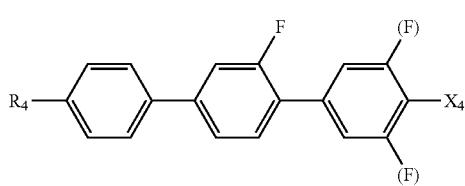

II-4
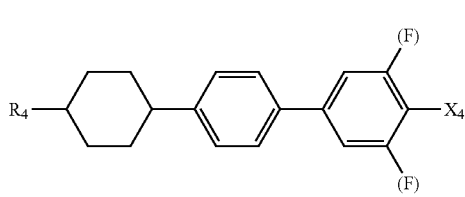

II-5
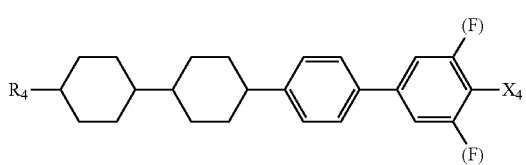

II-6
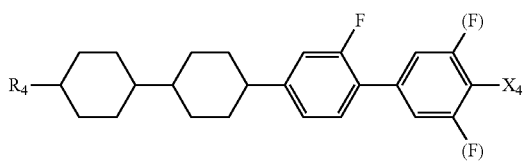

II-7
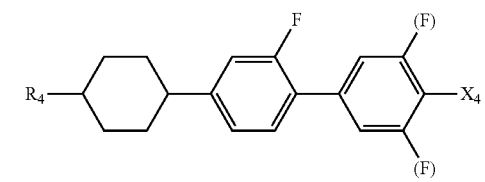

II-8
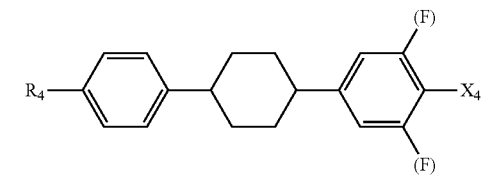

II-9
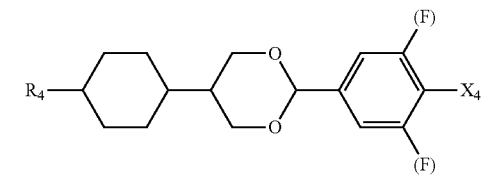

II-10
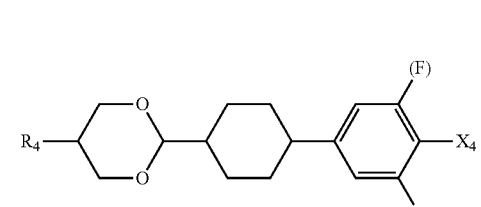

II-11
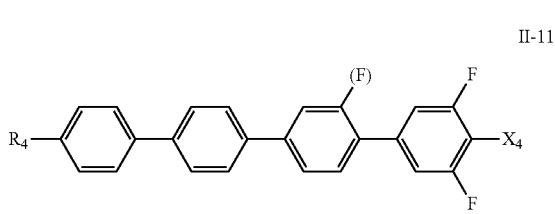

II-12
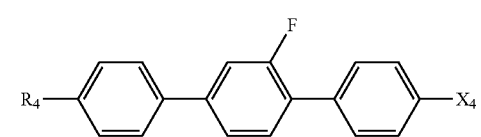

-continued

II-13

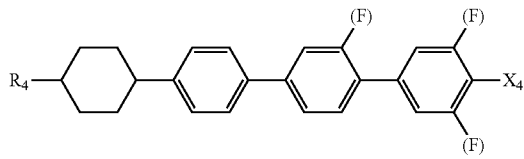

in said formulas II-1 to II-13, the definitions of $R_4$ and $X_4$ are respectively the same as those of the $R_4$ and $X_4$ in said formula II;

—(F) represents —F or —H;

said component C is selected from at least one of compounds as represented by formula III:

Formula III

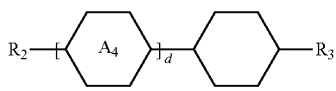

in said formula III, the definitions of $R_2$ and $R_3$ are the same as that of the $R_0$ in formula I;

the definition of

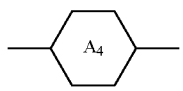

is the same as that of

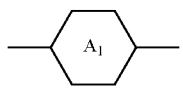

in formula I;

d is an integer of 0-3; and said compound as represented by the formula III is particularly any one of compounds as represented by formulas III-1 to III-10 as below:

III-1

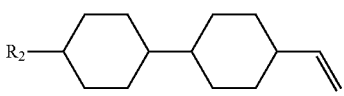

III-2

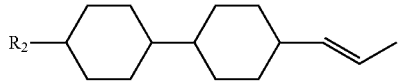

III-3

III-4

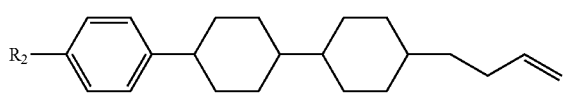

-continued

III-5

III-6

III-7

III-8

III-9

III-10 in said formulas III-1 to III-10, the definitions of $R_2$ and $R_3$ are both the same as that of the $R_0$ in formula I; and —(F) represents —F or —H.

Said liquid crystal composition further comprises at least one of compounds as represented by formulas IV and V;

Formula IV

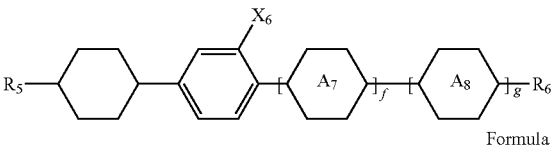

Formula V

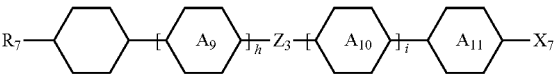

in said formulas IV and V, the definitions of $R_5$ and $R_6$ are the same as that of the $R_0$ in formula I;

the definition of $R_7$ is the same as that of the $R_1$ in formula I;

the definitions of

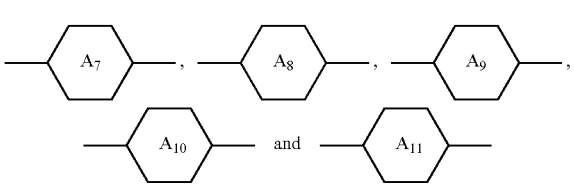

are all the same as that of

in formula I;

Z$_3$ is selected from any least one of —CH$_2$—CH$_2$—, —CH=CH—, —COO—, —OOC—, —OCH$_2$—, —CH$_2$O—, —CF$_2$CH$_2$—, —CH$_2$CF$_2$—, —C$_2$F$_4$—, and —CF=CF—;

the definition of X$_6$ is the same as that of the X$_1$ in formula I;

the definition of X$_7$ is the same as that of the X$_4$ in formula I; and f, g, h, and i are all integers of 0-3;

The mass ratio of said compound as represented by the formula IV to said compound as represented by the formula V is 0-30:0-40, particularly 3-4:3-10, 3-4:4-9, or 3-4:5-10; and The mass ratio of said compound as represented by the formula IV to the compound as represented by the formula III is 0-30:5-70, particularly 3-4:5-70, 3-4:12-61, 3-4:23-56, 3-4:35-48, or 3-4:15-59; and neither the mass of the compound as represented by formula IV nor that of the compound as represented by formula V is 0.

Said compound as represented by the formula IV is particularly any one of compounds as represented by formulas IV-1 to IV-5 as below:

IV-1
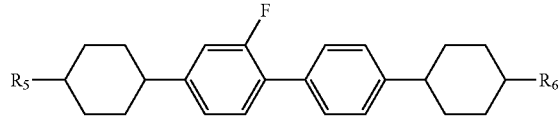

IV-2
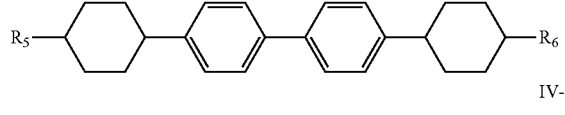

IV-3
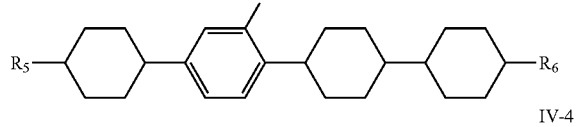

IV-4
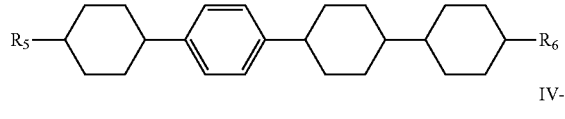

IV-5
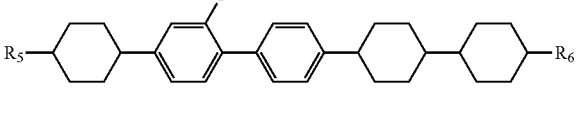

in said formulas IV-1 to IV-5, the definitions of R$_5$ and R$_6$ are both the same as that of the R$_0$ in formula I; and —(F) represents —F or —H; and said compound as represented by the formula V is particularly any one of compounds as represented by formulas V-1 to V-17 as below:

V-1
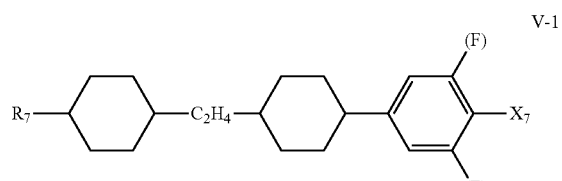

V-2
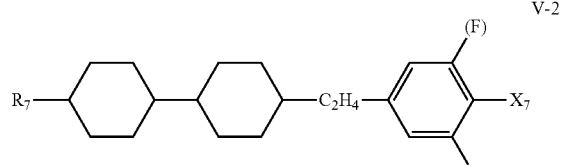

V-3
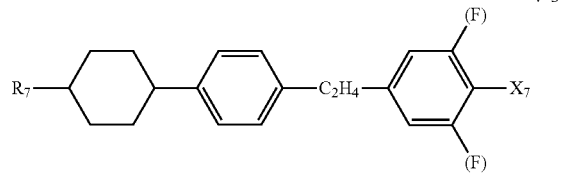

V-4
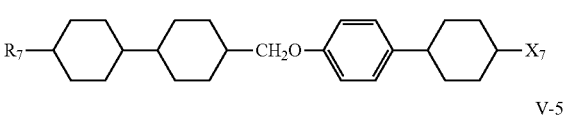

V-5
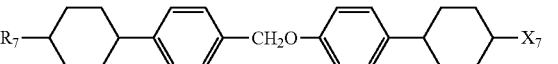

V-6
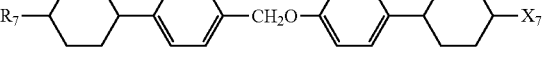

V-7
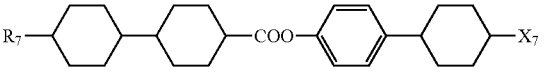

V-8
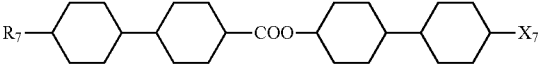

V-9
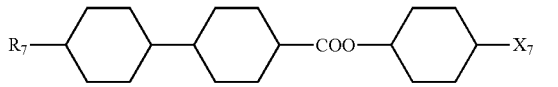

V-10
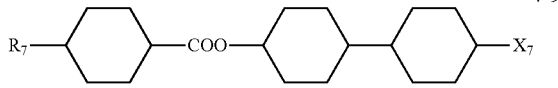

V-11
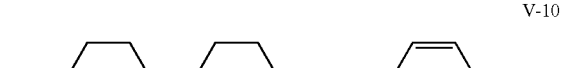

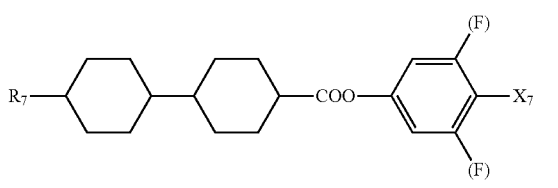

-continued

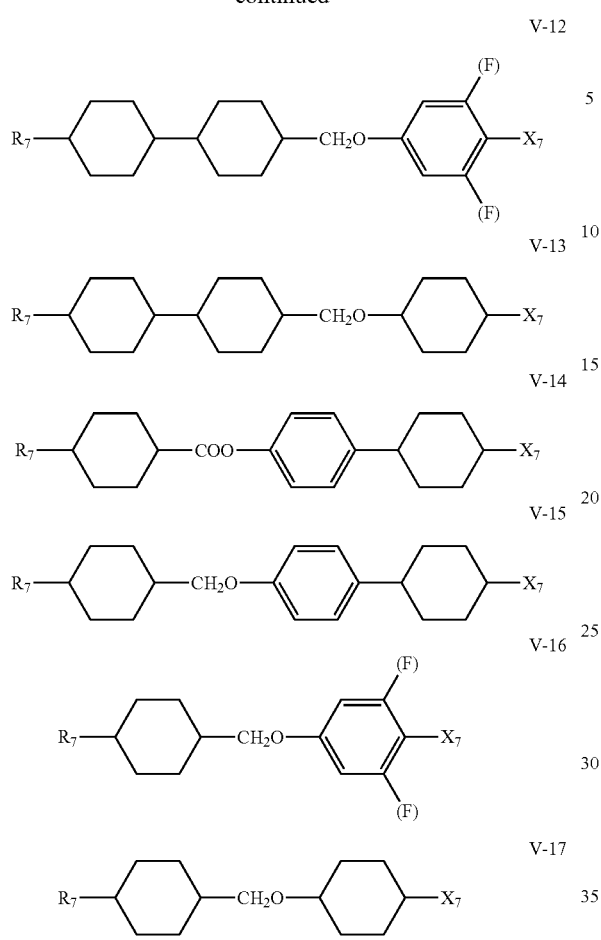

the definition of R₇ is the same as that of the R₁ in formula I; and

—(F) represents —F or —H.

Said liquid crystal composition may also be composed of the compounds as represented by formulas I to V, particularly, composed of the compounds as represented by formulas I to V in a mass ratio of 10-70:10-70:5-70:0-30:0-40, wherein neither the mass of the compound as represented by formula IV nor that of the compound as represented by formula V is 0; and more particularly, composed of the compounds as represented by formulas I to V in a mass ratio of 10-69:2-70:5-70:3-4:3-10, 15-39:15-61:10-48:3-4:3-10, 20-35:23-59:21-41:3-4:3-10, or 30-69:35-61:34-50:3-4:3-10;

said liquid crystal composition further comprises a chiral agent;

said chiral agent is any one of the following compounds:

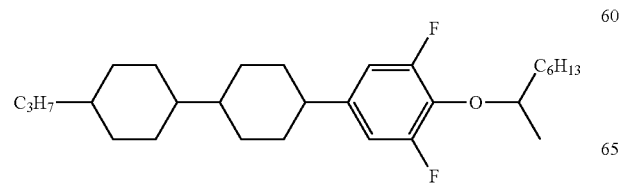

-continued

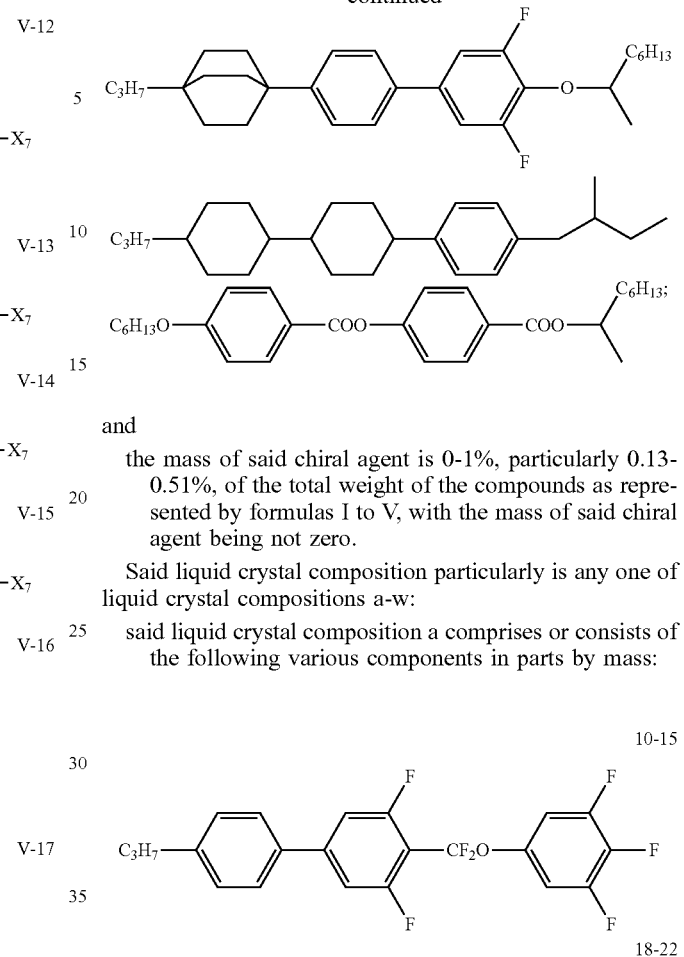

and the mass of said chiral agent is 0-1%, particularly 0.13-0.51%, of the total weight of the compounds as represented by formulas I to V, with the mass of said chiral agent being not zero.

Said liquid crystal composition particularly is any one of liquid crystal compositions a-w:

said liquid crystal composition a comprises or consists of the following various components in parts by mass:

-continued
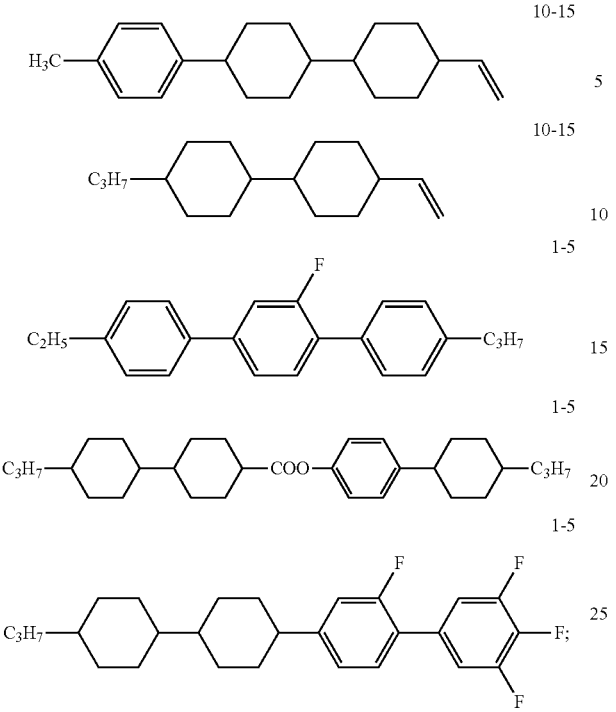
said liquid crystal composition a particularly comprises or consists of the following various components in parts by mass:
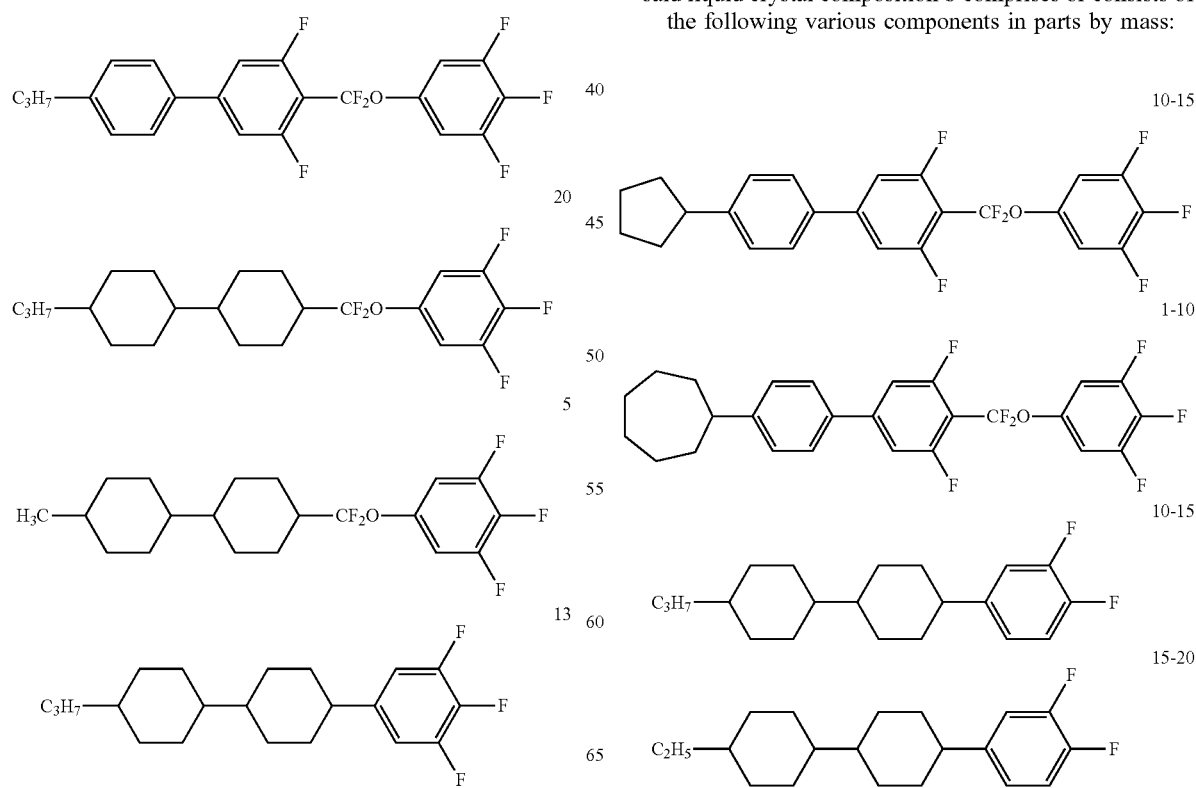
-continued
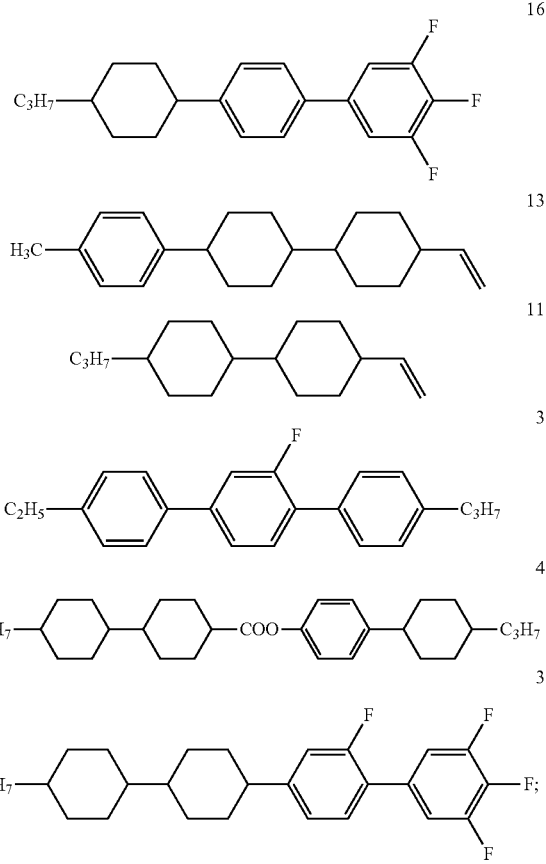
said liquid crystal composition b comprises or consists of the following various components in parts by mass:

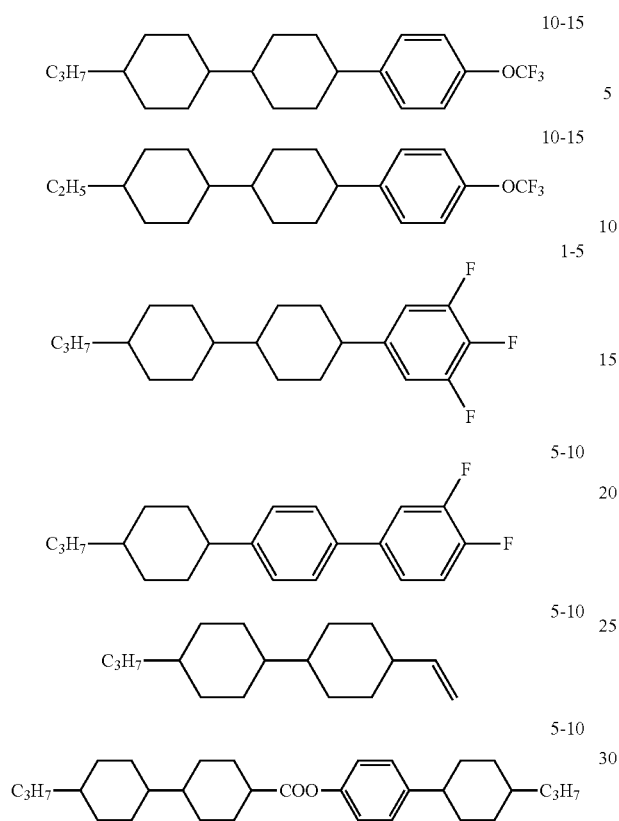
said liquid crystal composition b particularly comprises or consists of the following various components in parts by mass:
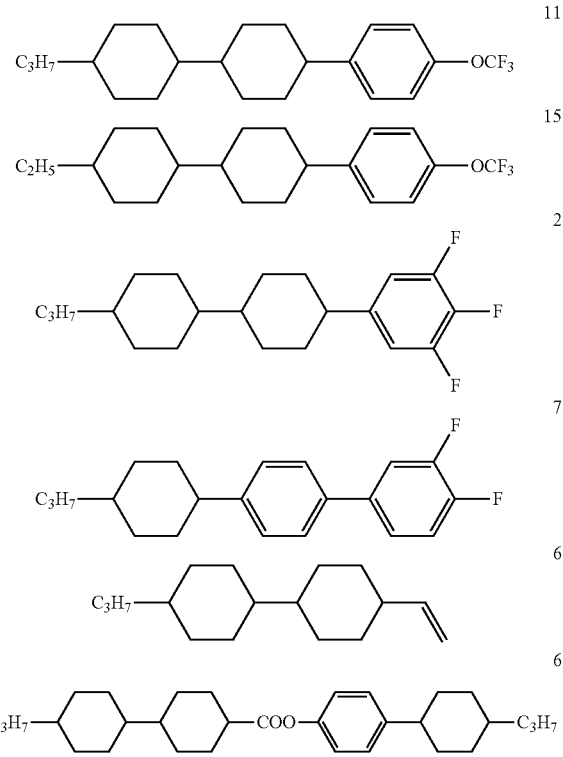
said liquid crystal composition c comprises or consists of the following various components in parts by mass:
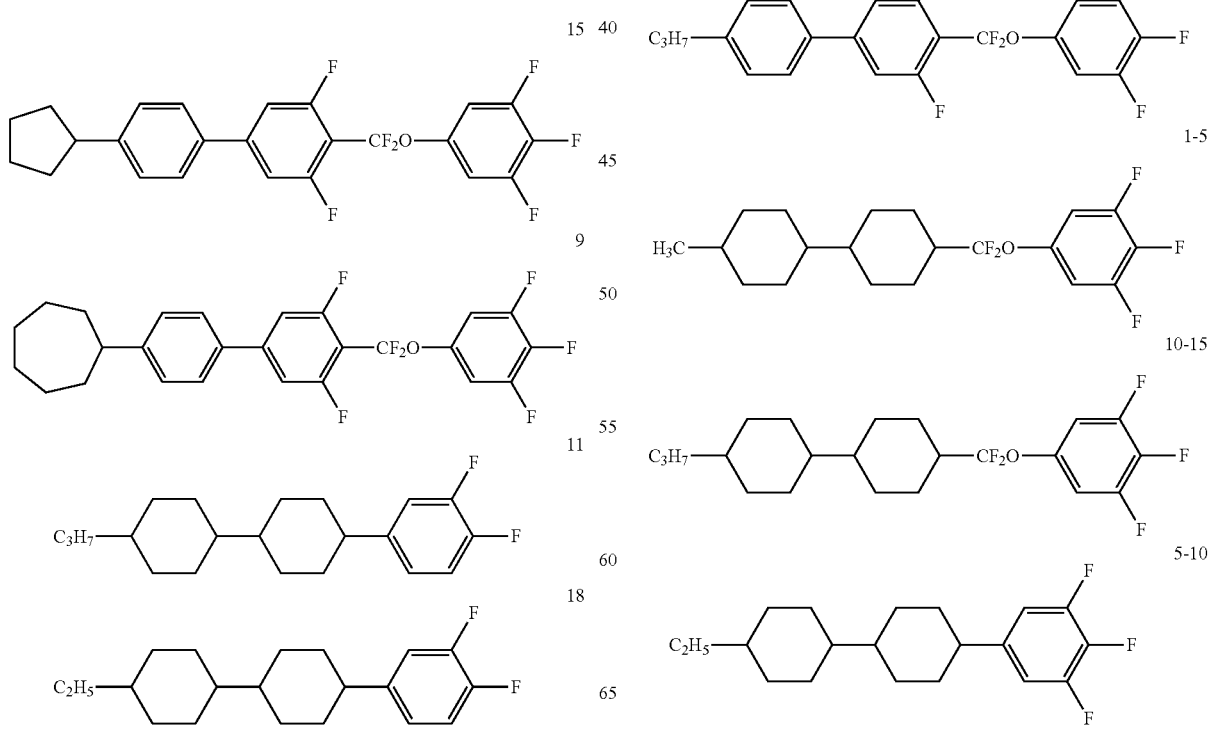

-continued
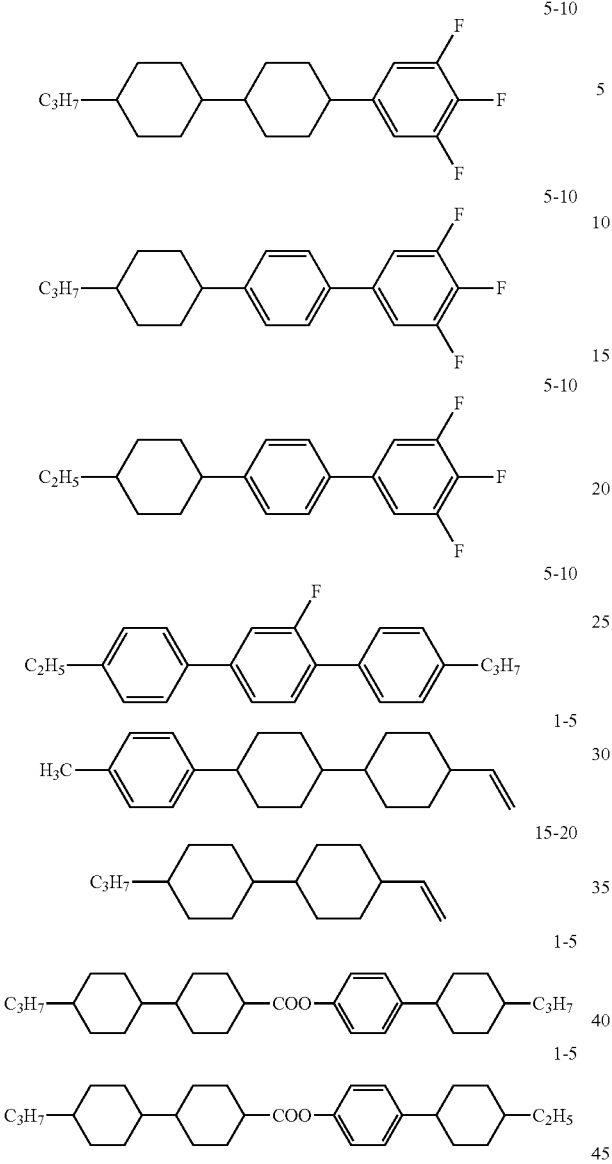
5-10
5-10
5-10
5-10
1-5
15-20
1-5
1-5
said liquid crystal composition c comprises or consists of the following various components in parts by mass:
10
5
5
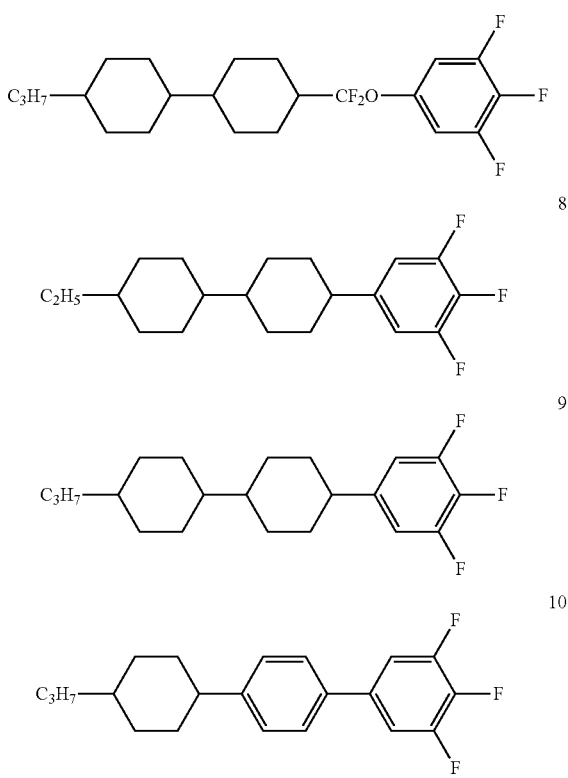
-continued
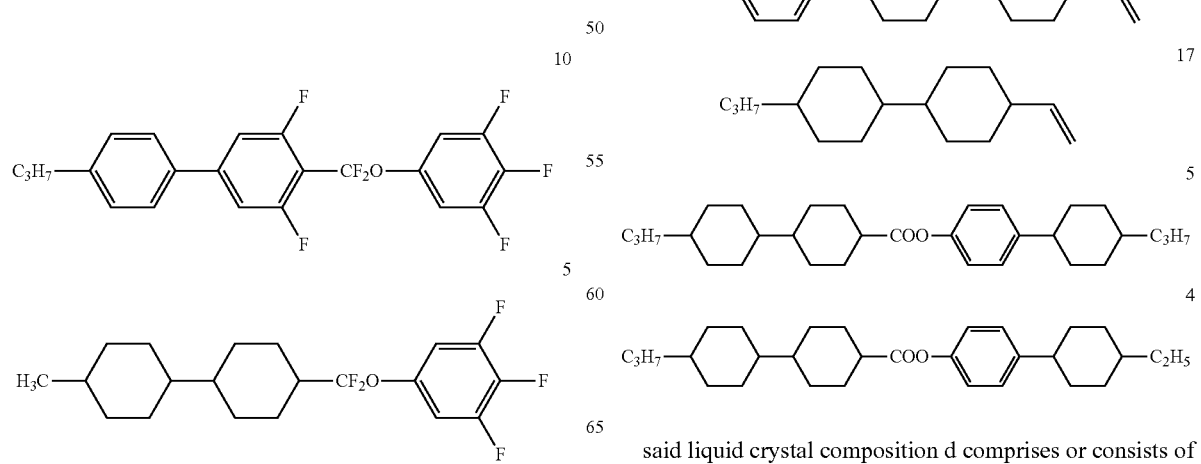
15
8
9
10
6
7
4
17
5
4
said liquid crystal composition d comprises or consists of the following various components in parts by mass:

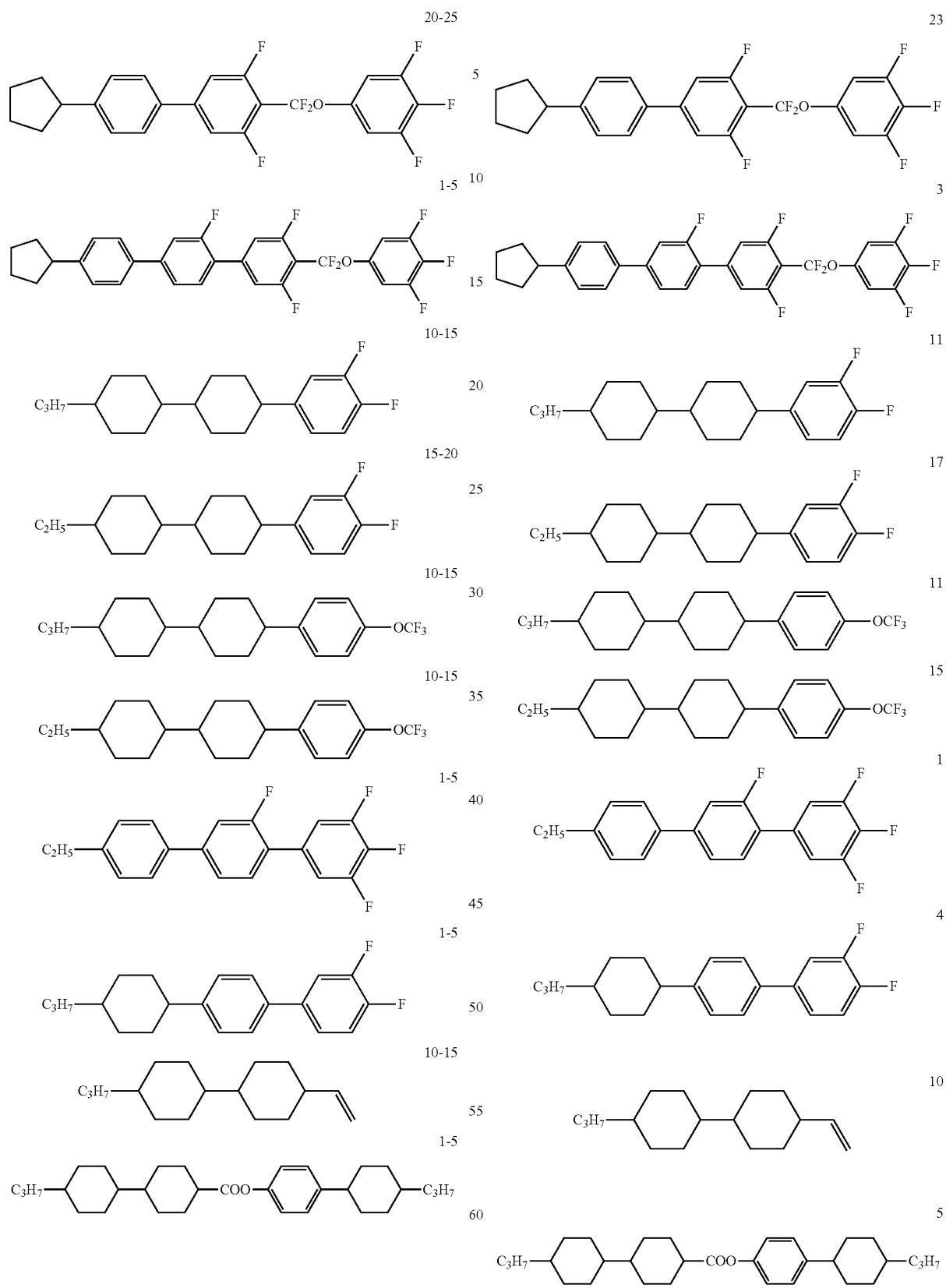
said liquid crystal composition d particularly comprises or consists of the following various components in parts by mass:
said liquid crystal composition e comprises or consists of the following various components in parts by mass:

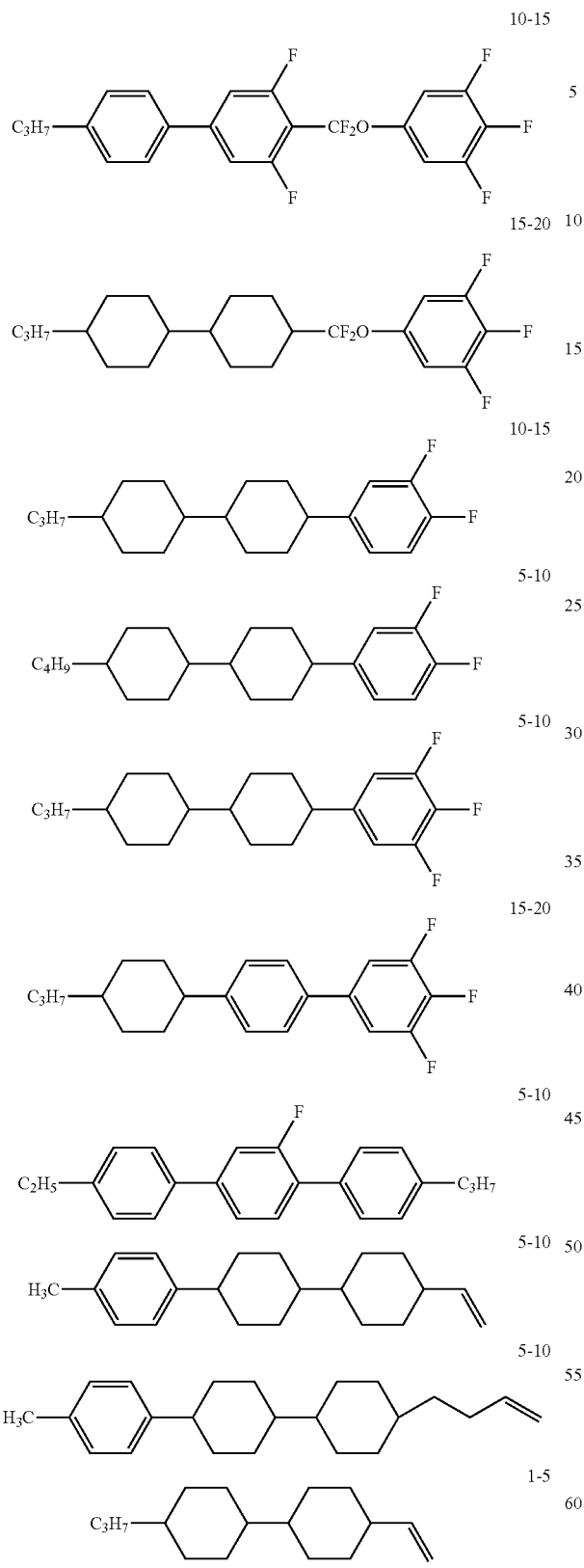
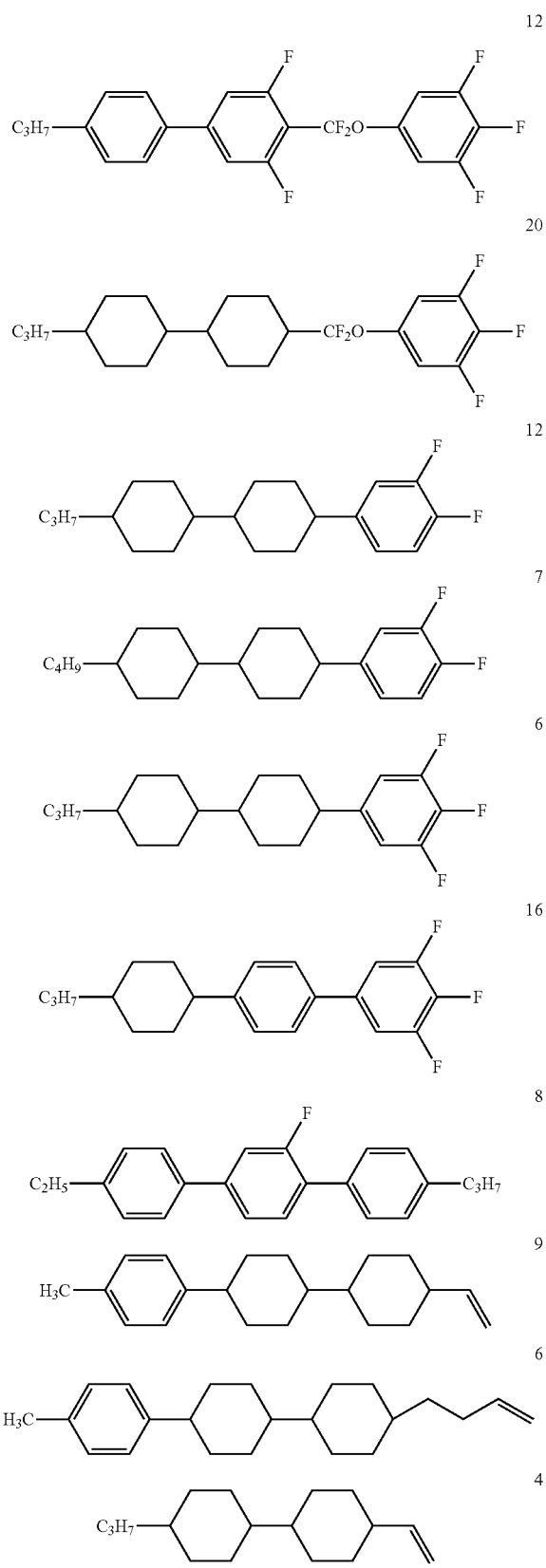
said liquid crystal composition e particularly comprises or consists of the following various components in parts by mass:
said liquid crystal composition f comprises or consists of the following various components in parts by mass:

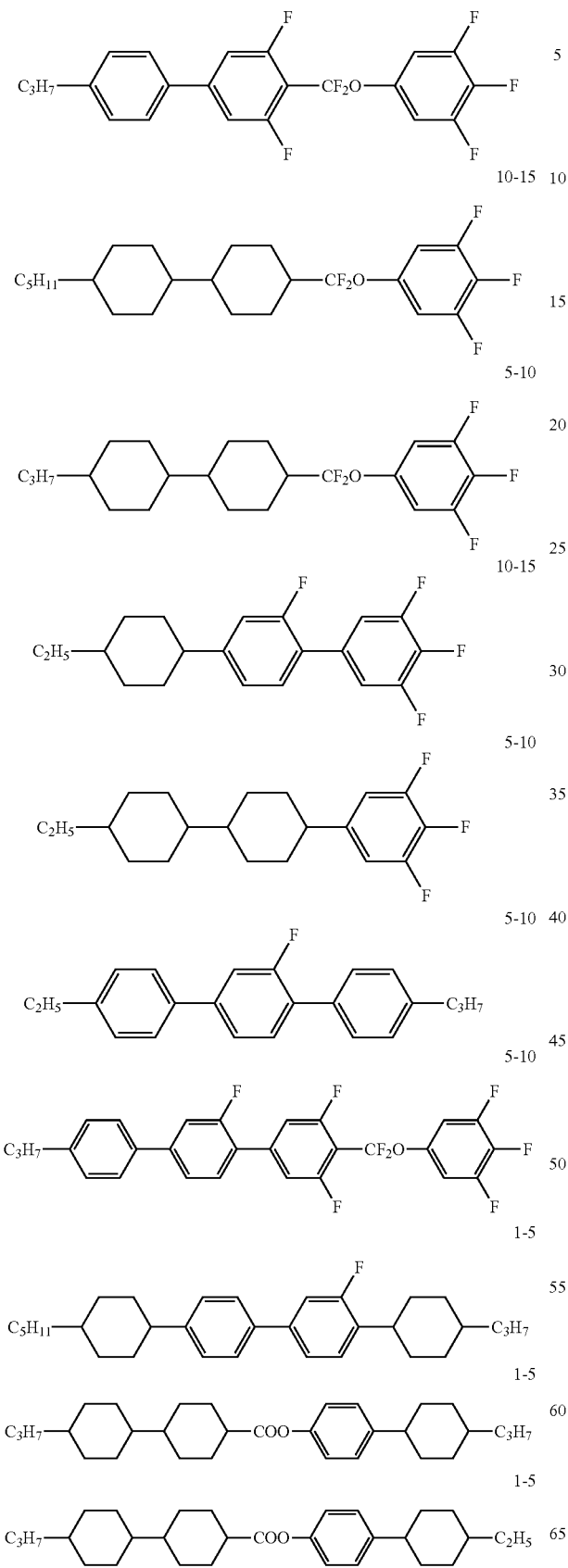
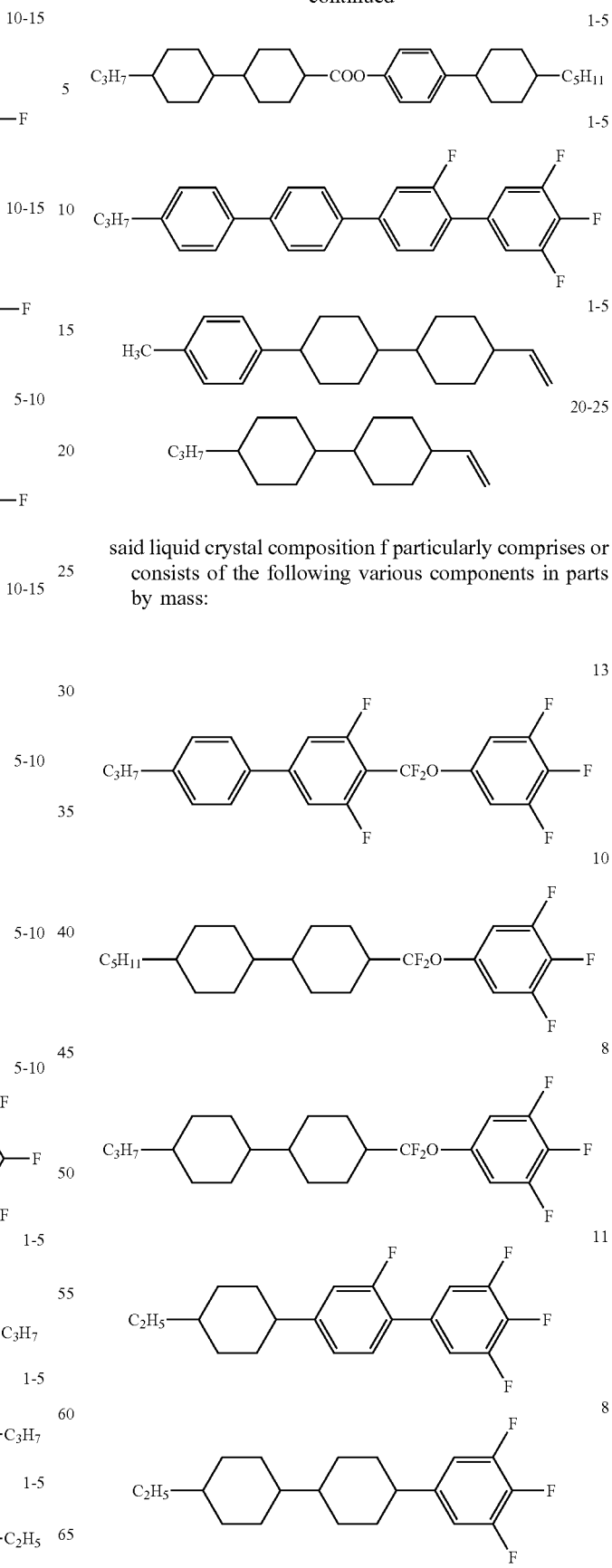
said liquid crystal composition f particularly comprises or consists of the following various components in parts by mass:

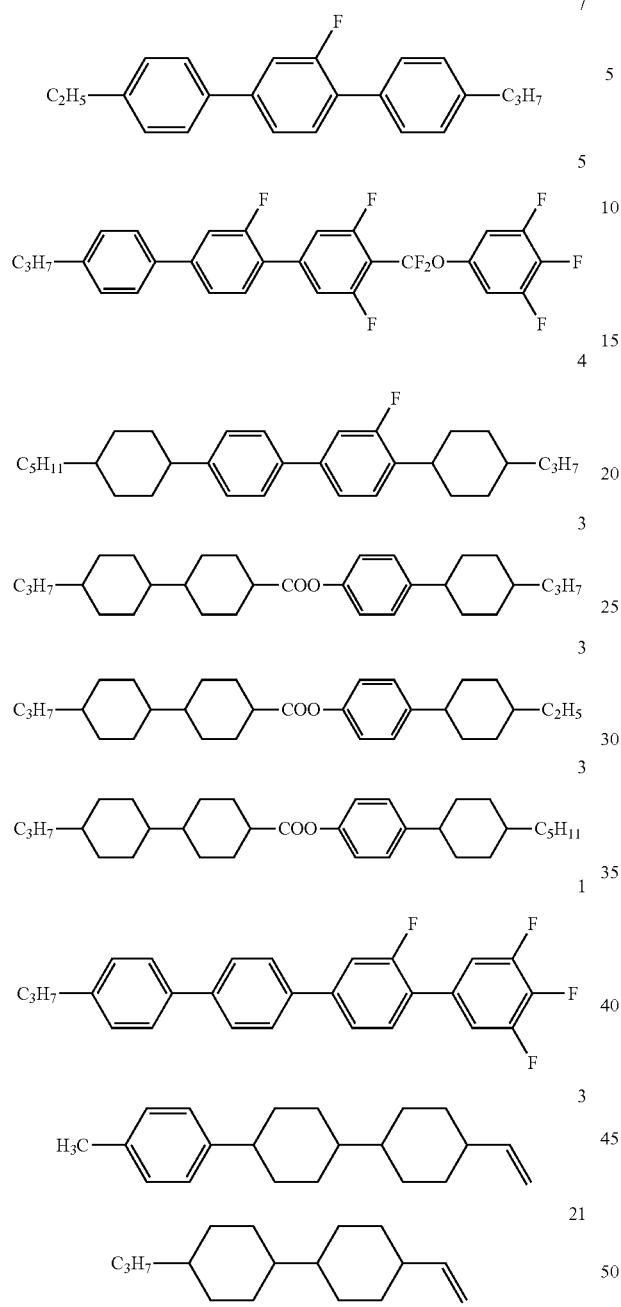
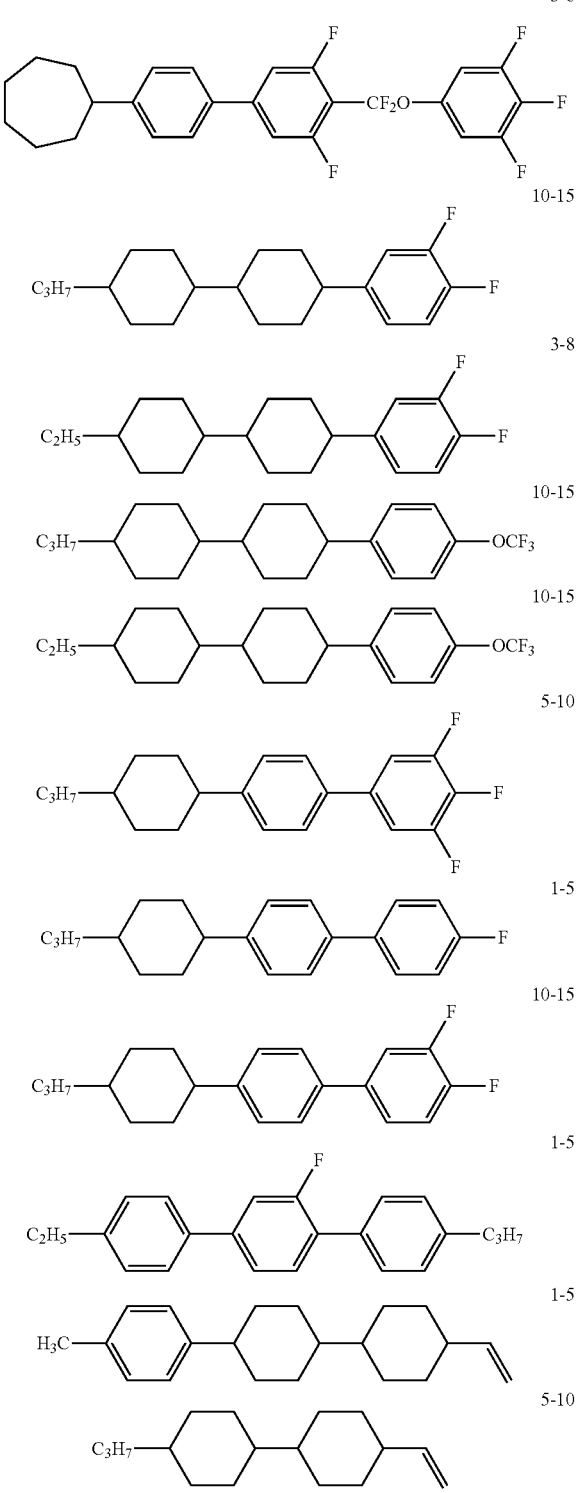
said liquid crystal composition g comprises or consists of the following various components in parts by mass:
said liquid crystal composition g particularly comprises or consists of the following various components in parts by mass:

15
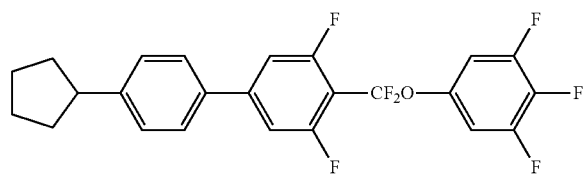
5
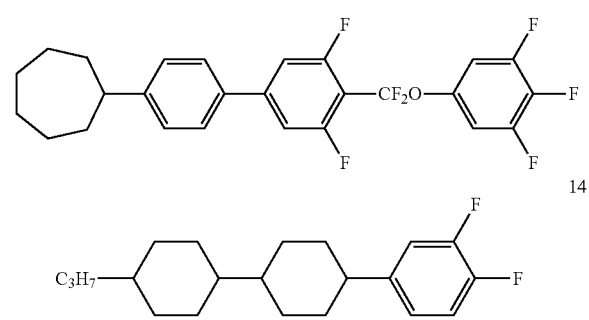
14
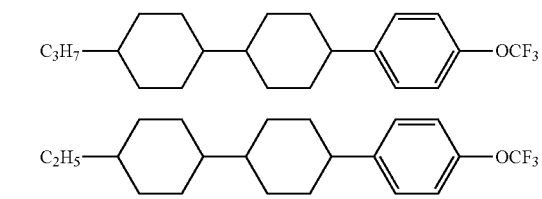
5
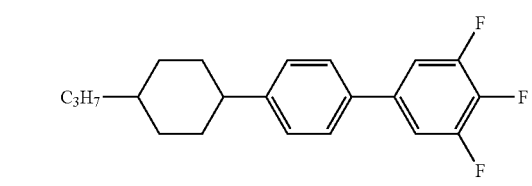
13
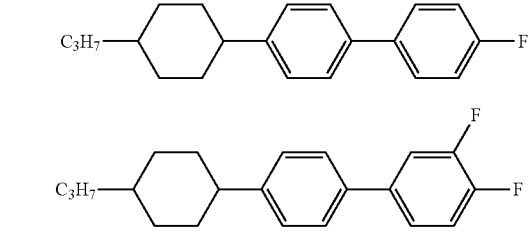
8
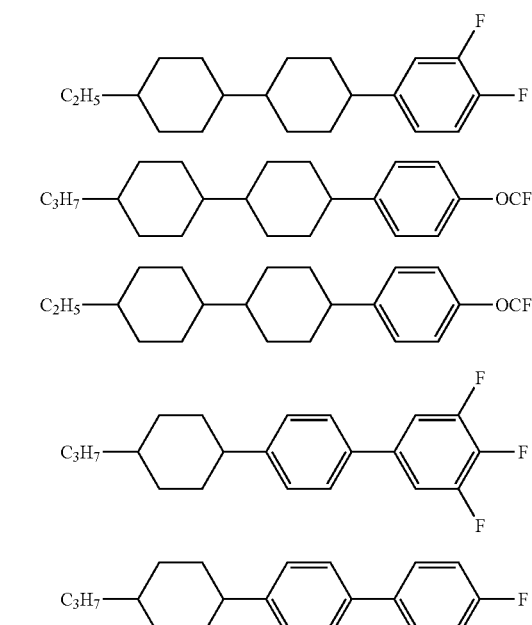
2
11
2
1
6
-continued
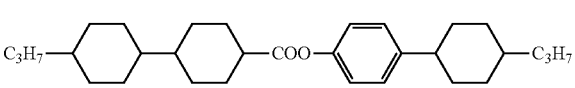
3
said liquid crystal composition h comprises or consists of the following various components in parts by mass:
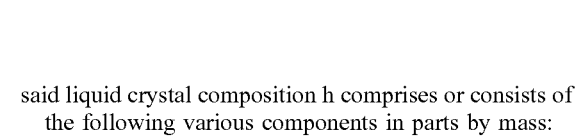
10-15
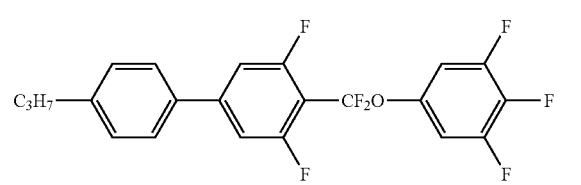
1-5
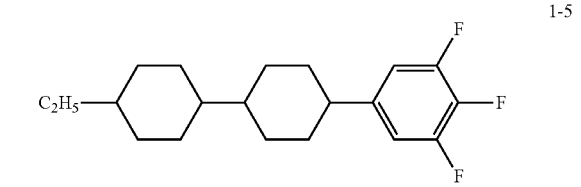
5-10
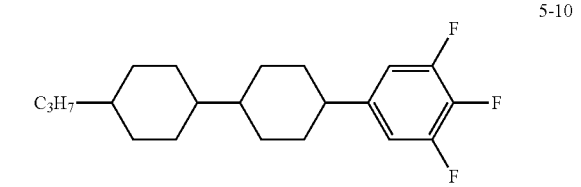
10-15
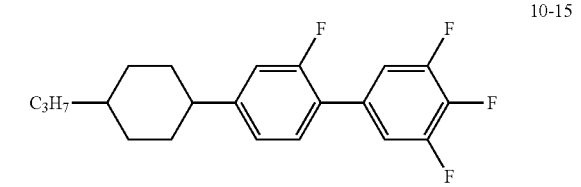
3-8
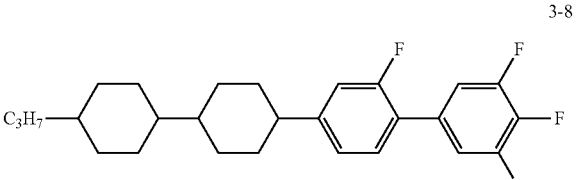
3-8
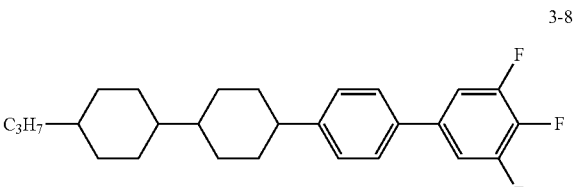
12-18
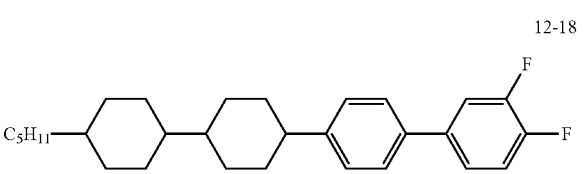

-continued
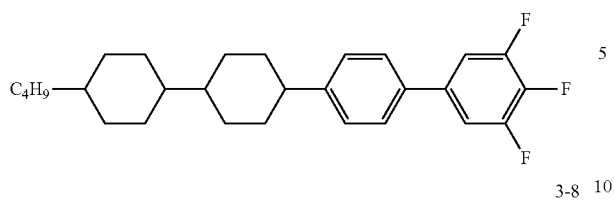 3-8
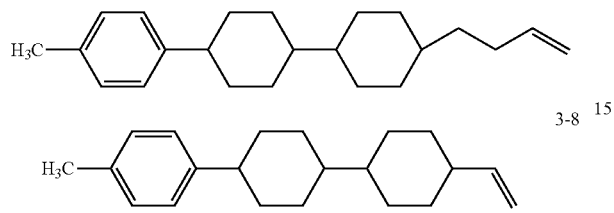 3-8
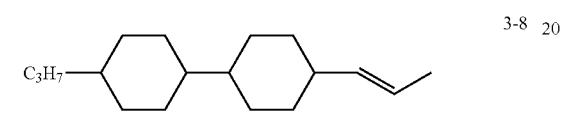 3-8
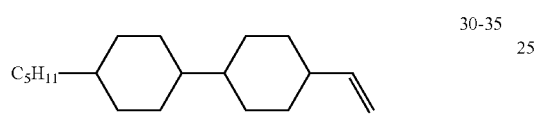 3-8
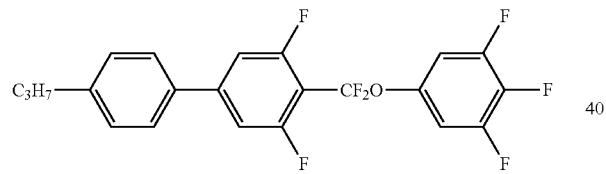 30-35
said liquid crystal composition h particularly comprises or consists of the following various components in parts by mass:
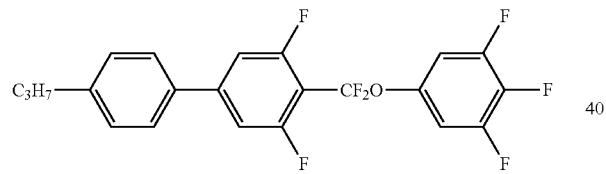 10
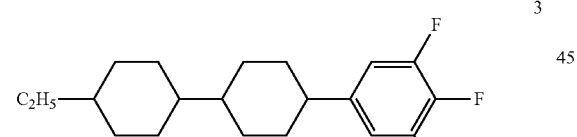 3
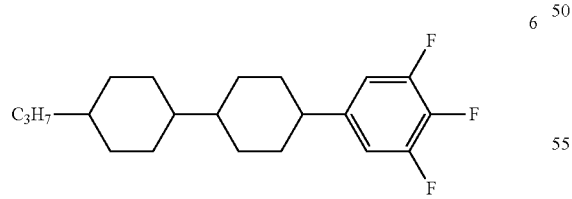 6
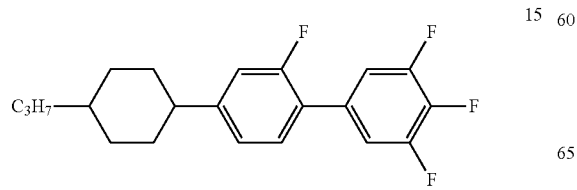 15
-continued
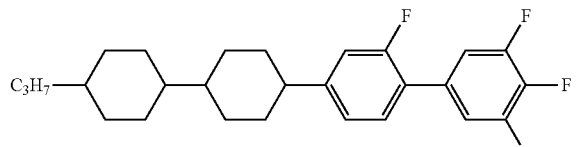 4
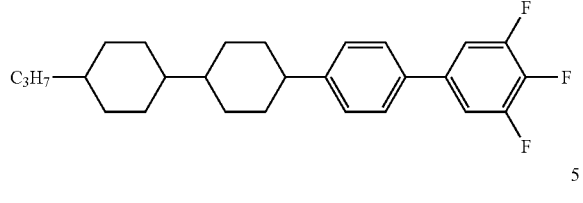 5
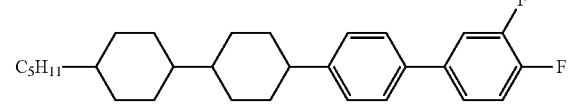 5
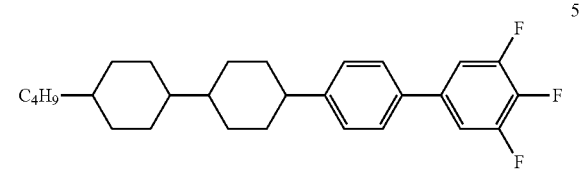 5
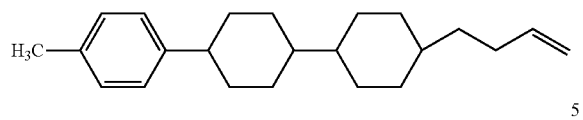 5
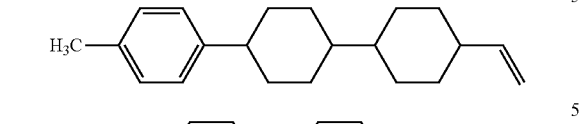 5
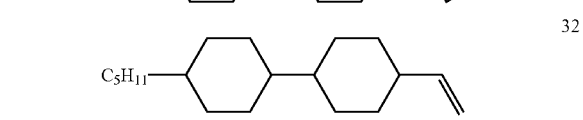 32
said liquid crystal composition i comprises or consists of the following various components in parts by mass:
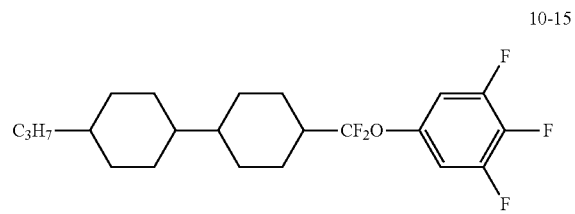 10-15
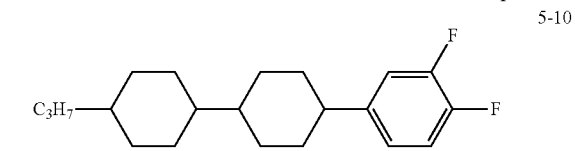 5-10

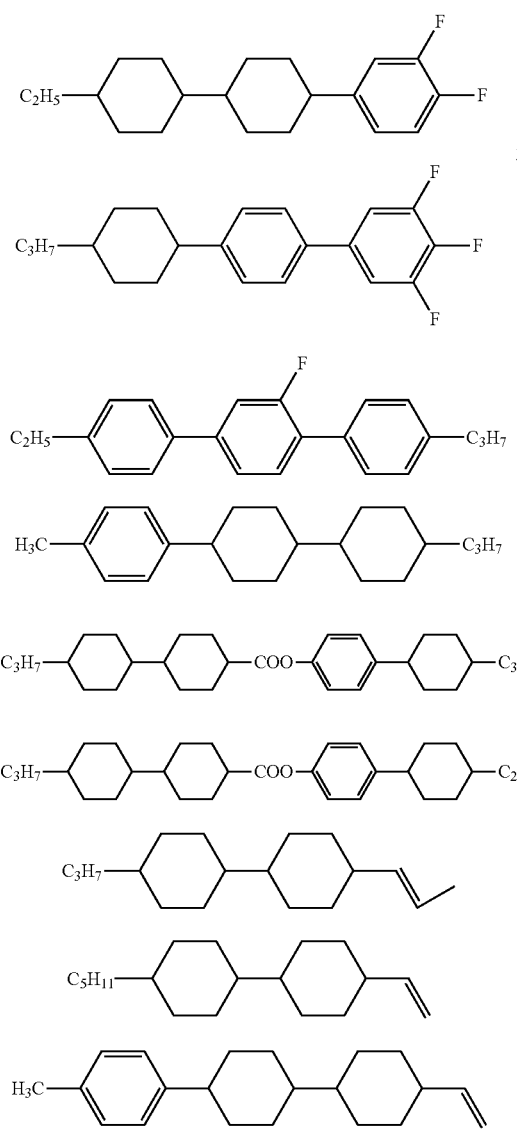
said liquid crystal composition i particularly comprises or consists of the following various components in parts by mass:
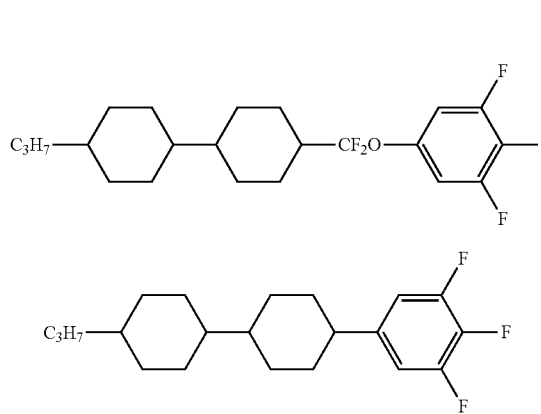
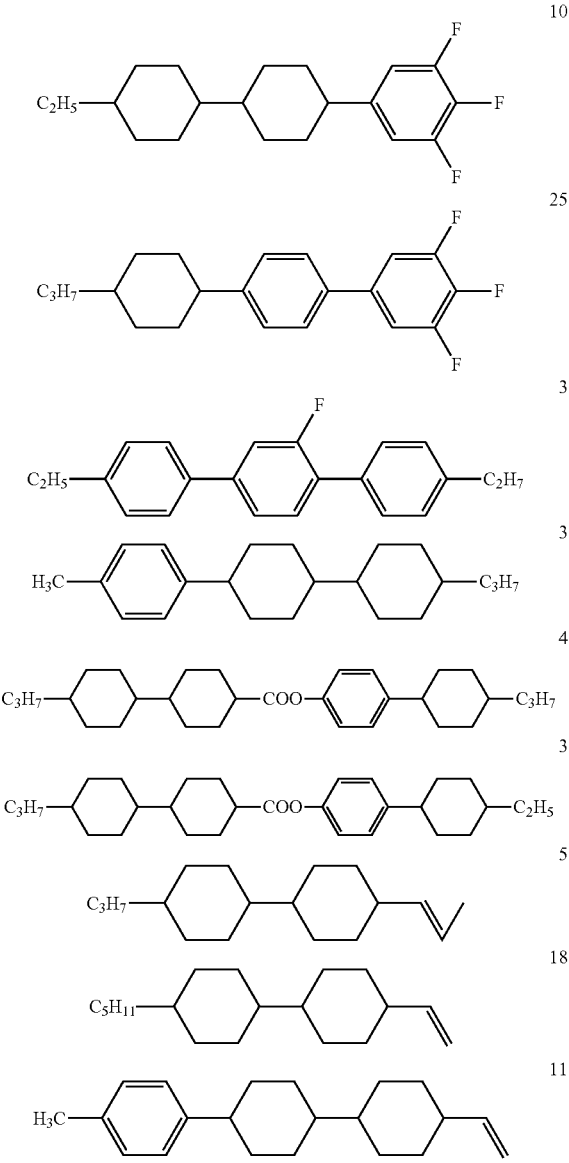
said liquid crystal composition j comprises or consists of the following various components in parts by mass:
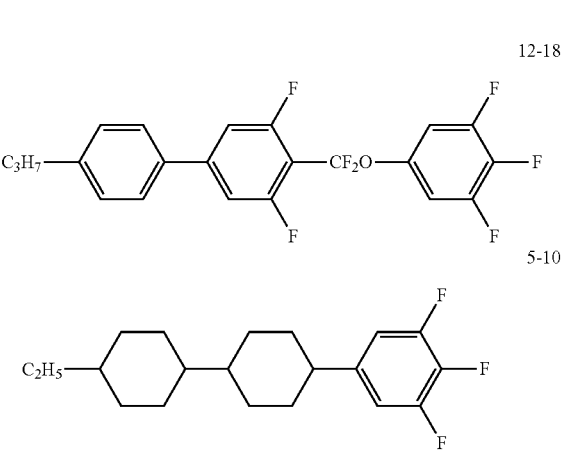

-continued
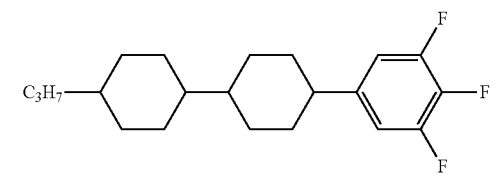
1-5
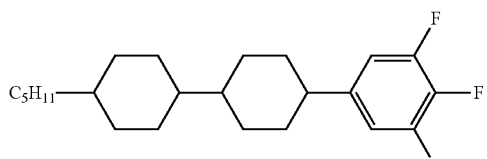
1-5
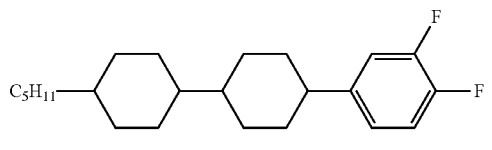
8-12
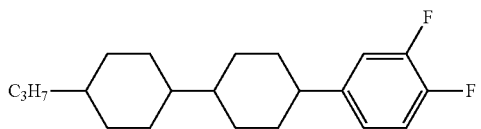
10-15
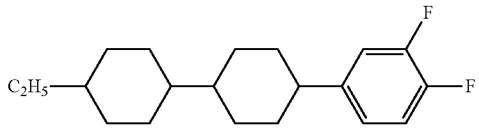
8-12
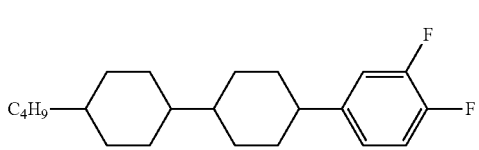
8-12
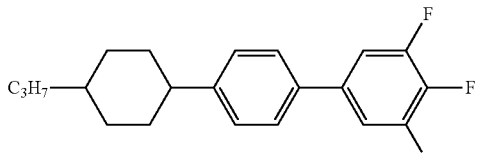
5-10
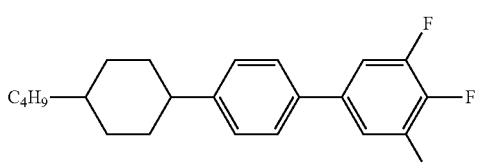
5-10
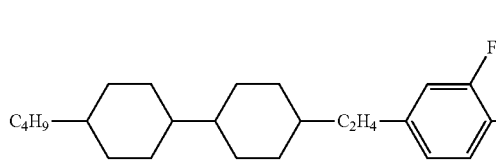
8-12
-continued
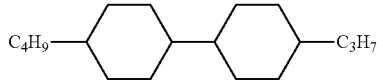
3-8
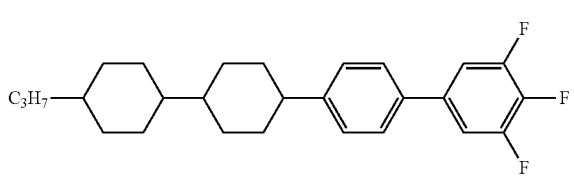
3-8
said liquid crystal composition j particularly comprises or consists of the following various components in parts by mass:
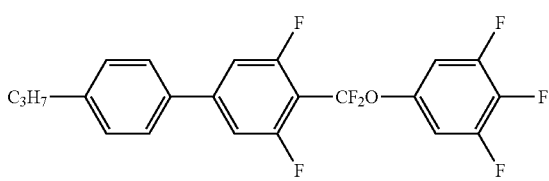
15
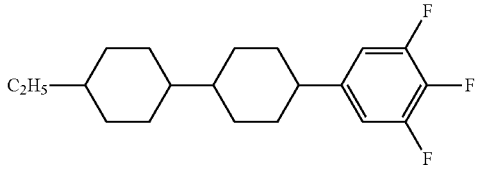
8
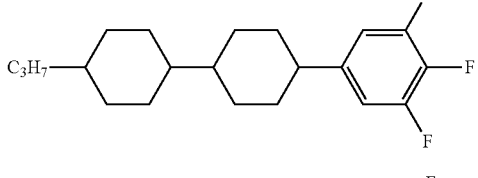
3
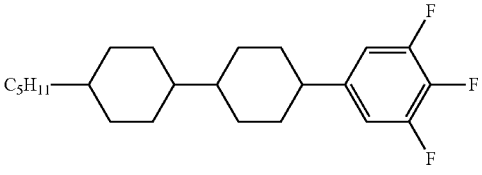
3
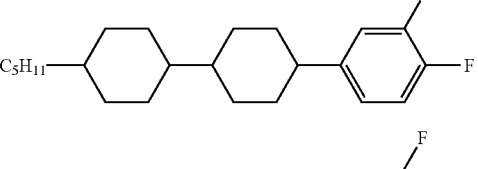
10
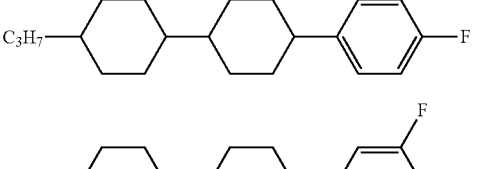
11
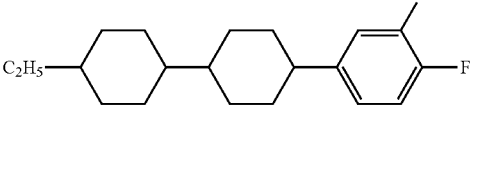
10

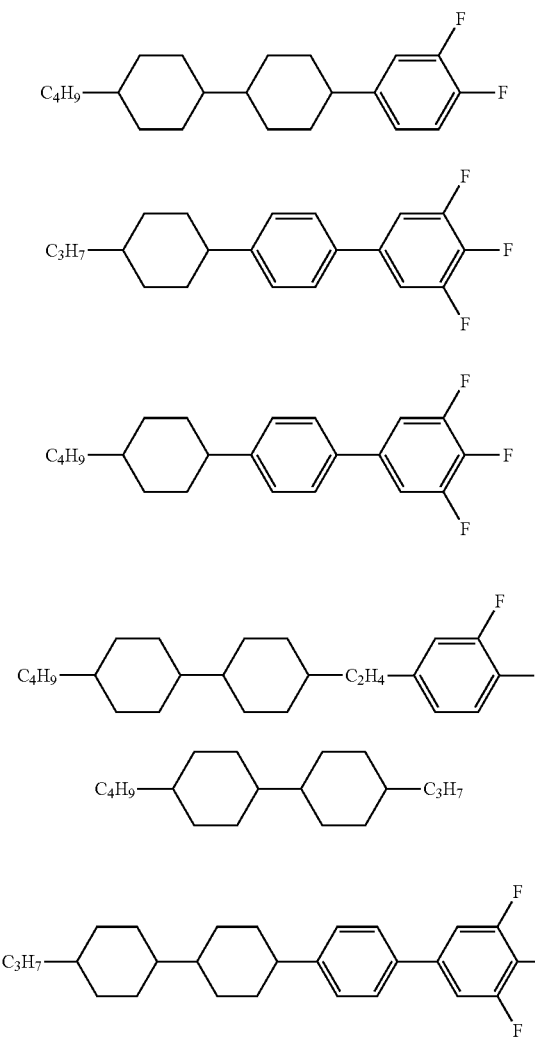
10
6
6
10
5
3
said liquid crystal composition k comprises or consists of the following various components in parts by mass:
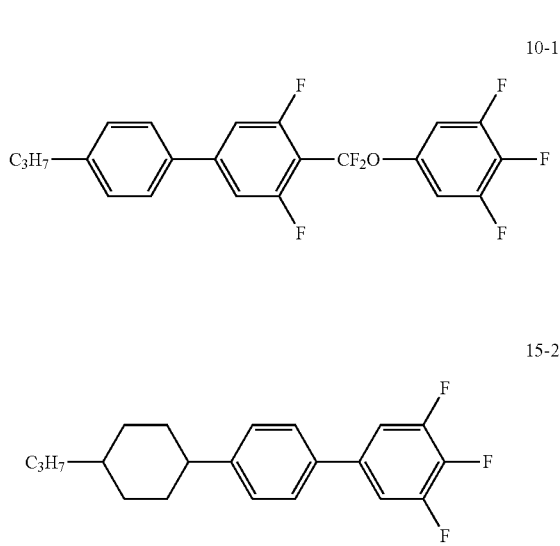
10-15
15-20
5-10
8-12
3-8
3-8
15-20
25-30
said liquid crystal composition k particularly comprises or consists of the following various components in parts by mass:
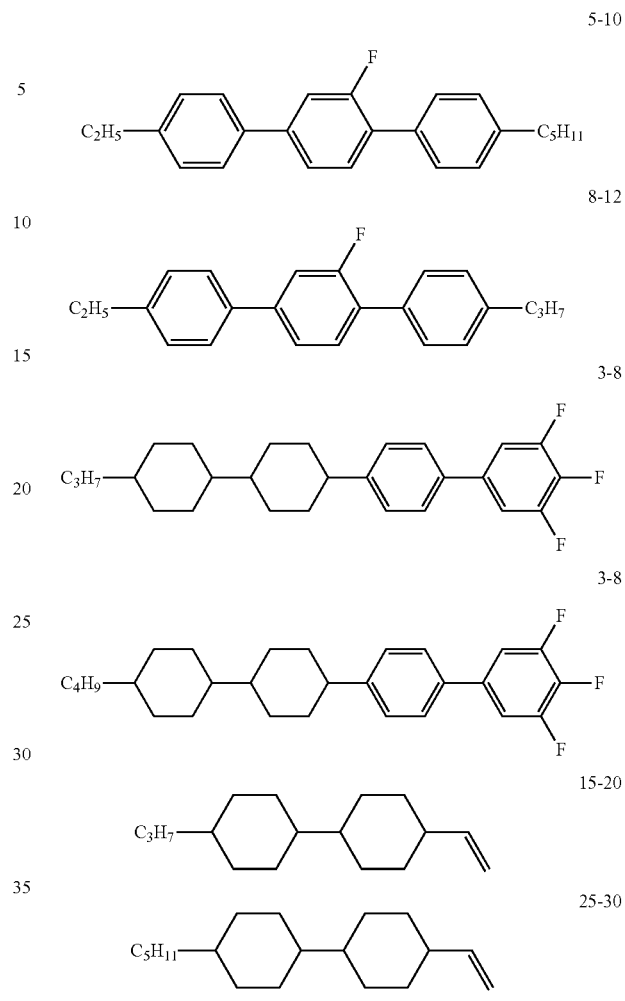
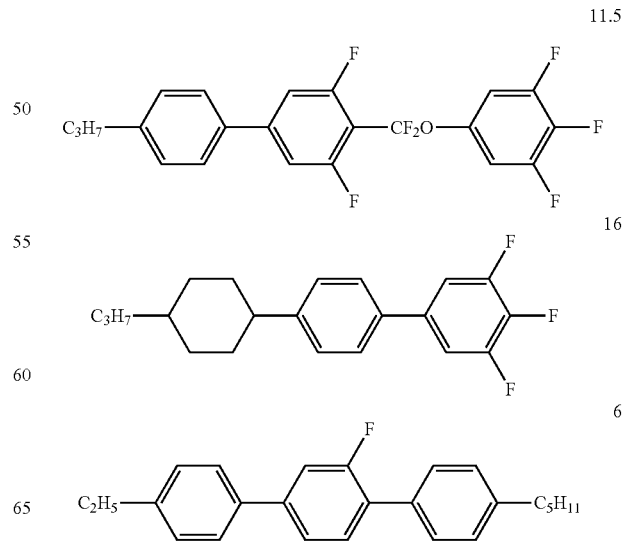
11.5
16
6

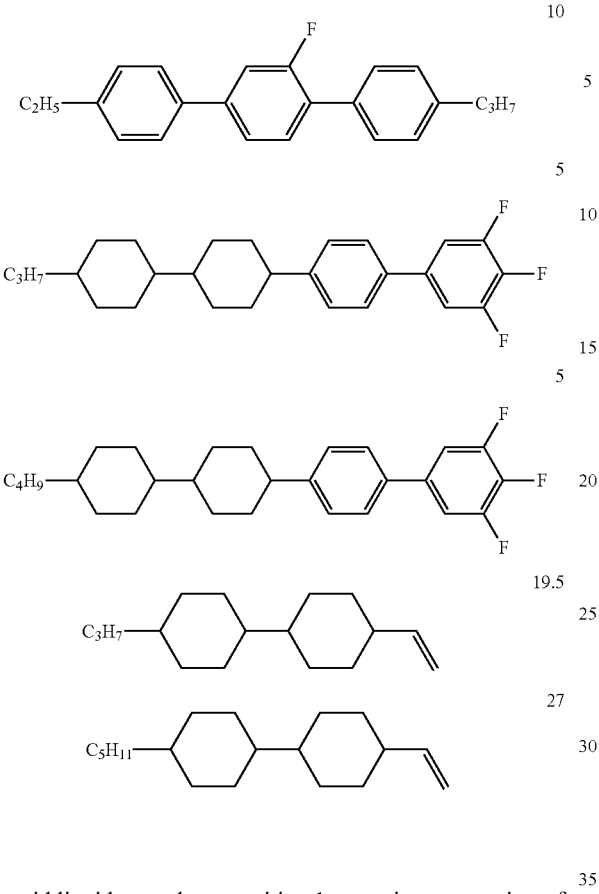
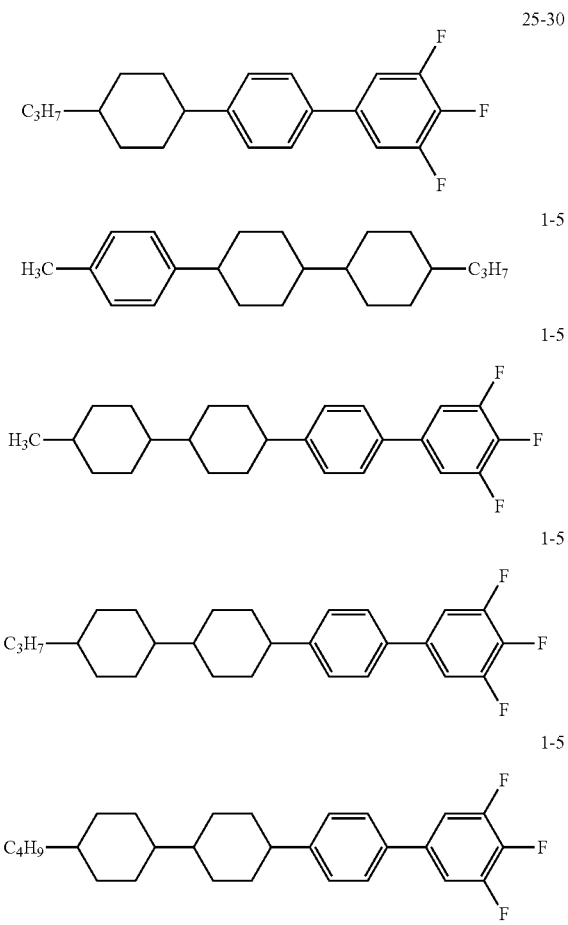
said liquid crystal composition 1 comprises or consists of the following various components in parts by mass:
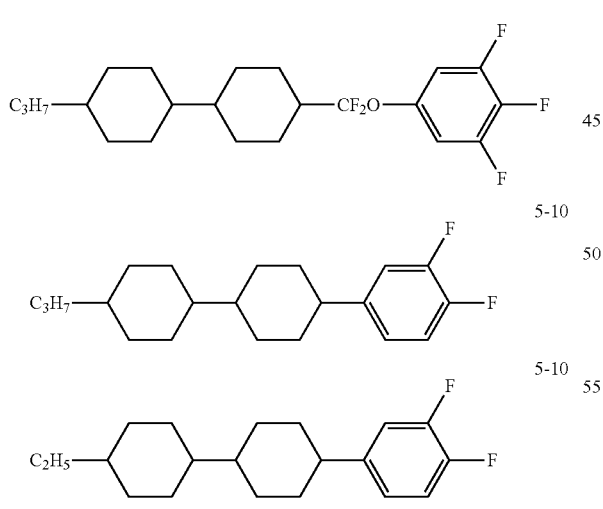
said liquid crystal composition 1 particularly comprises or consists of the following various components in parts by mass:
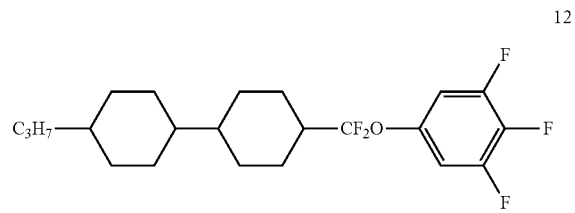

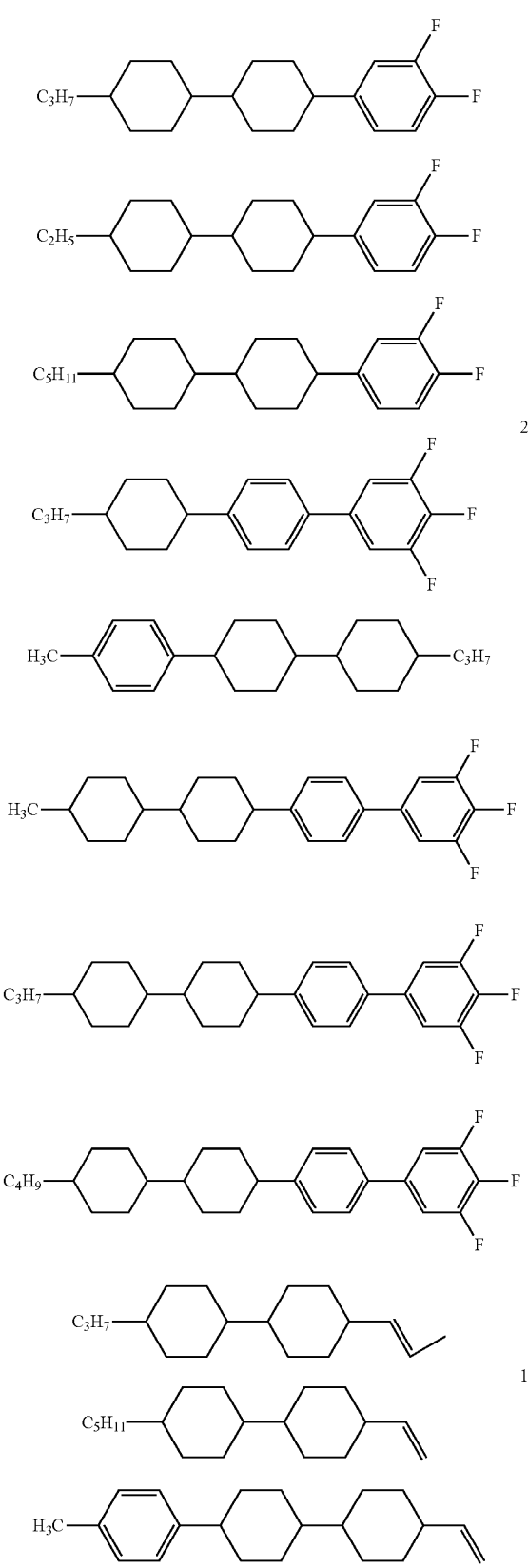
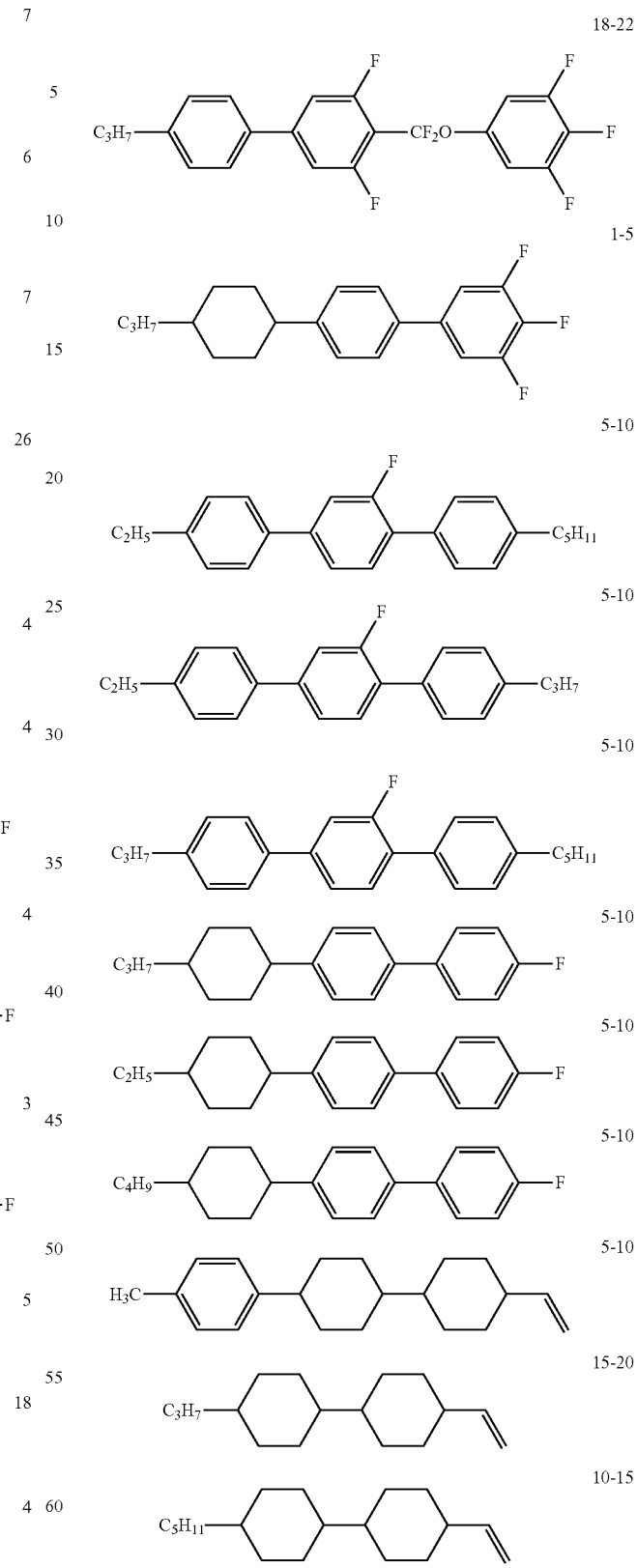
said liquid crystal composition m comprises or consists of the following various components in parts by mass:
said liquid crystal composition m particularly comprises or consists of the following various components in parts by mass:

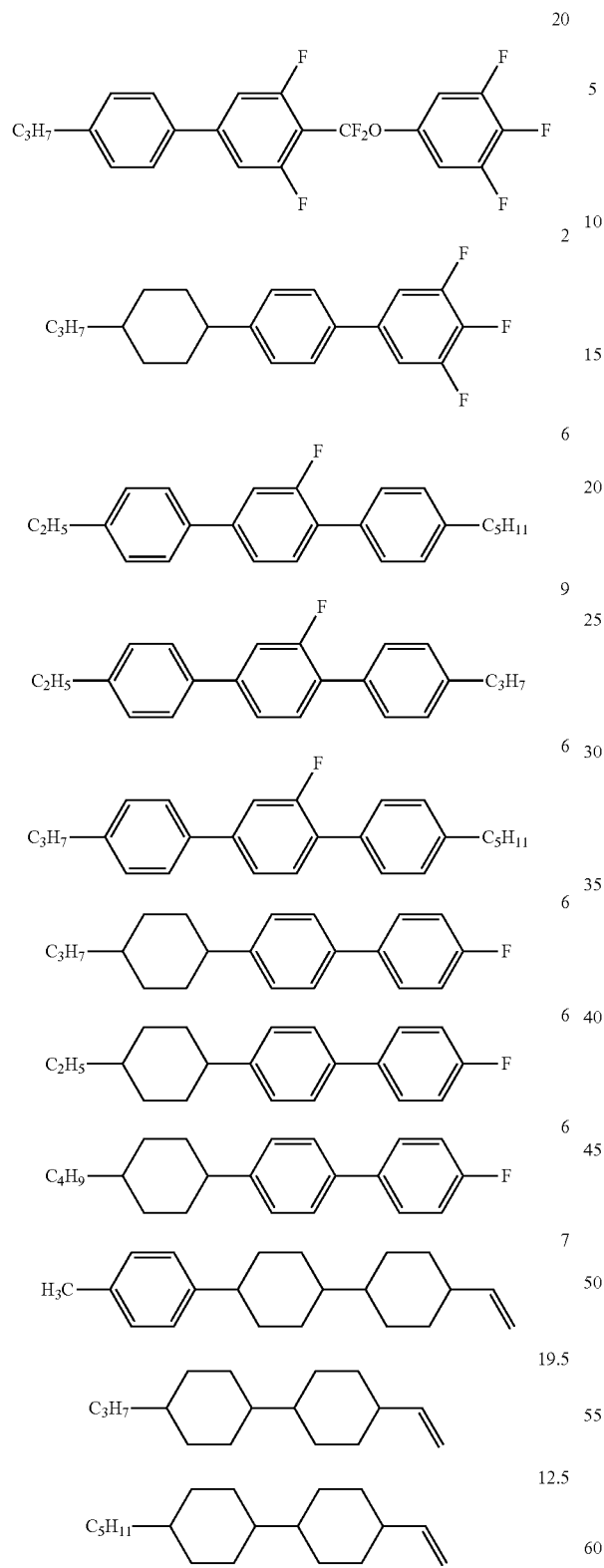
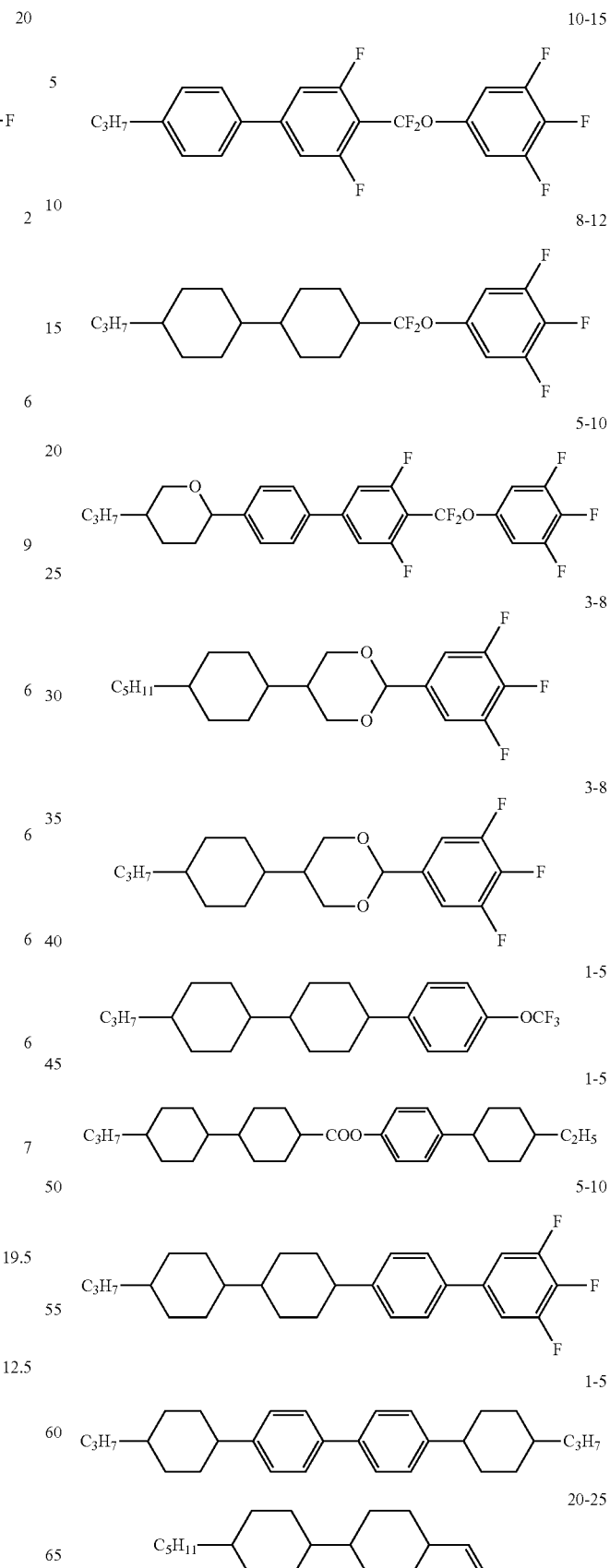
said liquid crystal composition n comprises or consists of the following various components in parts by mass:

said liquid crystal composition n particularly comprises or consists of the following various components in parts by mass:

[Chemical structure: C3H7-cyclohexyl-cyclohexyl-vinyl] 15-20

[Chemical structure: C3H7-phenyl-phenyl(F,F)-CF2O-phenyl(F,F,F)] 13

[Chemical structure: C3H7-cyclohexyl-cyclohexyl-CF2O-phenyl(F,F,F)] 10

[Chemical structure: C3H7-tetrahydropyran-phenyl-phenyl(F,F)-CF2O-phenyl(F,F,F)] 6

[Chemical structure: C5H11-cyclohexyl-dioxane-phenyl(F,F,F)] 5

[Chemical structure: C3H7-cyclohexyl-dioxane-phenyl(F,F,F)] 5

[Chemical structure: C3H7-cyclohexyl-cyclohexyl-phenyl-OCF3] 4

[Chemical structure: C3H7-cyclohexyl-cyclohexyl-COO-phenyl-cyclohexyl-C2H5] 4

[Chemical structure: C3H7-cyclohexyl-cyclohexyl-phenyl-phenyl(F,F,F)] 9

[Chemical structure: C3H7-cyclohexyl-phenyl-phenyl-C3H7] 3

[Chemical structure: C5H11-cyclohexyl-cyclohexyl-vinyl] 21.5

[Chemical structure: C3H7-cyclohexyl-cyclohexyl-vinyl] 19.5 said liquid crystal composition o comprises or consists of the following various components in parts by mass:

[Chemical structure: C3H7-cyclohexyl-cyclohexyl-CF2O-phenyl(F,F,F)] 15-20

[Chemical structure: C5H11-phenyl-phenyl-phenyl(F,F)-CF2O-phenyl(F,F,F)] 5-10

[Chemical structure: C3H7-phenyl-phenyl-phenyl(F,F)-CF2O-phenyl(F,F,F)] 5-10

[Chemical structure: C3H7-cyclohexyl-phenyl-phenyl-CF2O-phenyl(F,F,F)] 5-10

[Chemical structure: C3H7-cyclohexyl-cyclohexyl-phenyl(F,F,F)] 5-10

[Chemical structure: C3H7-cyclohexyl-cyclohexyl-COO-phenyl-cyclohexyl-C2H5] 1-5

[Chemical structure: C3H7-cyclohexyl-cyclohexyl-phenyl-phenyl(F,F,F)] 1-5

1-5
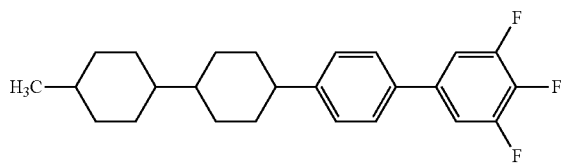
25-30
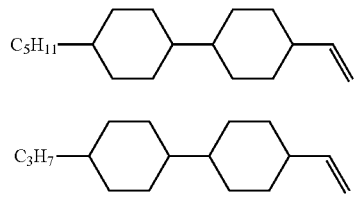
15-20
said liquid crystal composition o particularly comprises or consists of the following various components in parts by mass:
18
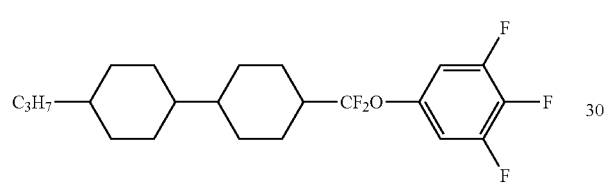
6
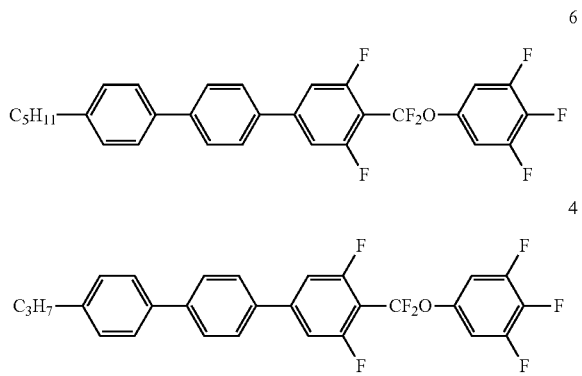
4
7
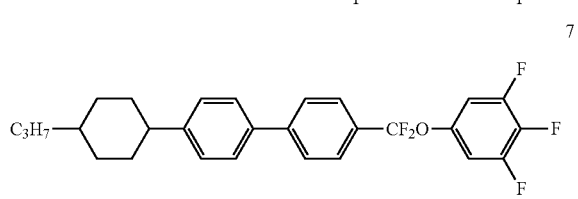
8
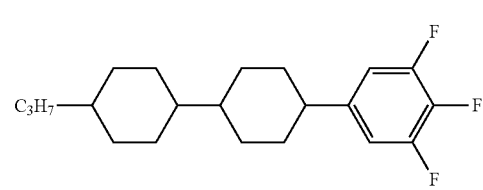
4
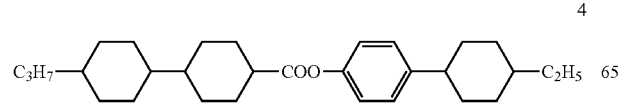
2
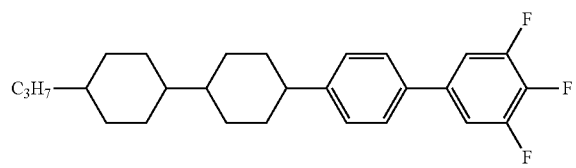
3
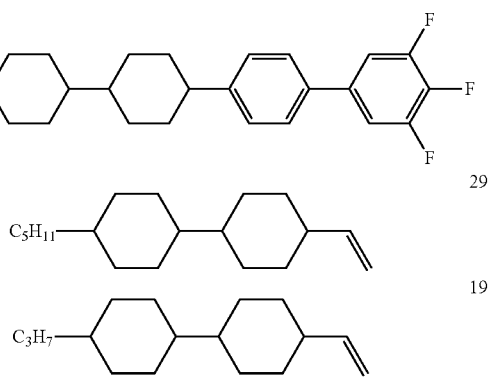
29
19
said liquid crystal composition p comprises or consists of the following various components in parts by mass:
15-20
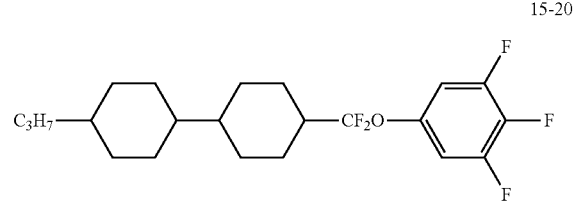
5-10
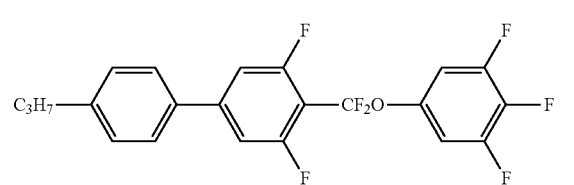
1-5
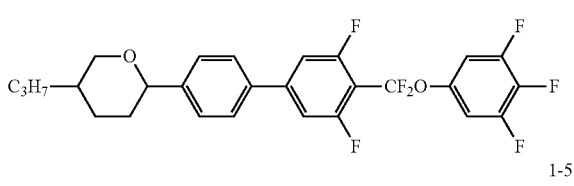
1-5
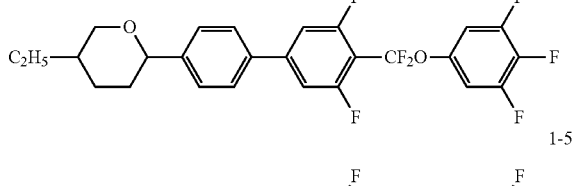
1-5
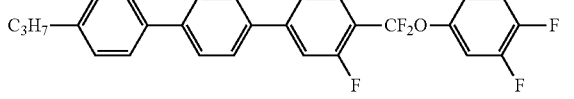

-continued
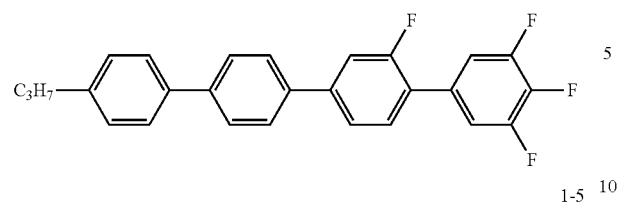
1-5
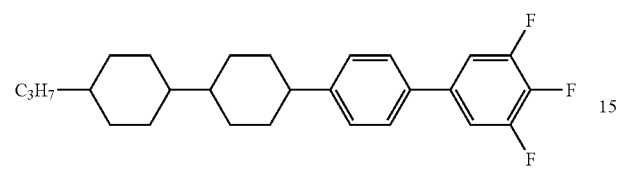
1-5
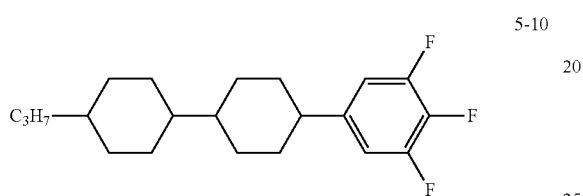
5-10
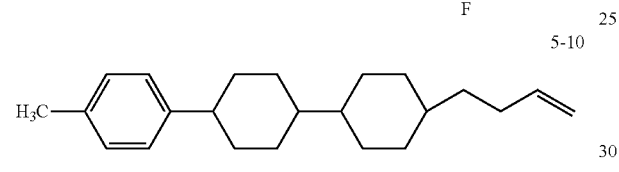
5-10
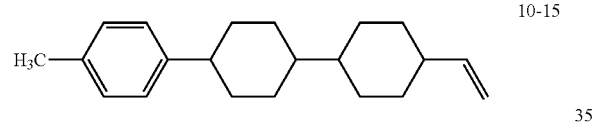
10-15
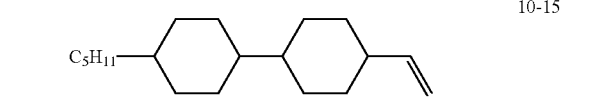
10-15
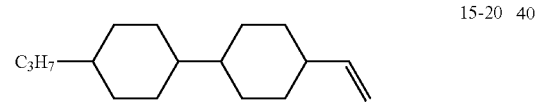
15-20
said liquid crystal composition p particularly comprises or consists of the following various components in parts by mass:
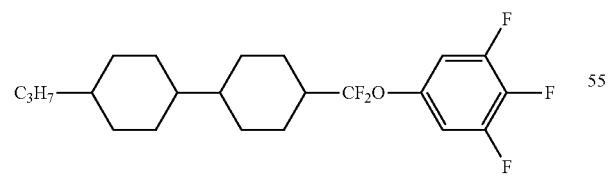
17
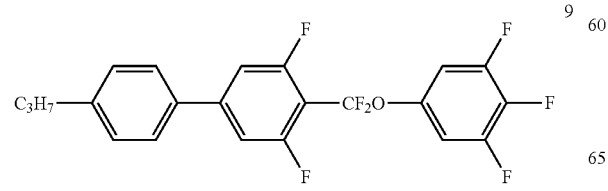
9
-continued
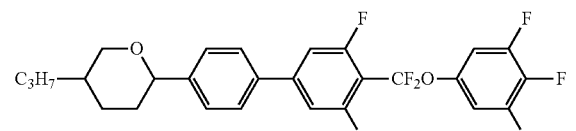
4
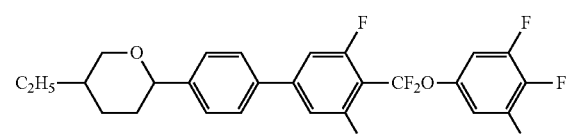
4
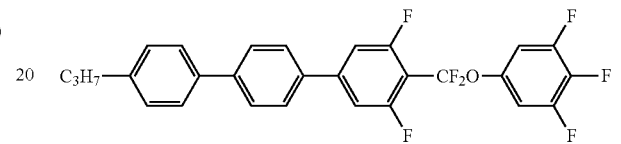
4
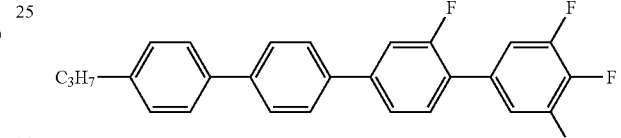
1
3
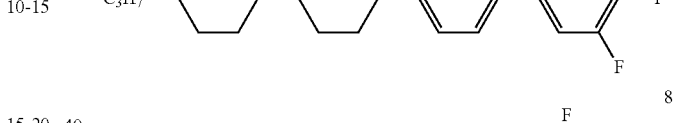
8
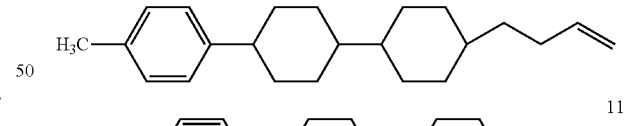
6
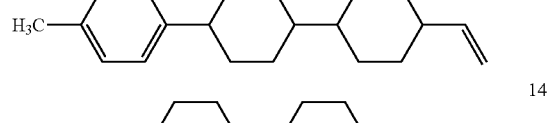
11
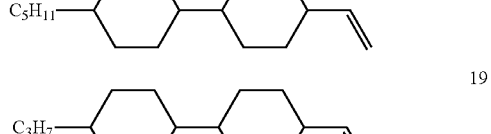
14
19
said liquid crystal composition q comprises or consists of the following various components in parts by mass:

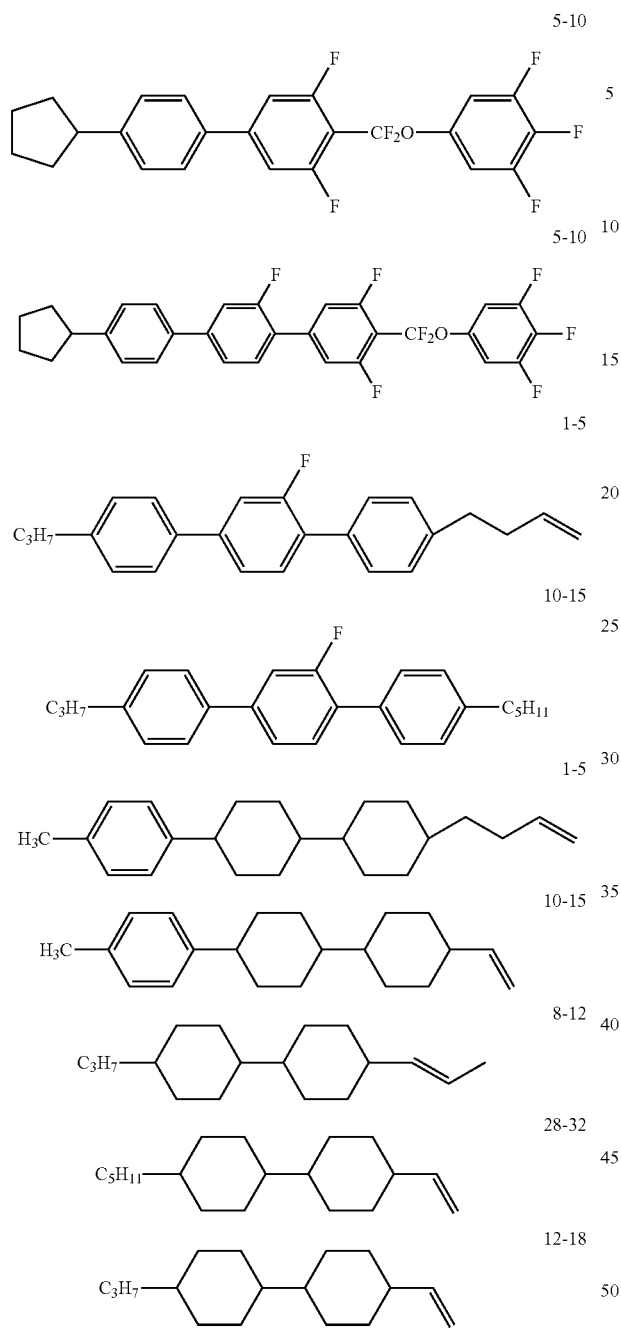
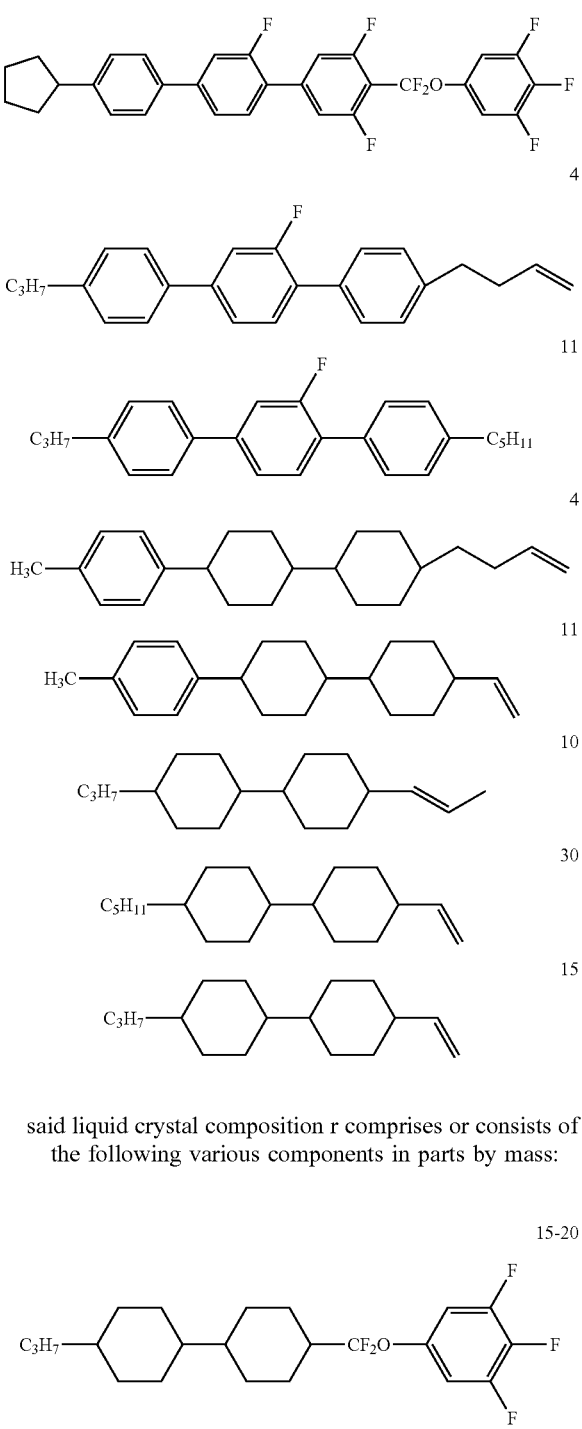
said liquid crystal composition q particularly comprises or consists of the following various components in parts by mass:
said liquid crystal composition r comprises or consists of the following various components in parts by mass:
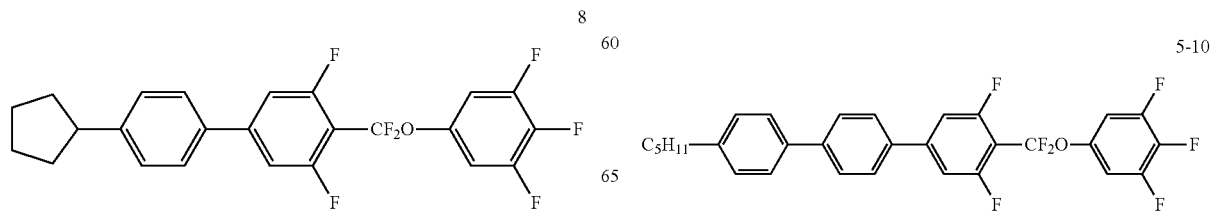

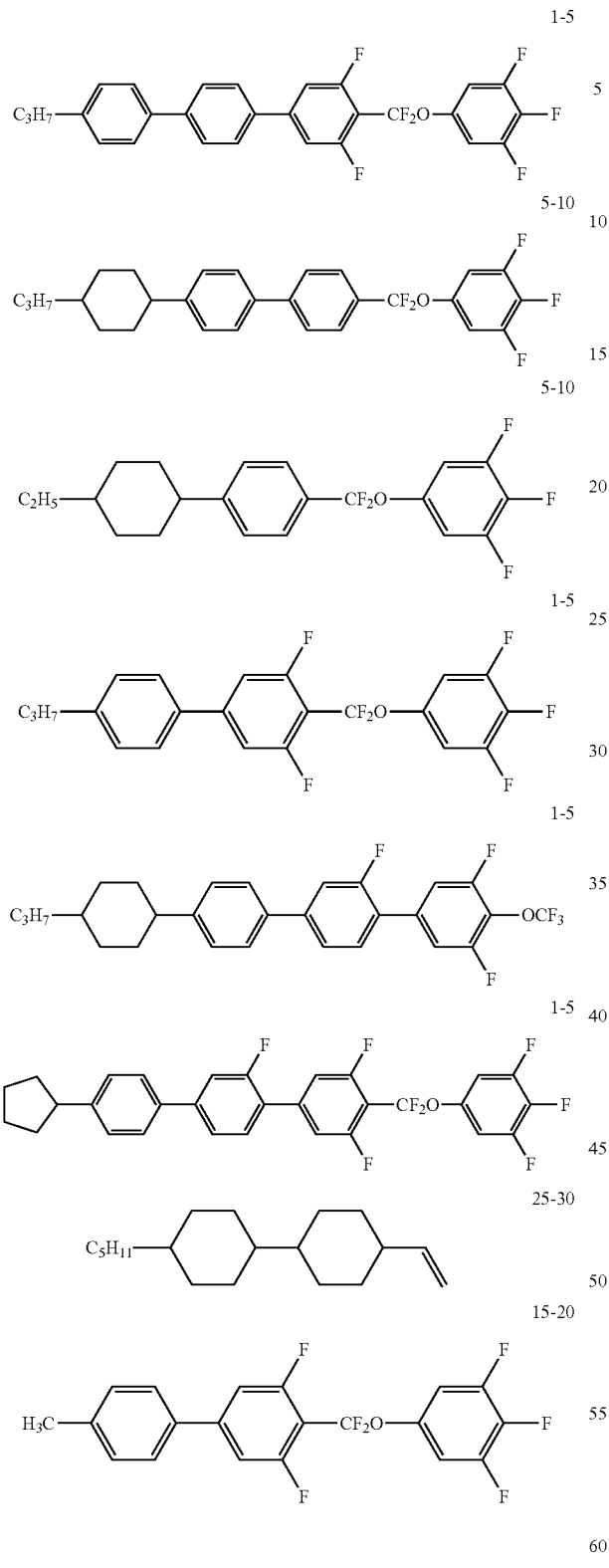
said liquid crystal composition r particularly comprises or consists of the following various components in parts by mass:

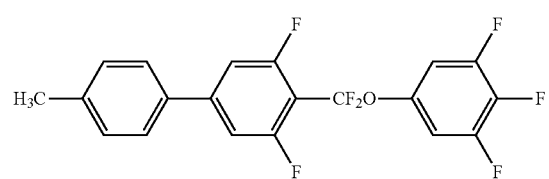
19
said liquid crystal composition s comprises or consists of the following various components in parts by mass:
12-18
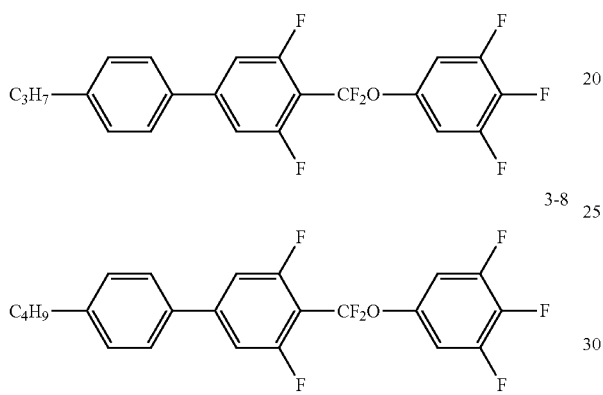
3-8
10-15
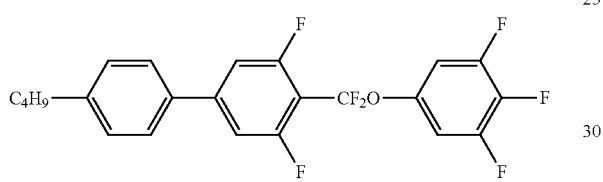
3-8
10-15
12-18
5-10
1-5
-continued
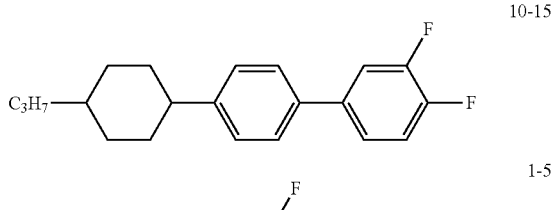
10-15
1-5
1-5
5-10
1-5
said liquid crystal composition s particularly comprises or consists of the following various components in parts by mass:
15
5
14
5
13

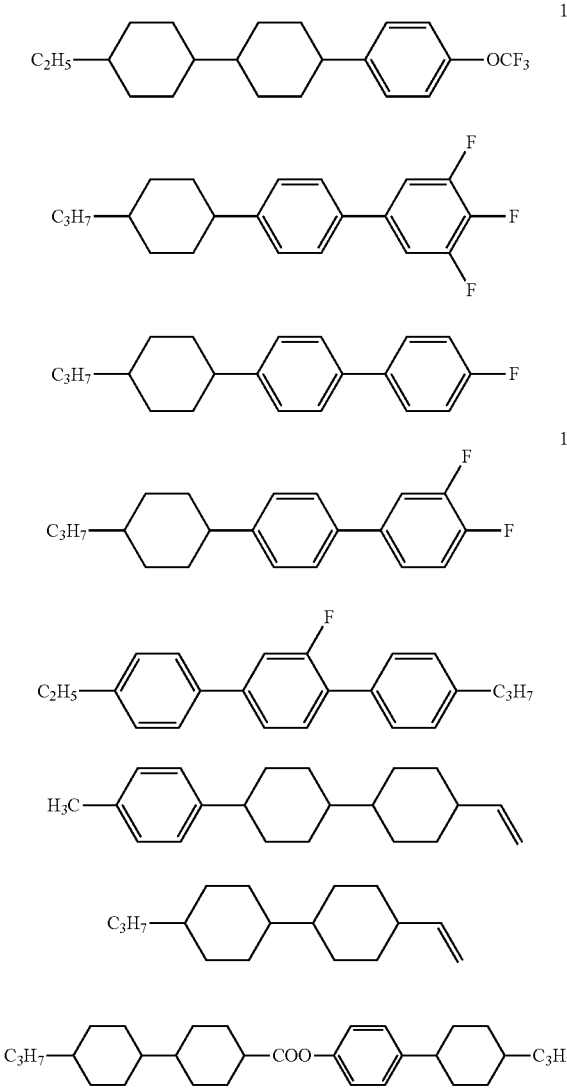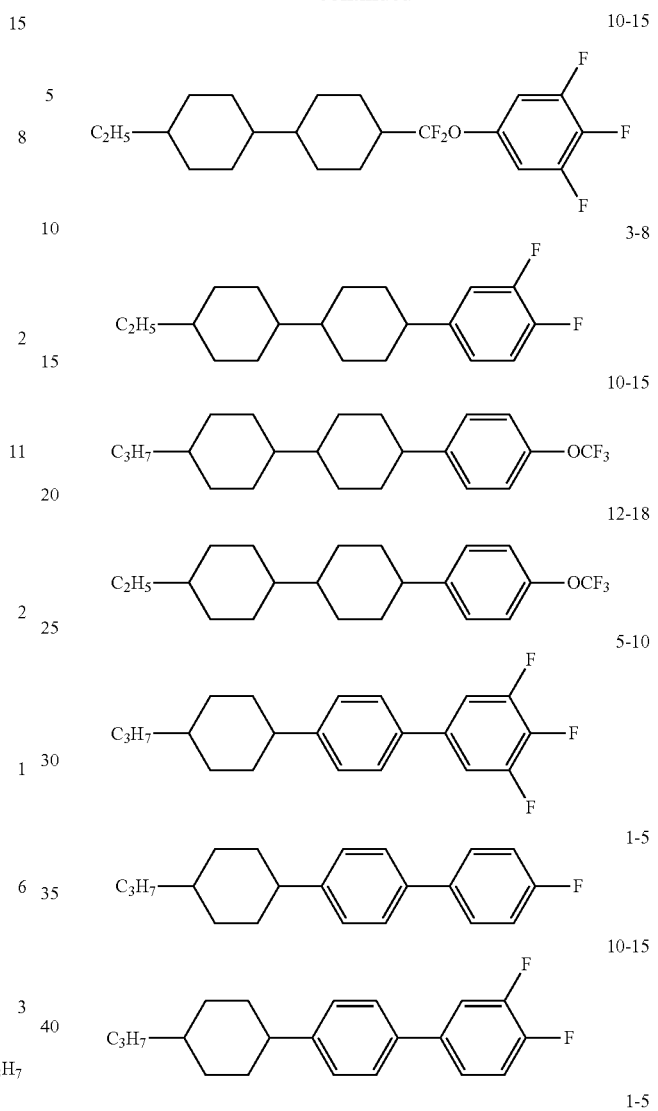
said liquid crystal composition t comprises or consists of the following various components in parts by mass:
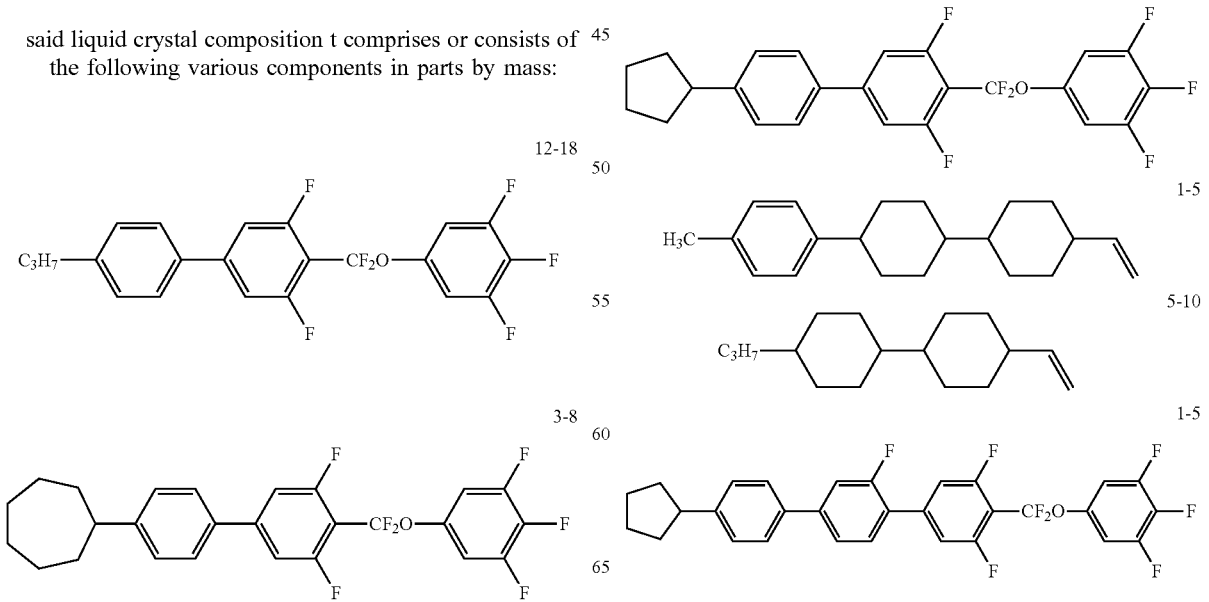

said liquid crystal composition t particularly comprises or consists of the following various components in parts by mass:
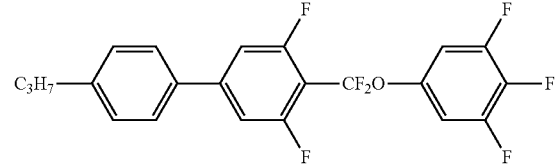
15
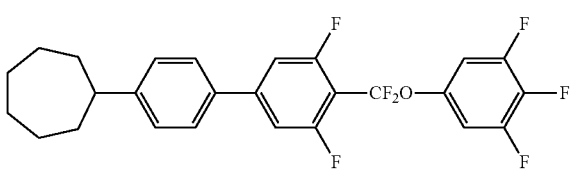
5
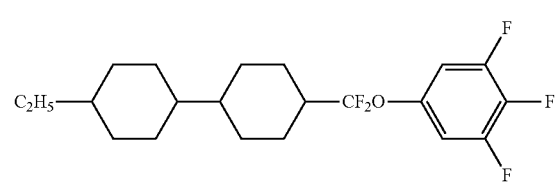
14
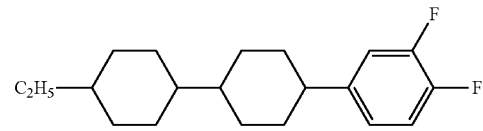
5
13
15
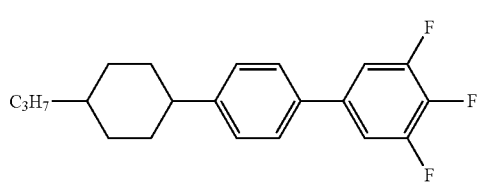
8
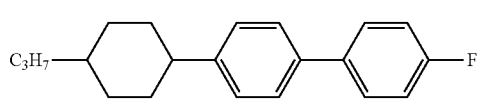
2
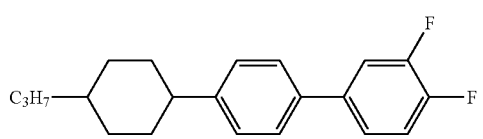
11
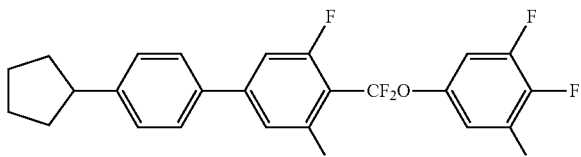
2
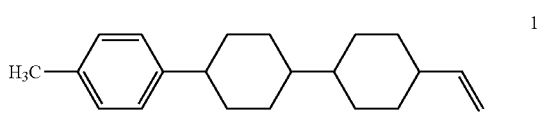
1
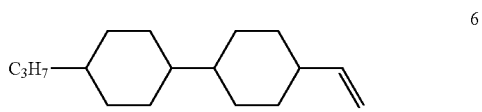
6
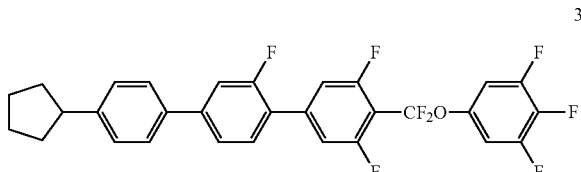
3
said liquid crystal composition u comprises or consists of the following various components in parts by mass:
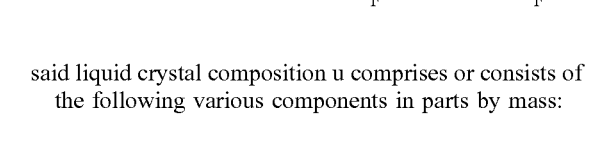
10-15
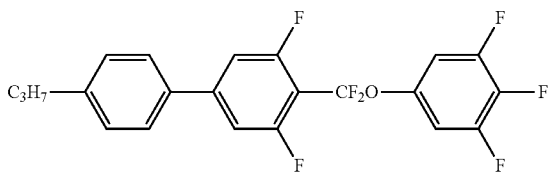
5-10
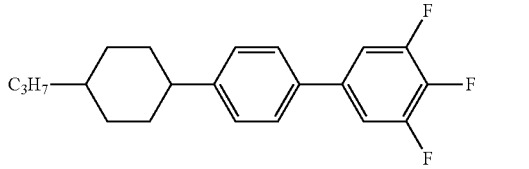
5-10
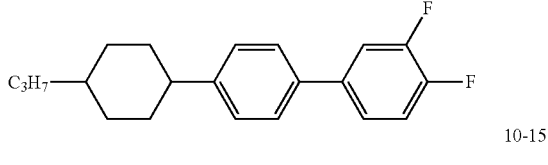
10-15
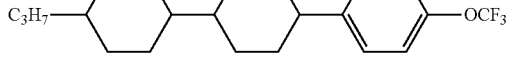
12-18
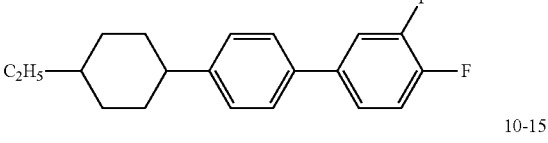
10-15

-continued

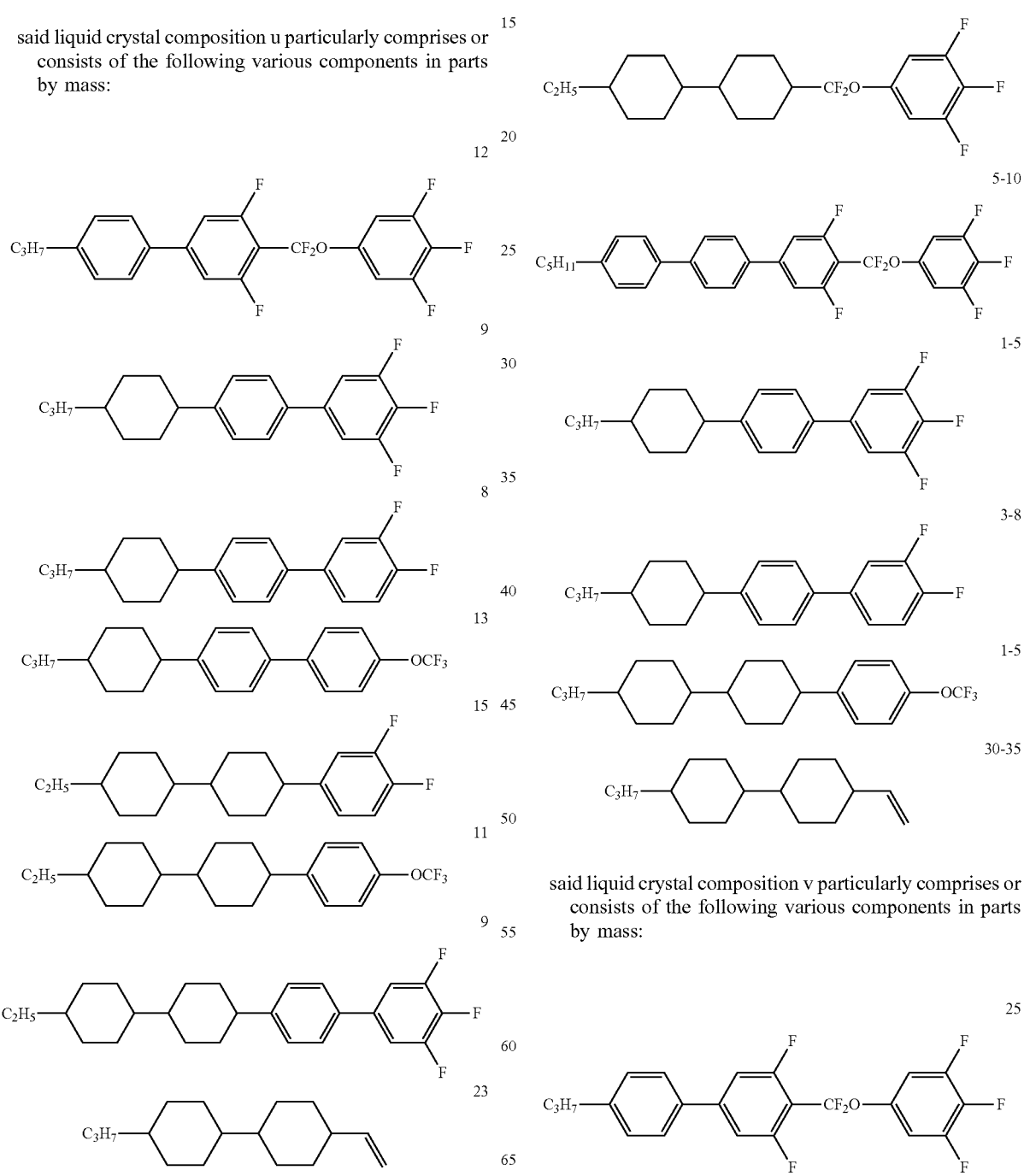

said liquid crystal composition u particularly comprises or consists of the following various components in parts by mass:

said liquid crystal composition v comprises or consists of the following various components in parts by mass:

said liquid crystal composition v particularly comprises or consists of the following various components in parts by mass:

-continued

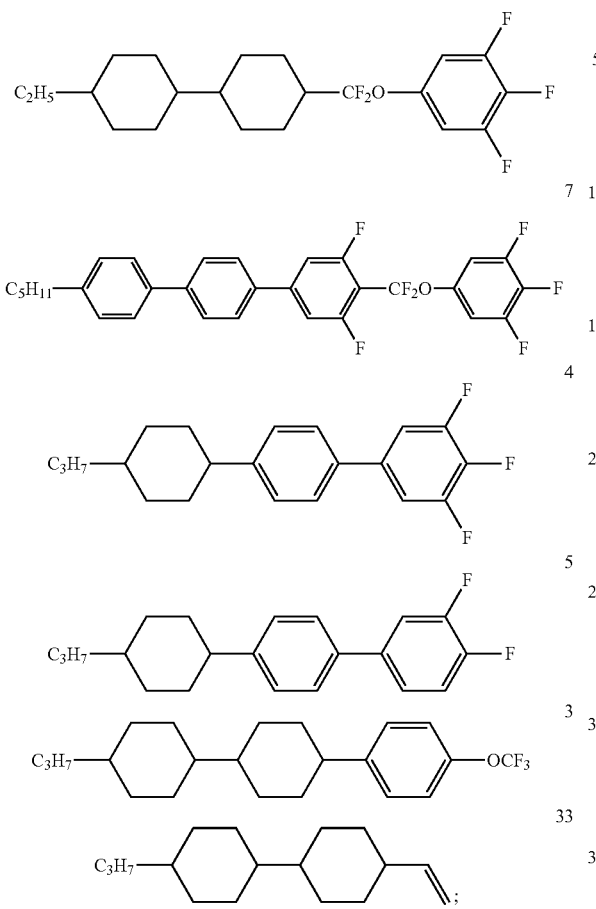

| | |
|---|---|
| | 23 |
| | 5 |
| | 7 |
| | 10 |
| | 4 |
| | 20 |
| | 5 |
| | 25 |
| | 3 |
| | 30 |
| | 33 |
| | 35 | and
said liquid crystal composition w comprises or consists of the following various components in parts by mass:

| | |
|---|---|
| | 18-22 |
| | 45 |
| | 18-22 |
| | 55 |
| | 5-10 |

-continued

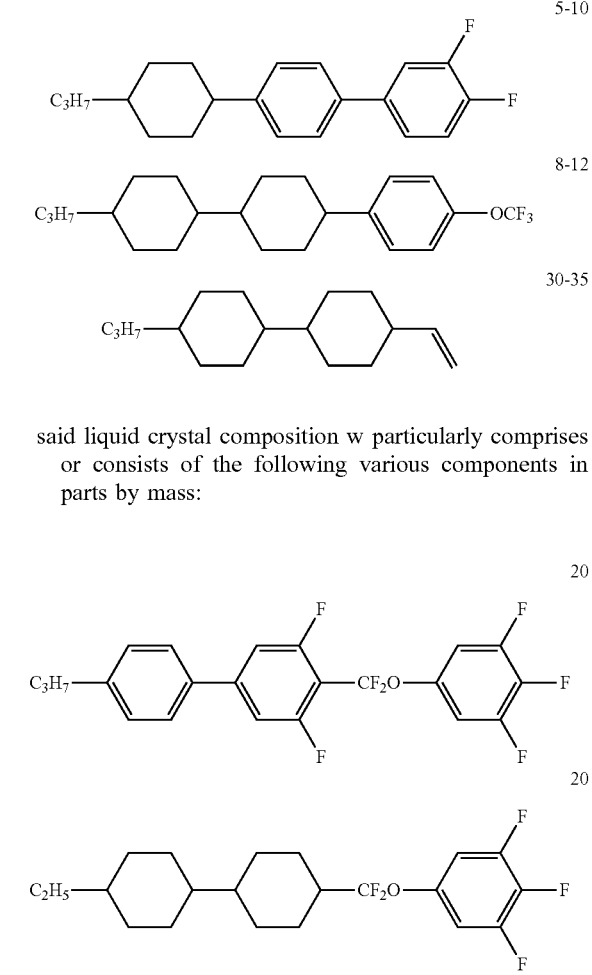

| | |
|---|---|
| | 5-10 |
| | 8-12 |
| | 30-35 | said liquid crystal composition w particularly comprises or consists of the following various components in parts by mass:

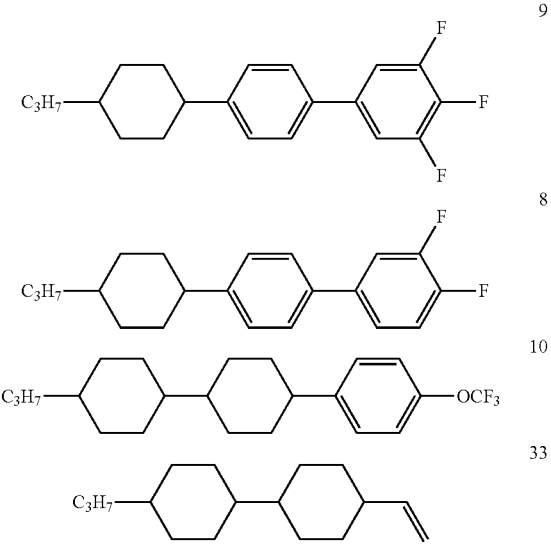

| | |
|---|---|
| | 20 |
| | 20 |
| | 9 |
| | 8 |
| | 10 |
| | 33 |

In addition, liquid crystal display elements or liquid crystal displays comprising the above compositions provided by the present invention also fall within the scope of protection of the present invention, wherein said display elements or displays are active matrix display elements or displays or passive matrix display elements or displays; and said active matrix display elements or displays are particularly TN-TFT or IPS-TFT liquid crystal display elements or displays.

The liquid crystal composition of the present invention can be produced by mixing two or more liquid crystal compounds using a conventional method, e.g., the preparation by a method of mixing and dissolving different components with each other at a high temperature, wherein the liquid crystal composition is dissolved in a solvent for dissolving the compounds and mixed, and then the solvent is distilled under a reduced pressure; or the liquid crystal composition of the present invention can be prepared according to a conventional preparation method.

PARTICULAR EMBODIMENTS

The present invention is further illustrated in combination with particular embodiments below, but the following embodiments are examples of the present invention, the present invention being not limited to the following embodiments. Without departing from the subject matter or scope of the present invention, liquid crystal compositions with different threshold values, clearing points and birefringence properties may be obtained by adjustment, modification or improvement of the contents of various components within the liquid crystal composition of the present invention, which would be obvious to a person skilled in the art. If not particularly specified, said methods are all conventional methods.

The various components used in the following embodiments can all be synthesized by commonly known methods or obtained by commercial approaches. The synthesis techniques are conventional, and the obtained various liquid crystal compounds are tested to be complied with standards of electronic compounds.

Liquid crystal compositions are prepared at the ratios, as specified in the following embodiments, of the various liquid crystal compositions. The preparation of said liquid crystal compositions is performed according to conventional methods in the art, e.g., by means of heating, ultrasound, suspension, etc., at the specified ratios.

The liquid crystal compositions provided in the following embodiments are prepared and studied. In addition, they are filled between two substrates of a liquid crystal display for a performance test, and the composition of each liquid crystal composition and test results of performance parameters thereof are shown as below.

The percentages in the present invention are weight percentages, and the temperature is degree Celsius (° C.). Unless otherwise specified, the particular meanings of other symbols and test conditions are as follows:

Cp (° C.) represents the clearing point of a liquid crystal.

Δn represents the optical anisotropy, no is the refractive index of ordinary light, ne is the refractive index of extraordinary light, and the test conditions are 589 nm and 25° C.

Δε is the dielectric anisotropy, $\Delta\varepsilon = -\varepsilon/-\varepsilon\perp$, wherein ε/ is a dielectric constant parallel to the molecular axis, ε⊥ is a dielectric constant perpendicular to the molecular axis; and the test conditions are 25° C., 1 KHz, HP4284A, and a 4.0 micronmeter TN left-handed cell.

$V_{10}$ is an optical threshold voltage of a liquid crystal [v], $V_{90}$ is a saturation voltage value of a liquid crystal [v], and the test conditions are a 4.0 micronmeter TN left-handed box, and 25° C.

The computational method for the change rate of contrast ratio Cr % is: (contrast ratio at normal temperature 25° C.−contrast ratio at a low temperature−20° C.)/contrast ratio at normal temperature 25° C.*100%.

Change rates of contrast ratio measured in the following embodiments are all calculated based on the contrast ratios at temperatures of normal temperature 25° C. and a low temperature −20° C., but not limited to these temperatures, temperatures within a range of from 60° C. to −40° C. all falling within the encompassed scope of the present patent. The test instrument is DMS 501 in all the cases.

The chiral agent used in each of the following examples is

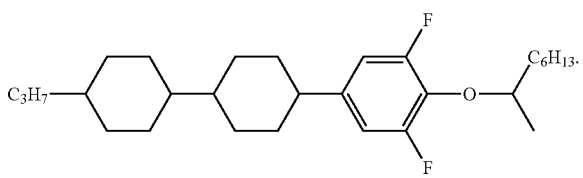

Example 1

The liquid crystal composition a provided by the present invention is obtained by uniformly mixing various components in the following parts by weight:

subordinate to formula I1

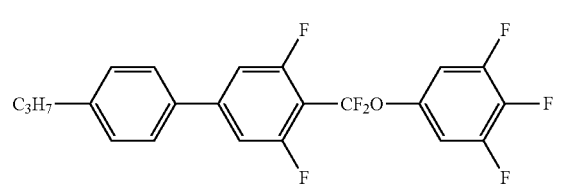

subordinate to formula I8

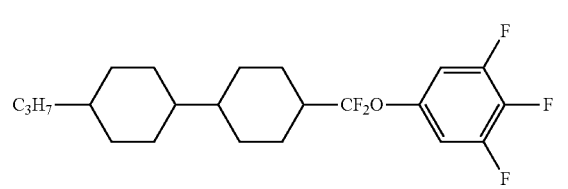

subordinate to formula I8

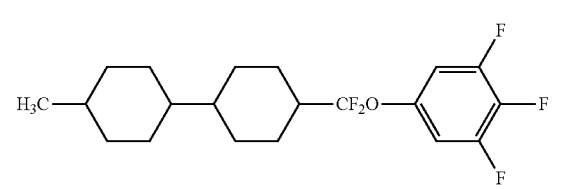

subordinate to formula II-1

[chemical structure: C3H7-cyclohexyl-cyclohexyl-phenyl(3,4,5-trifluoro)]

subordinate to formula II-4

[chemical structure: C3H7-cyclohexyl-phenyl-phenyl(3,4,5-trifluoro)]

subordinate to formula III-3

[chemical structure: H3C-phenyl-cyclohexyl-cyclohexyl-vinyl]

subordinate to formula III-1

[chemical structure: C3H7-cyclohexyl-cyclohexyl-vinyl]

subordinate to formula II-3

[chemical structure: C2H5-phenyl-phenyl(2-F)-phenyl-C3H7]

subordinate to formula V-6

[chemical structure: C3H7-cyclohexyl-cyclohexyl-COO-phenyl-cyclohexyl-C3H7]

subordinate to formula II-6

[chemical structure: C3H7-cyclohexyl-cyclohexyl-phenyl(2-F)-phenyl(3,4,5-trifluoro)]

and
a chiral agent 0.18
The properties of the composition are as shown below:
Δn: 0.100;
cp [° C.]: 95° C.;
Δε: 10.5;
$V_{10}[v]$: 1.43; and
Cr %: 8%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Comparative Example 1

[chemical structure: C3H7-cyclohexyl-cyclohexyl-CF2O-phenyl(3,4,5-trifluoro)]

In example 1, is replaced by the same percent by weight of is

[chemical structure: C2H5-cyclohexyl-cyclohexyl-phenyl(3,4,5-trifluoro)]

[chemical structure: H3C-cyclohexyl-cyclohexyl-CF2O-phenyl(3,4,5-trifluoro)]

replaced by the same percent by weight of

[chemical structure: C4H9-cyclohexyl-cyclohexyl-phenyl(3,4,5-trifluoro)]

and the other components are not changed to obtain a liquid crystal composition; and
the properties of the composition are as shown below:
Δn: 0.111;
cp [° C.]: 95° C.;
Δε: 10.3;
$V_{10}[v]$: 1.46; and
Cr %: 40%.

It can be seen from the above that the change rate of normal temperature-low temperature contrast ratio of the liquid crystal composition is poorer (namely, the change rate is larger), and therefore there is no advantage with regard to a TN mode display requiring a higher change rate of contrast ratio.

Example 2

The liquid crystal composition b provided by the present invention is obtained by uniformly mixing various components in the following parts by weight:

subordinate to formula I11                                             15

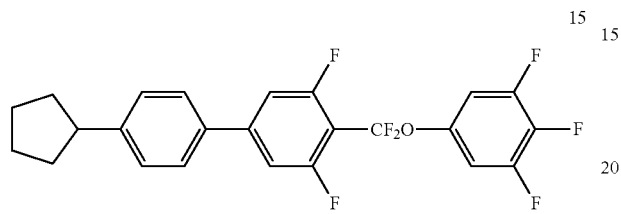

subordinate to formula I36                                             9

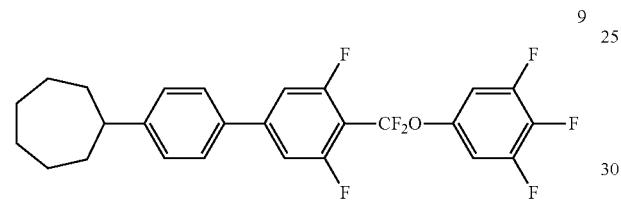

subordinate to formula II-1                                            11

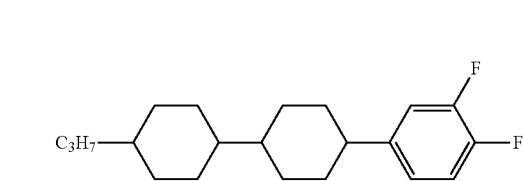

subordinate to formula II-1                                            18

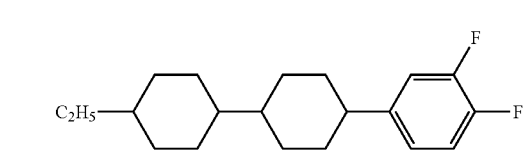

subordinate to formula II-1                                            18

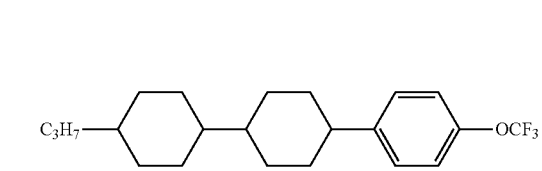

subordinate to formula II-1                                            15

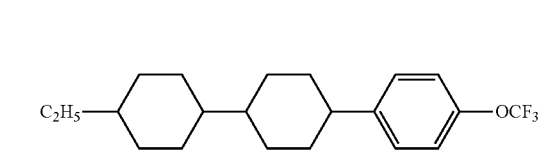

subordinate to formula II-1                                            2

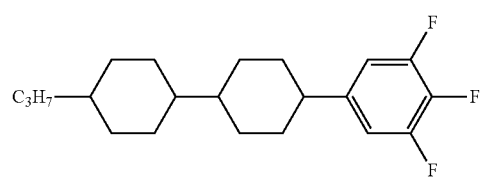

subordinate to formula II-4                                            7

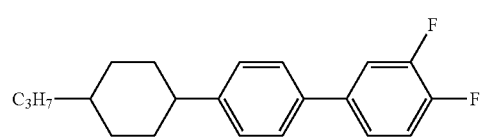

subordinate to formula III-1                                           6

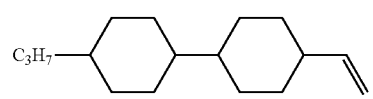

subordinate to formula V6                                              6

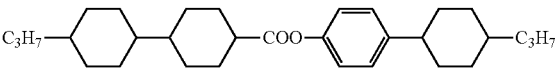

a chiral agent 0.13

The properties of the composition are as shown below:
Δn: 0.100;
cp [° C.]: 97° C.;
Δε: 10.5;
$V_{10}[v]$: 1.43; and
Cr %: 12%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Comparative Example 2

In example 2,

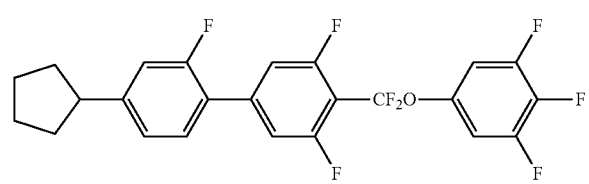

is replaced by the same percent by weight of

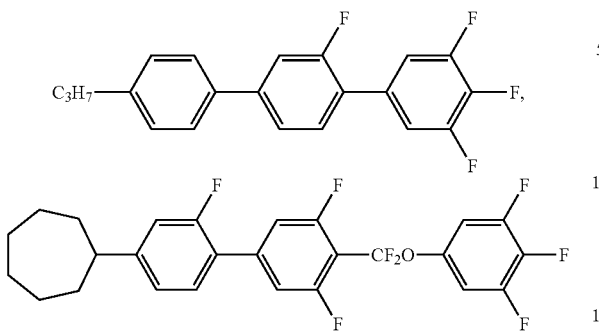

is replaced by the same percent by weight of

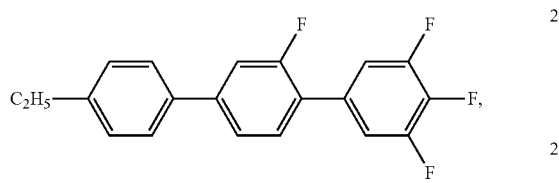

and the other components are not changed to obtain a liquid crystal composition; and
The properties of the composition are as shown below:
Δn: 0.110;
cp [° C.]: 97° C.;
Δε: 10.5;
$V_{10}$[v]: 1.42; and
Cr %: 42%.

It can be seen from the above that the change rate of normal temperature-low temperature contrast ratio of this liquid crystal composition is poorer (namely, the change rate is larger), and therefore there is no advantage with regard to a TN mode display requiring a higher change rate of contrast ratio.

Example 3

The liquid crystal composition c provided by the present invention is obtained by uniformly mixing various components in the following parts by weight:

subordinate to formula I1      10

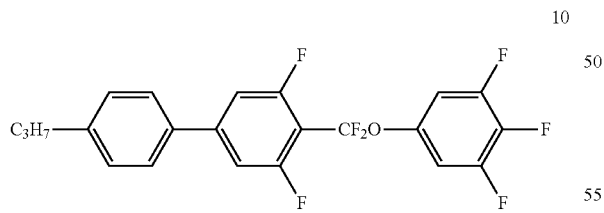

subordinate to formula I8

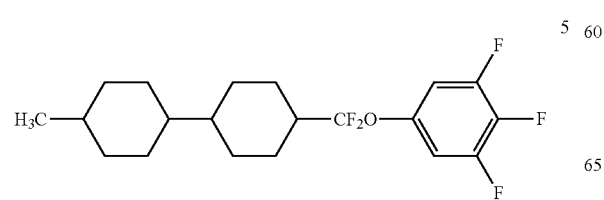       5 subordinate to formula I8      15

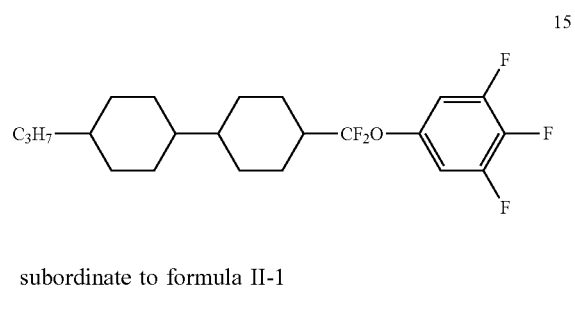

subordinate to formula II-1

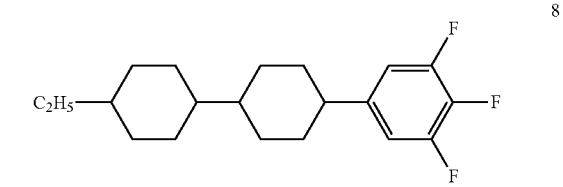       8 subordinate to formula II-1

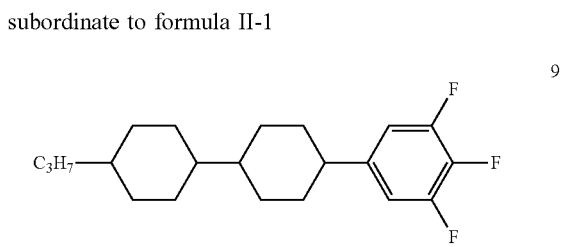       9 subordinate to formula II-4

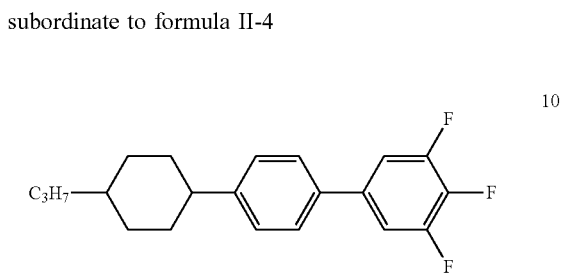       10 subordinate to formula II-4

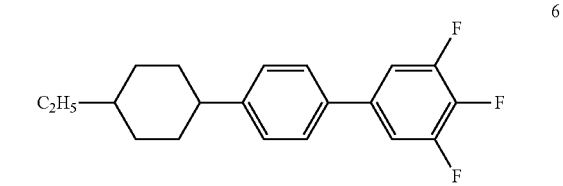       6 subordinate to formula II-3

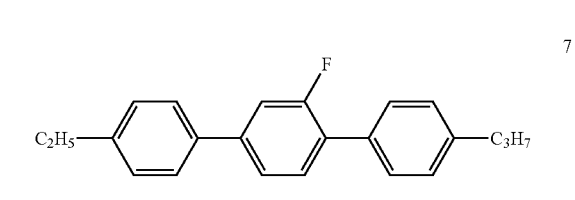       7 subordinate to formula III-3 4

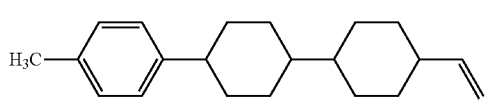

subordinate to formula III-1 17

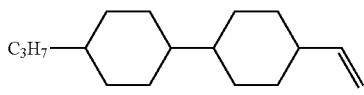

subordinate to formula V-6 5

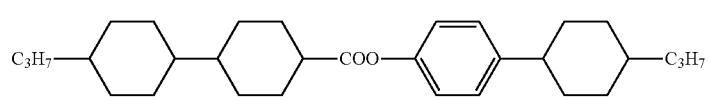

subordinate to formula V-6 4

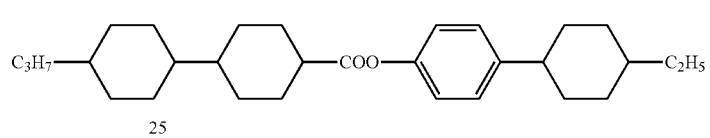

a chiral agent 0.25

The properties of the composition are as shown below:
Δn: 0.100;
cp [° C.]: 95° C.;
Δε: 11.2;
$V_{10}[v]$: 1.40; and
Cr %: 15%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Example 4

The liquid crystal composition d provided by the present invention is obtained by uniformly mixing various components in the following parts by weight:

subordinate to formula I11 23

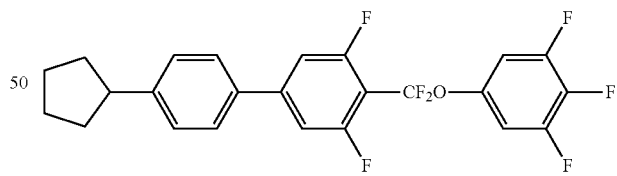

subordinate to formula I14 3

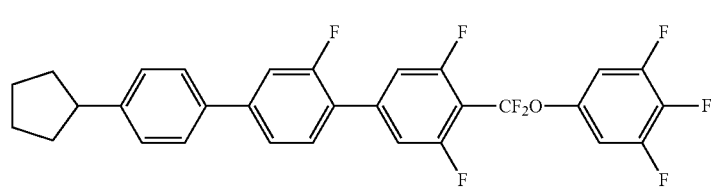

subordinate to formula II-1                11

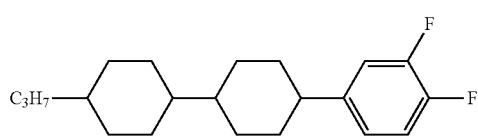

subordinate to formula II-1                17

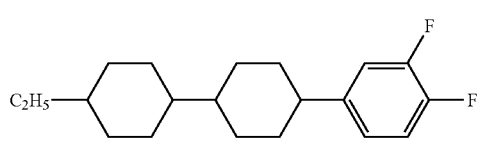

subordinate to formula II-1                11

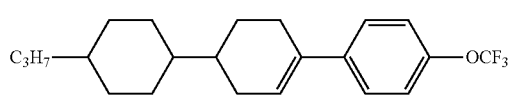

subordinate to formula II-1                15

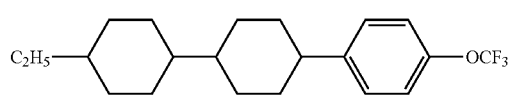

subordinate to formula II-3

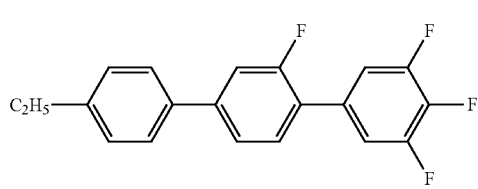

subordinate to formula II-4                4

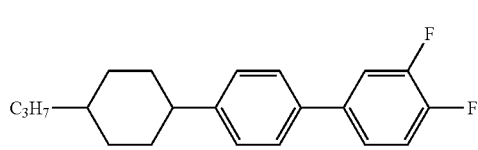

subordinate to formula III-1               10

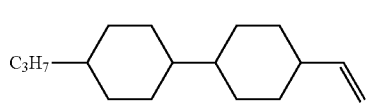

subordinate to formula V-6                 5

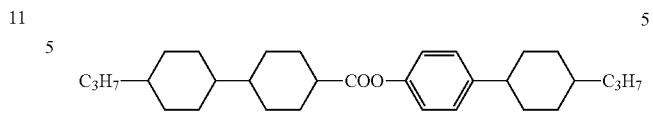

a chiral agent 0.18

The properties of the composition are as shown below:

Δn: 0.100;

cp [° C.]: 91° C.;

Δε: 11.2;

$V_{10}[v]$: 1.39; and

Cr %: 14%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Example 5

The liquid crystal composition e provided by the present invention is obtained by uniformly mixing various components in the following parts by weight:

subordinate to formula I1                  12

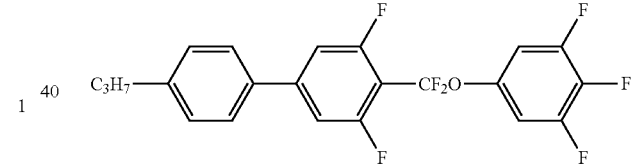

subordinate to formula I8                  20

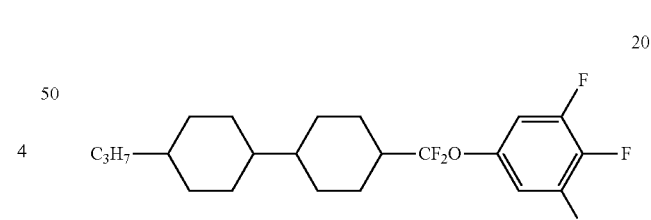

subordinate to formula II-1                12

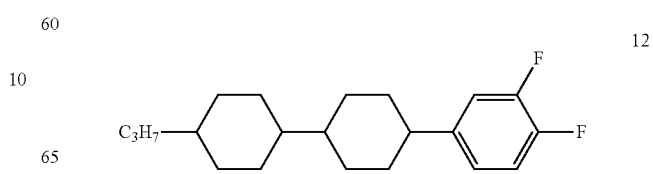

subordinate to formula II-1

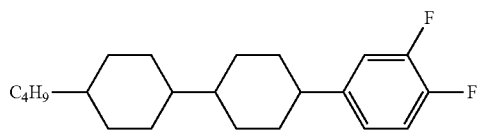

subordinate to formula II-1

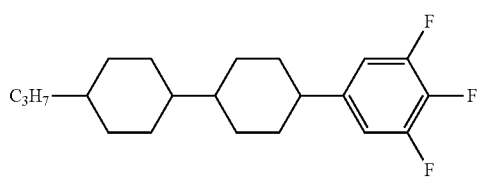

subordinate to formula II-4

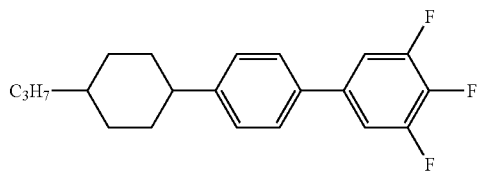

subordinate to formula II-3

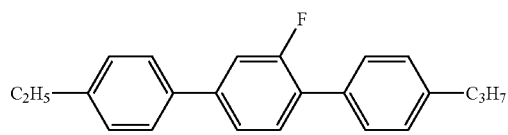

subordinate to formula III-3

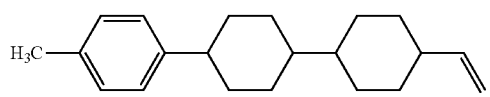

subordinate to formula III-4

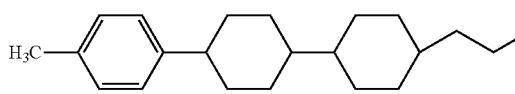

subordinate to formula III-1

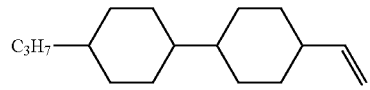

a chiral agent 0.31

The properties of the composition are as shown below:
Δn: 0.110;
cp [° C.]: 90° C.;
Δε: 10.4;
V$_{10}$[v]: 1.50; and
Cr %: 17%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Comparative Example 3

In example 5,

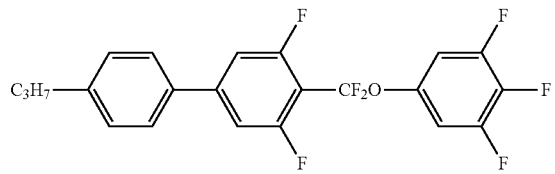

is replaced by the same percent by weight of

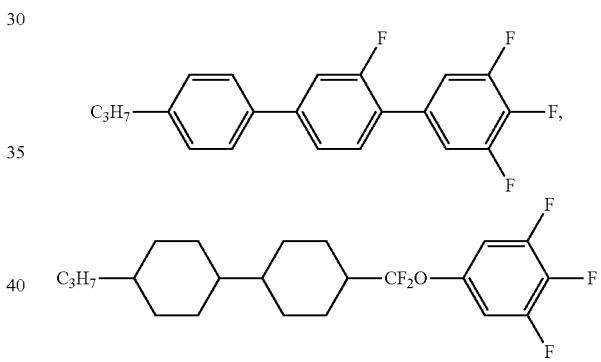

is replaced by the same percent by weight of

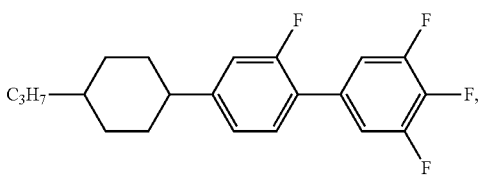

and the other components are not changed to obtain a liquid crystal composition; and The properties of the composition are as shown below:
Δn: 0.110;
cp [° C.]: 90° C.;
Δε: 10.4;
V$_{10}$[v]: 1.50; and
Cr %: 35%.

It can be seen from the above that the change rate of normal temperature-low temperature contrast ratio of this liquid crystal composition is poorer (namely, the change rate is larger), and therefore there is no advantage with regard to a TN mode display requiring a higher change rate of contrast ratio.

Example 6

The liquid crystal composition f provided by the present invention is obtained by uniformly mixing various components in the following parts by weight:

subordinate to formula I1    13

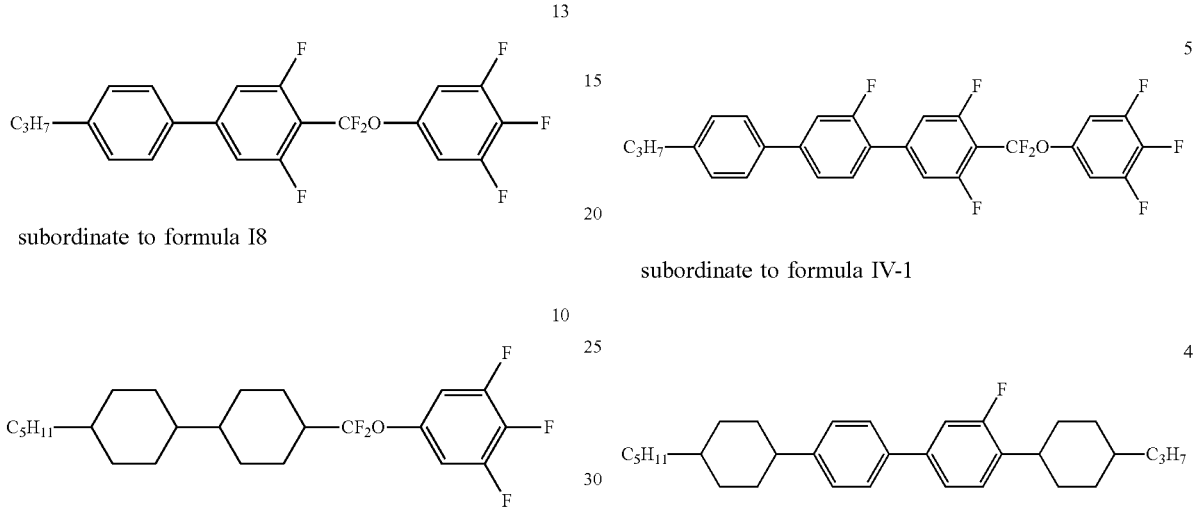

subordinate to formula I8    10 subordinate to formula I8    8 subordinate to formula II-7 subordinate to formula II-1    11 subordinate to formula   8 subordinate to formula II-3 subordinate to formula I5    7 subordinate to formula IV-1    5 subordinate to formula V-6    4 subordinate to formula V-6    3 subordinate to formula V-6    3 subordinate to formula II-11    3

1 subordinate to formula III-3 3

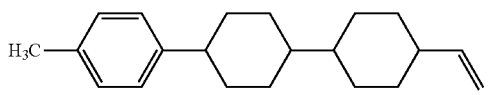

subordinate to formula III-1 10

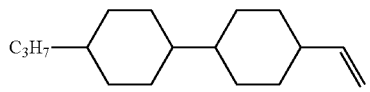
21 a chiral agent 0.27

The properties of the composition are as shown below:

Δn: 0.110;

cp [° C.]: 95° C.;

Δε: 10.4;

$V_{10}$[v]: 1.49; and

Cr %: 10%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Example 7

The liquid crystal composition g provided by the present invention is obtained by uniformly mixing various components in the following parts by weight:

subordinate to formula I11

15

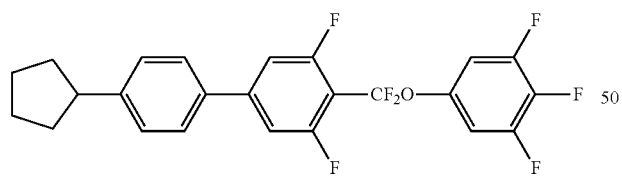

subordinate to formula I36

5

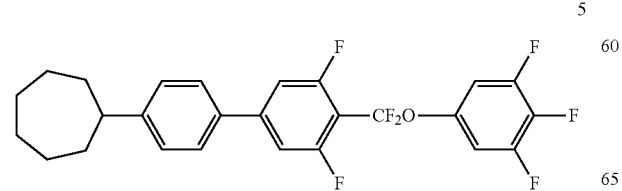

subordinate to formula II-1

14

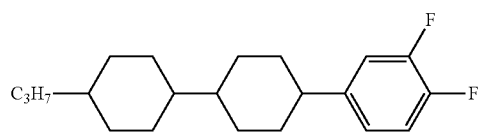

subordinate to formula II-1

5

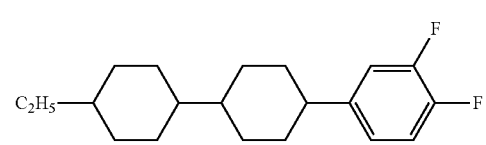

subordinate to formula II-1

13

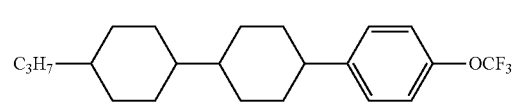

subordinate to formula II-1

15

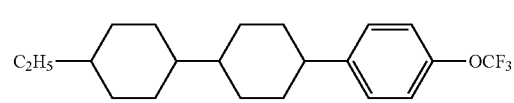

subordinate to formula II-4

8

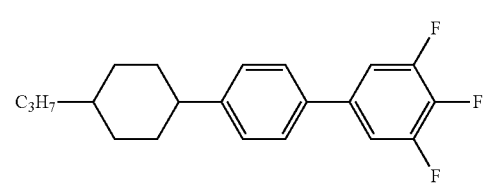

subordinate to formula II-4

2

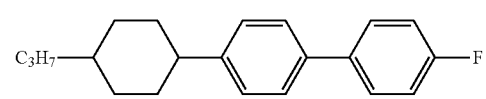

subordinate to formula II-4

11

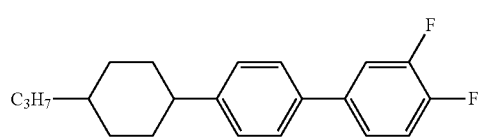

subordinate to formula II-3

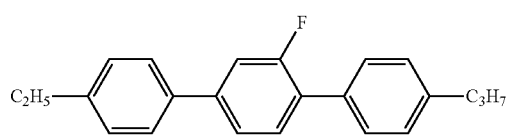
2 subordinate to formula III-3

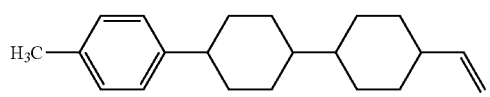
1 subordinate to formula III-1

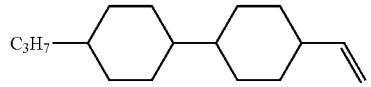
6 subordinate to formula V-6

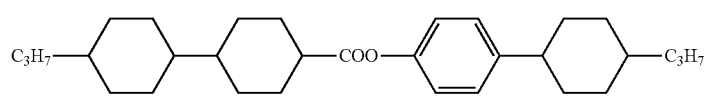
3 a chiral agent 0.28
The properties of the composition are as shown below:
Δn: 0.110;
cp [° C.]: 90° C.;
Δε: 10.5;
$V_{10}$[v]: 1.49; and
Cr %: 11%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Example 8

The liquid crystal composition h provided by the present invention is obtained by uniformly mixing various components in the following parts by weight:
subordinate to formula I1

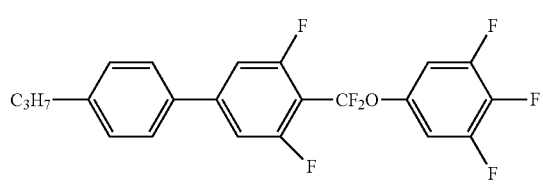
10 subordinate to formula II-1

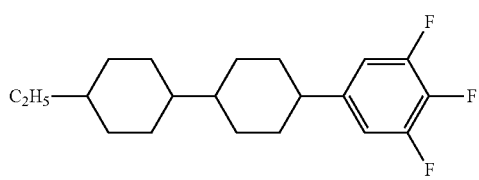
3 subordinate to formula II-1

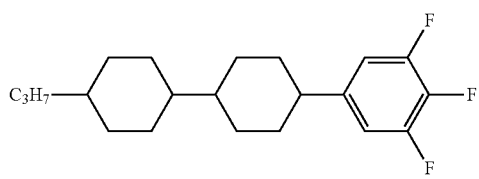
6 subordinate to formula II-7

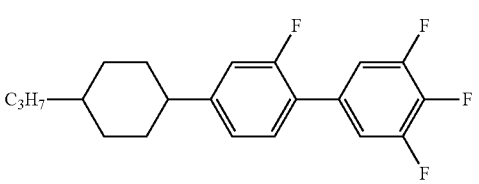
15 subordinate to formula II-6

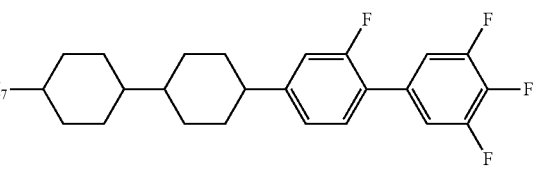
4 subordinate to formula II-5

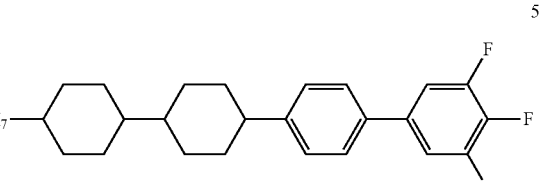
5 subordinate to formula II-5

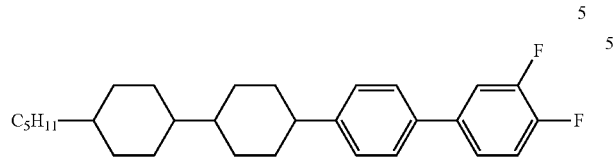

subordinate to formula II-5

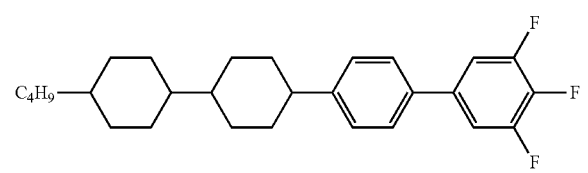

subordinate to formula III-4

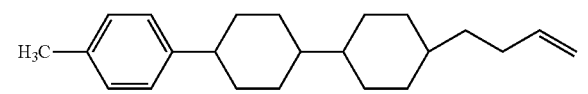

subordinate to formula III-3

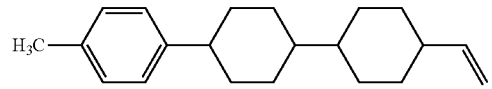

subordinate to formula III-2

subordinate to formula III-1

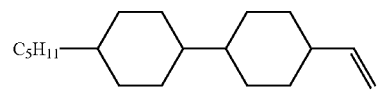

a chiral agent 0.16
The properties of the composition are as shown below:
Δn: 0.100;
cp [° C.]: 100° C.;
Δε: 7.7;
$V_{10}[v]$: 1.73; and
Cr %: 22%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Comparative Example 4

10 parts by weight of the

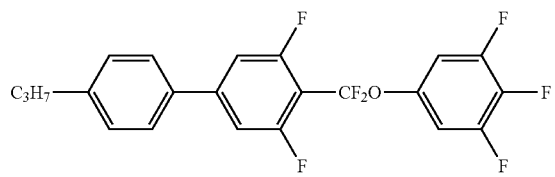

in example 8 is replaced by 6 parts by weight of

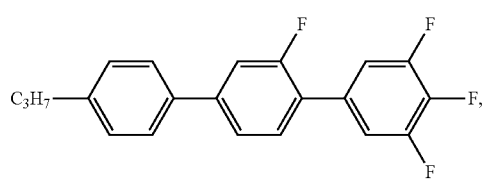

and the part by weight of

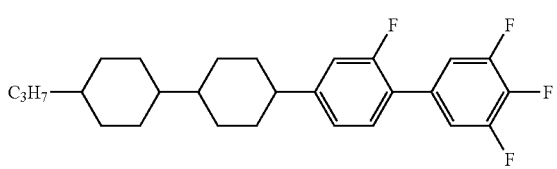

is changed to 8 to obtain a liquid crystal composition;
The properties of the composition are as shown below:
Δn: 0.100;
cp [° C.]: 100° C.;
Δε: 7.7;
$V_{10}[v]$: 1.73; and
Cr %: 50%.

It can be seen from the above that the change rate of normal temperature-low temperature contrast ratio of this liquid crystal composition is poorer (namely, the change rate is larger), and therefore there is no advantage with regard to a TN mode display requiring a higher change rate of contrast ratio.

Example 9

The liquid crystal composition i provided by the present invention is obtained by uniformly mixing various components in the following parts by weight:
subordinate to formula I8

12

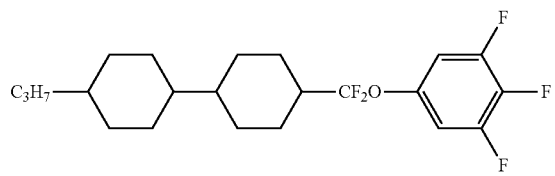

subordinate to formula II-1

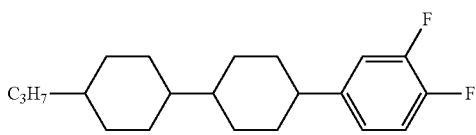

subordinate to formula II-1

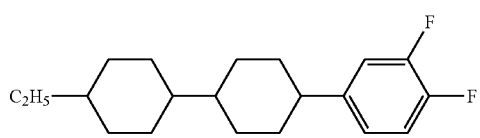

subordinate to formula II-4

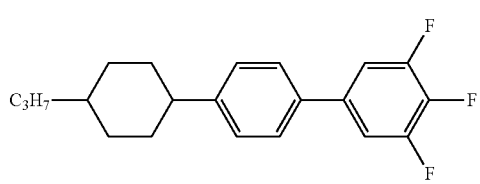

subordinate to formula II-3

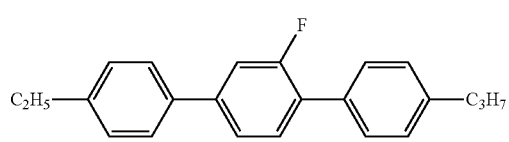

subordinate to formula II-1

subordinate to formula V-6

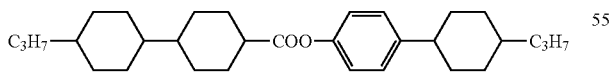

subordinate to formula V-6

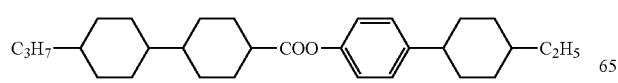

6

10

3

3 subordinate to formula III-2

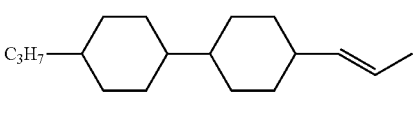

subordinate to formula III-1

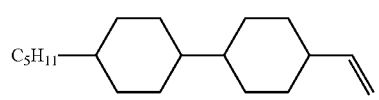

subordinate to formula III-3

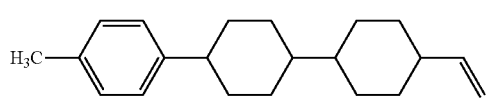

a chiral agent 0.19
The properties of the composition are as shown below:
$\Delta n$: 0.095;
cp [° C.]: 110° C.;
$\Delta \varepsilon$: 5.6;
$V_{10}[v]$: 2.05; and
Cr %: 20%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Comparative Example 5

The

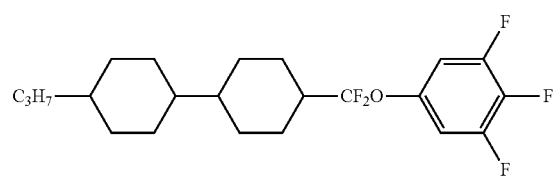

in example 9 is replaced by the same part by weight of

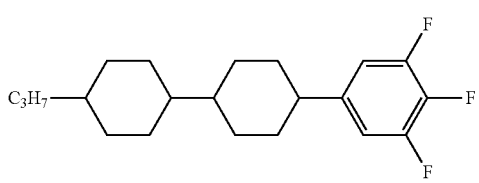

to obtain a liquid crystal composition;
The properties of the composition are as shown below:
$\Delta n$: 0.095;
cp [° C.]: 110° C.;
$\Delta \varepsilon$: 5.6;
$V_{10}[v]$: 2.05; and
Cr %: 50%.

5

18

11

It can be seen from the above that the change rate of normal temperature-low temperature contrast ratio of this liquid crystal composition is poorer (namely, the change rate is larger), and therefore there is no advantage with regard to a TN mode display requiring a higher change rate of contrast ratio.

Example 10

The liquid crystal composition j provided by the present invention is obtained by uniformly mixing various components in the following parts by weight:

subordinate to formula I1

15

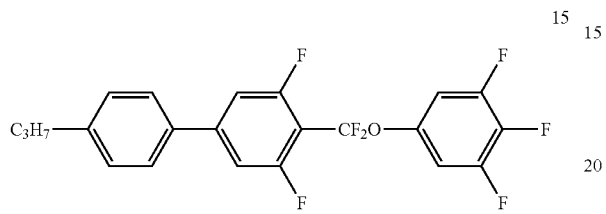

subordinate to formula II-1

8

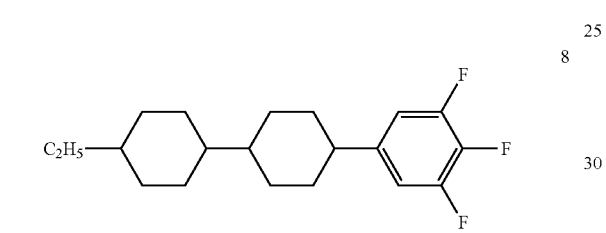

subordinate to formula II-1

3

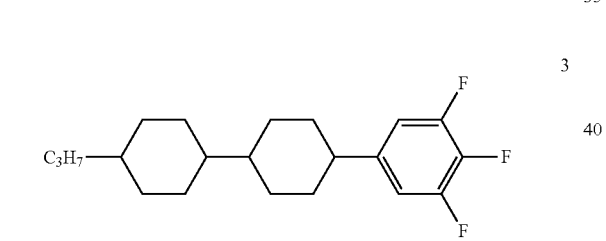

subordinate to formula II-1

3

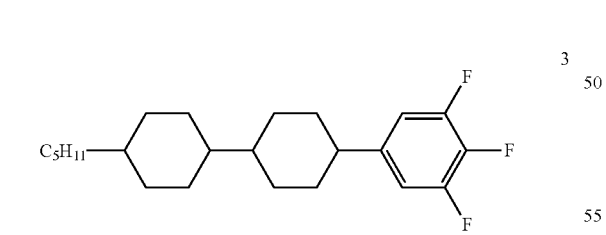

subordinate to formula II-1

10

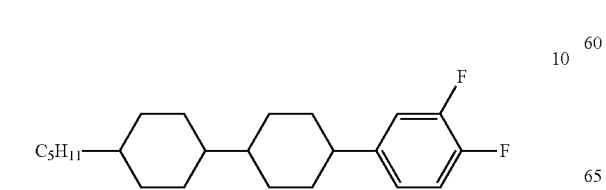

subordinate to formula II-1

11

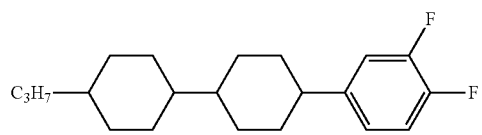

subordinate to formula II-1

10

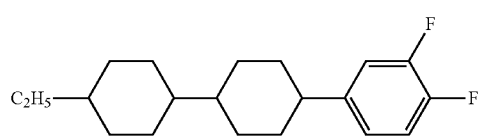

subordinate to formula II-1

10

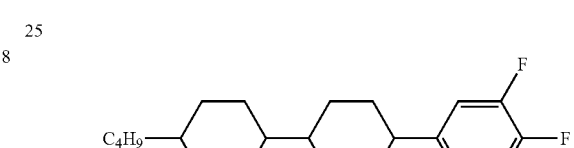

subordinate to formula II-4

6

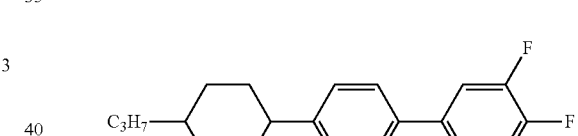

subordinate to formula II-4

6

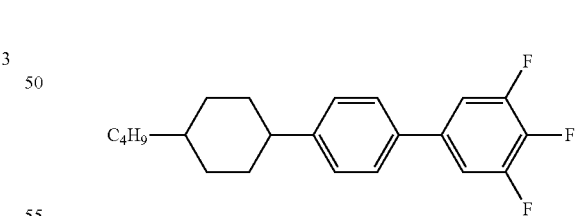

subordinate to formula V-2

10

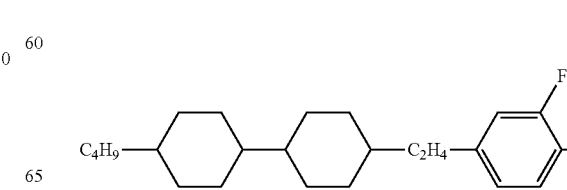

subordinate to formula III-10

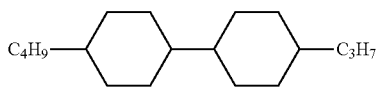

subordinate to formula II-5

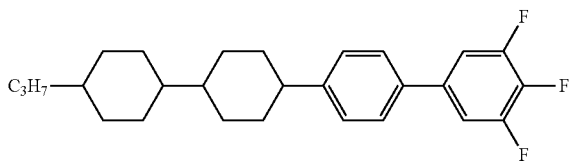

a chiral agent 0.34
The properties of the composition are as shown below:
Δn: 0.089;
cp [° C.]: 89° C.;
Δε: 9.4;
$V_{10}$[v]: 1.51; and
Cr %: 19%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Comparative Example 6

The

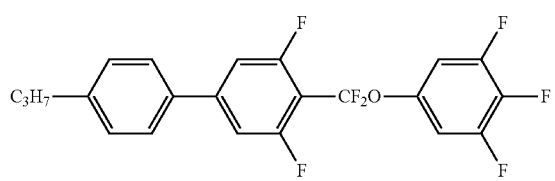

in example 10 is replaced by the same part by weight of

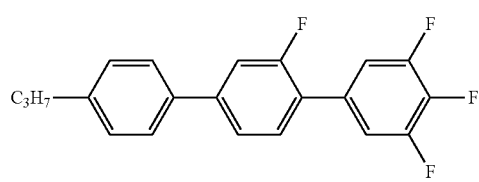

to obtain a liquid crystal composition;
The properties of the composition are as shown below:
Δn: 0.089;
cp [° C.]: 89° C.;
Δε: 9.4;
$V_{10}$[v]: 1.51; and
Cr %: 50%.

It can be seen from the above that the change rate of normal temperature-low temperature contrast ratio of this liquid crystal composition is poorer (namely, the change rate is larger), and therefore there is no advantage with regard to a TN mode display requiring a higher change rate of contrast ratio.

Example 11

The liquid crystal composition k provided by the present invention is obtained by uniformly mixing various components in the following parts by weight:
subordinate to formula I1

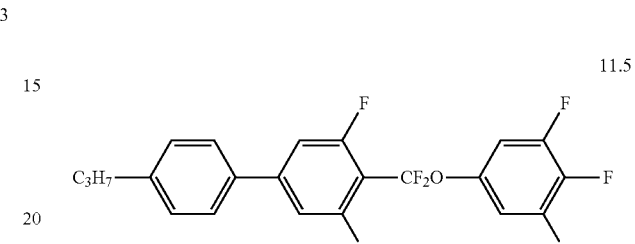

11.5 subordinate to formula II-4

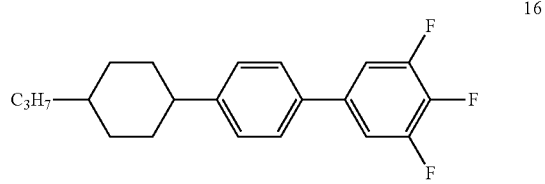

16 subordinate to formula II-3

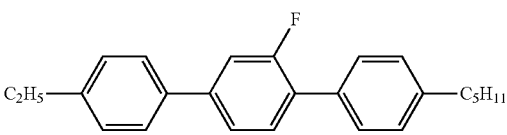

6 subordinate to formula II-3

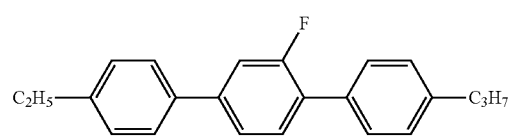

10 subordinate to formula II-5

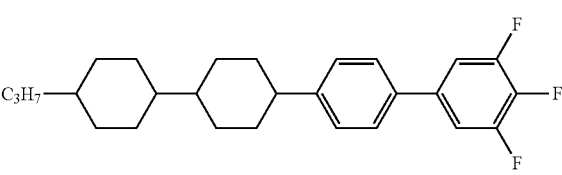

5 subordinate to formula II-5

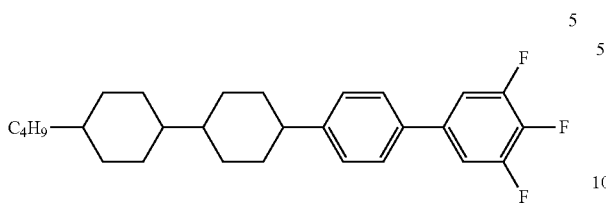

subordinate to formula III-1

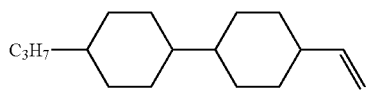

subordinate to formula III-1

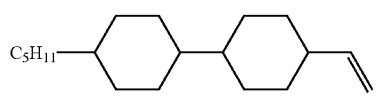

a chiral agent 0.16
The properties of the composition are as shown below:
Δn: 0.115;
cp [° C.]: 74° C.;
Δε: 6.8;
$V_{10}$[v]: 2.0; and
Cr %: 20%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Comparative Example 7

11.5 parts by weight of the

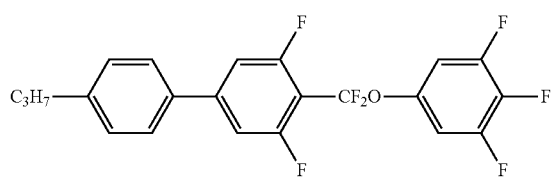

in example 11 is replaced by 8.5 parts by weight of and the part by weight of

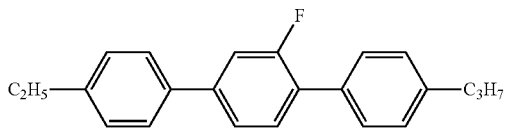

is changed to 13 to obtain a liquid crystal composition;
The properties of the composition are as shown below:
Δn: 0.115;
cp [° C.]: 74° C.;
Δε: 6.8;
$V_{10}$[v]: 2.0; and
Cr %: 52%.

It can be seen from the above that the change rate of normal temperature-low temperature contrast ratio of this liquid crystal composition is poorer (namely, the change rate is larger), and therefore there is no advantage with regard to a TN mode display requiring a higher change rate of contrast ratio.

Example 12

The liquid crystal composition 1 provided by the present invention is obtained by uniformly mixing various components in the following parts by weight:
subordinate to formula I8

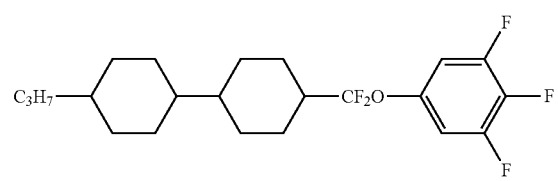

subordinate to formula II-1

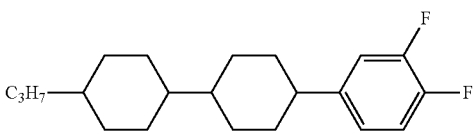

subordinate to formula II-1

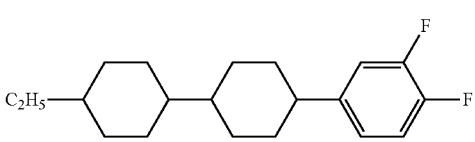

subordinate to formula II-1

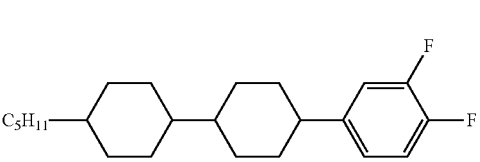

subordinate to formula II-4 26

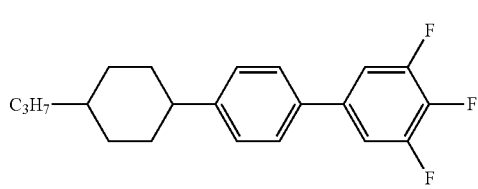

subordinate to formula II-1 4

subordinate to formula II-5 4

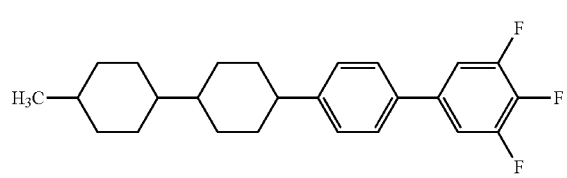

subordinate to formula II-5 4

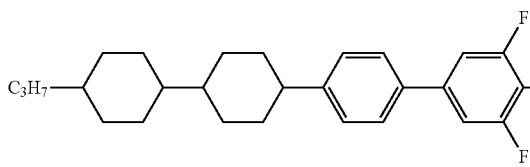

subordinate to formula II-5 3

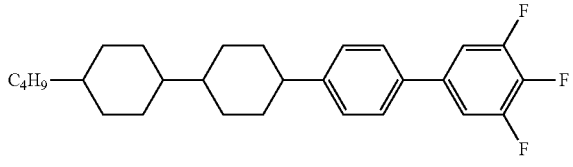

subordinate to formula III-2 5

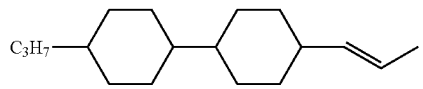

subordinate to formula III-1 18

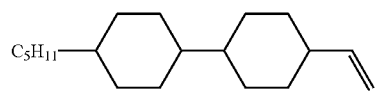

subordinate to formula III-3 4

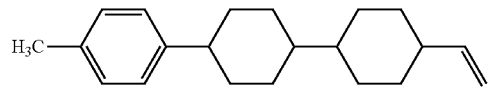

a chiral agent 0.45
The properties of the composition are as shown below:
Δn: 0.100;
cp [° C.]: 100° C.;
Δε: 7.7;
$V_{10}[v]$: 1.73; and
Cr %: 21%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Example 13

The liquid crystal composition m provided by the present invention is obtained by uniformly mixing various components in the following parts by weight:

subordinate to formula I1 20

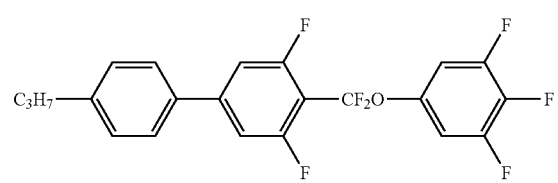

subordinate to formula II-4 2

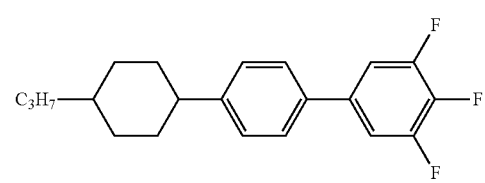

subordinate to formula II-3 6

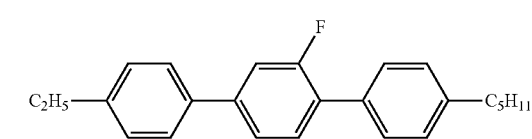

subordinate to formula II-3

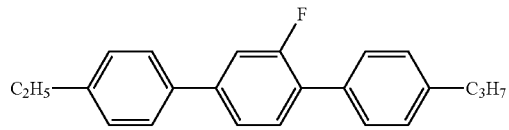

subordinate to formula II-3

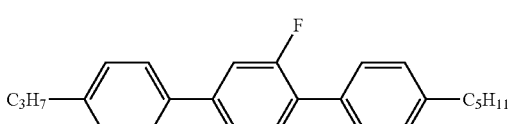

subordinate to formula II-4

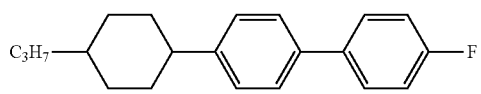

subordinate to formula II-4

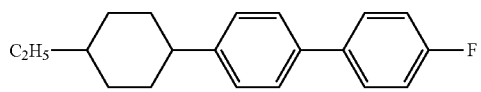

subordinate to formula II-4

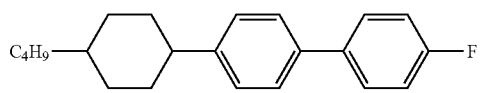

subordinate to formula III-3

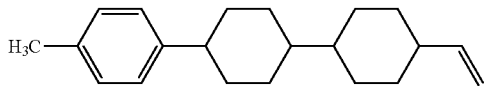

subordinate to formula III-1

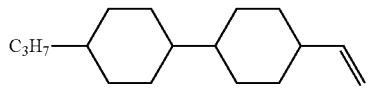

subordinate to formula III-1

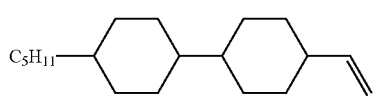

a chiral agent 0.17

The properties of the composition are as shown below:
Δn: 0.132;
cp [° C.]: 75° C.;
Δε: 5.0;
$V_{10}$[v]: 2.3; and
Cr %: 15%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Comparative Example 8

The

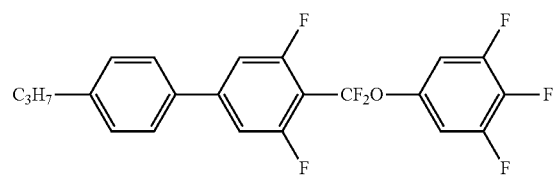

in example 13 is replaced by the same part by weight of

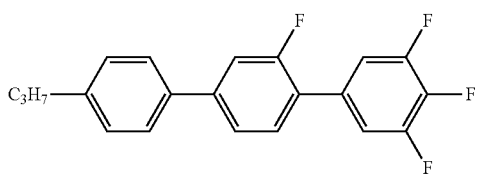

to obtain a liquid crystal composition;

The properties of the composition are as shown below:
Δn: 0.128;
cp [° C.]: 75° C.;
Δε: 5.0;
$V_{10}$[v]: 2.3; and
Cr %: 53%.

It can be seen from the above that the change rate of normal temperature-low temperature contrast ratio of this liquid crystal composition is poorer (namely, the change rate is larger), and therefore there is no advantage with regard to a TN mode display requiring a higher change rate of contrast ratio.

Example 14

The liquid crystal composition n provided by the present invention is obtained by uniformly mixing various components in the following parts by weight:

9

6

6

6

7

19.5

12.5

6

| 101 | 102 |
|---|---|
| subordinate to formula I1 | subordinate to formula V-6 |

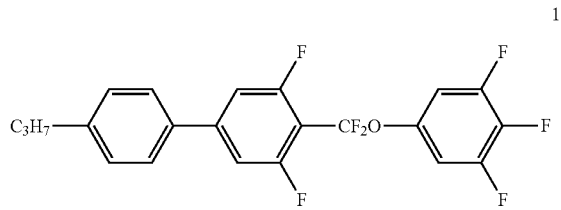

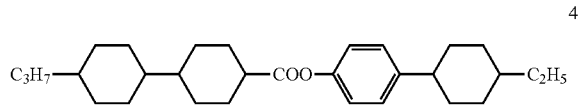 4 subordinate to formula I8 subordinate to formula II-5

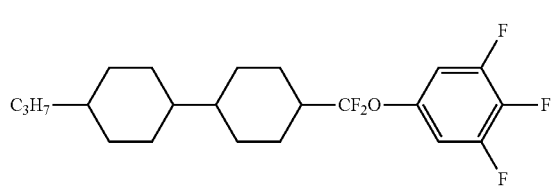

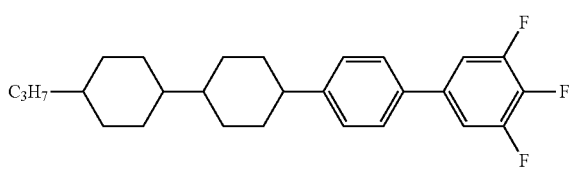 9 subordinate to formula I17 subordinate to formula IV-2

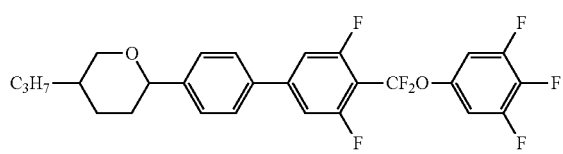

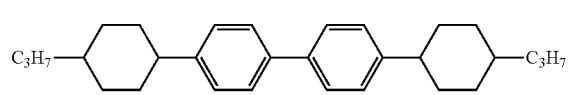 3 subordinate to formula II-9 subordinate to formula III-1

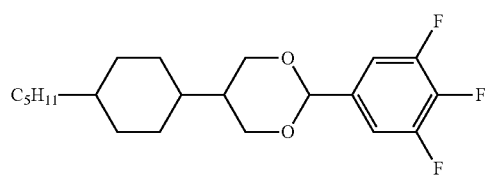

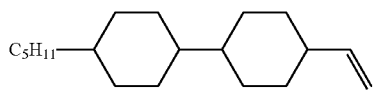 21.5 subordinate to formula II-9 subordinate to formula III-1

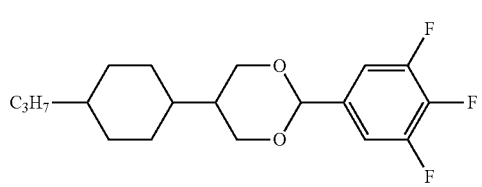

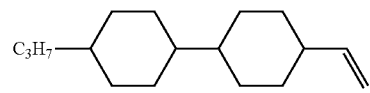 19.5 subordinate to formula II-1 a chiral agent 0.51

The properties of the composition are as shown below:

Δn: 0.088;

cp [° C.]: 87° C.;

Δε: 8.7;

Cr %: 6%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in IPS mode displays.

 4

Example 15

The liquid crystal composition o provided by the present invention is obtained by uniformly mixing various components in the following parts by weight:

subordinate to formula I8

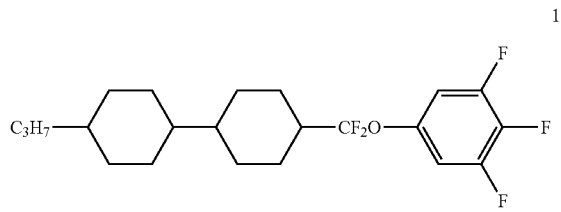

subordinate to formula I5

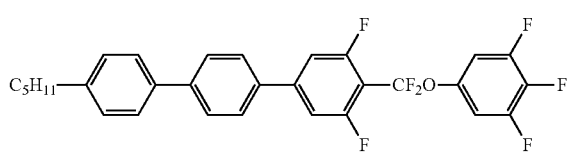

subordinate to formula I5

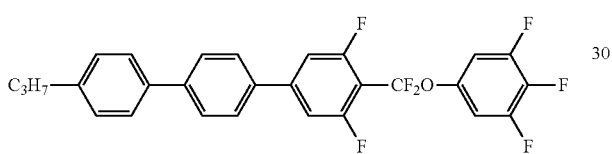

subordinate to formula I6

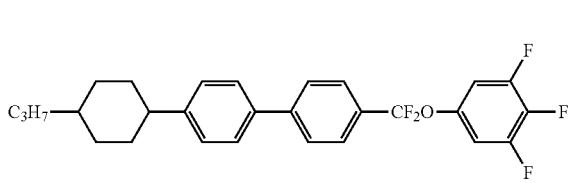

subordinate to formula II-1

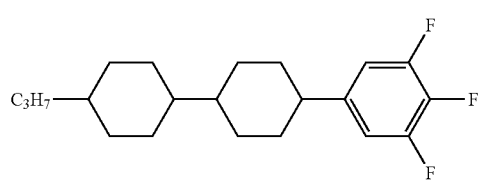

subordinate to formula V-6

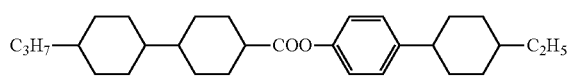

subordinate to formula II-5

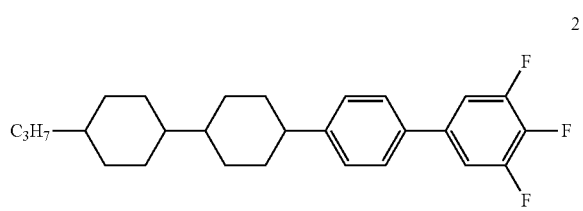

subordinate to formula II-5

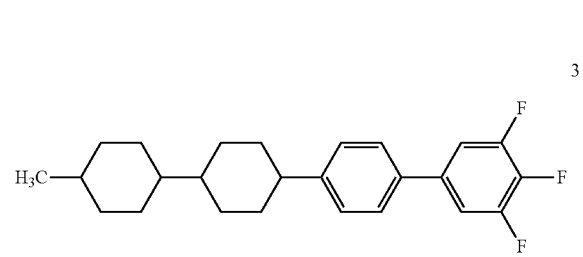 [SMILES: CC1CCC(C2CCC(c3ccc(-c4cc(F)c(F)c(F)c4)cc3)CC2)CC1]

subordinate to formula III-1

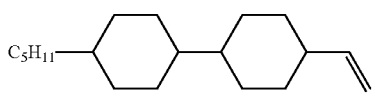

subordinate to formula III-1

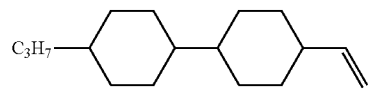

a chiral agent 0.52

The properties of the composition are as shown below:

Δn: 0.0910;

cp [° C.]: 100° C.;

Δε: 7.7;

Cr %: 8%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in IPS mode displays.

Example 16

The liquid crystal composition p provided by the present invention is obtained by uniformly mixing various components in the following parts by weight:

subordinate to formula I8

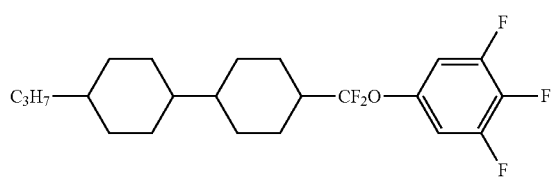

subordinate to formula I1

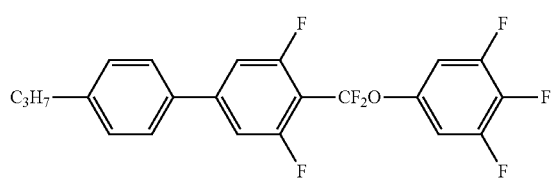

subordinate to formula I17

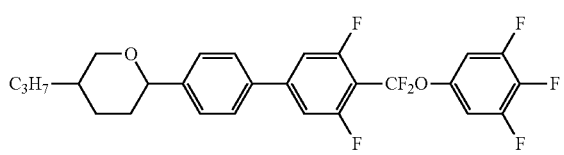

subordinate to formula I17

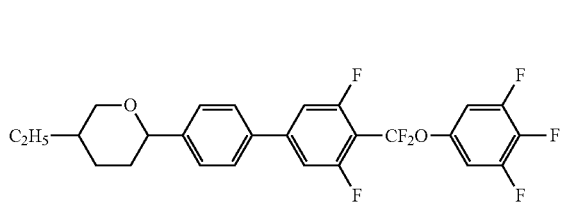

subordinate to formula I5

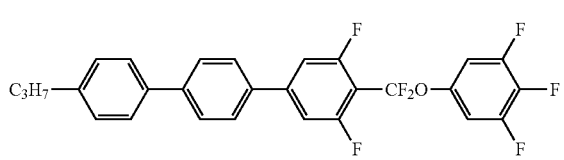

subordinate to formula II-11

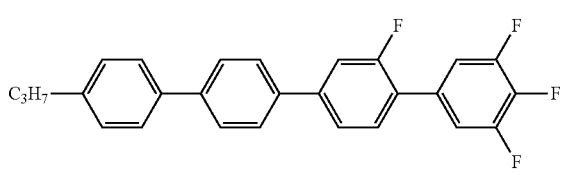

subordinate to formula II-5

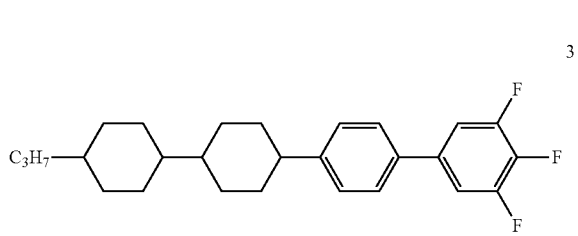

subordinate to formula II-1

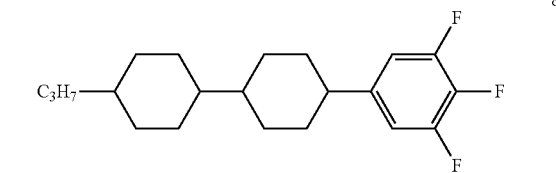

subordinate to formula III-4

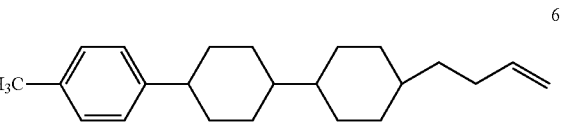

subordinate to formula III-3

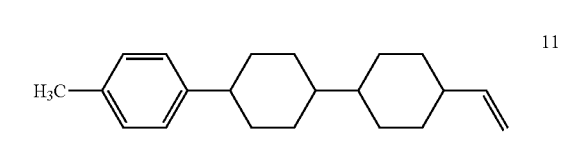 [SMILES: C=CC1CCC(C2CCC(c3ccc(C)cc3)CC2)CC1]

subordinate to formula III-1

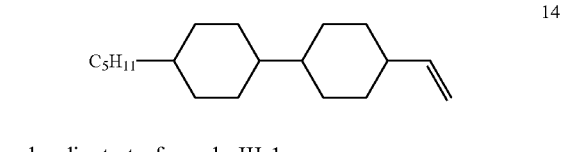

subordinate to formula III-1

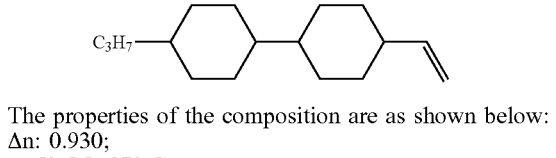

The properties of the composition are as shown below:
Δn: 0.930;
cp [° C.]: 87° C.;
Δε: 9.9;
Cr %: 0%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in IPS mode displays.

Example 17

The liquid crystal composition q provided by the present invention is obtained by uniformly mixing various components in the following parts by weight:

subordinate to formula I11    5

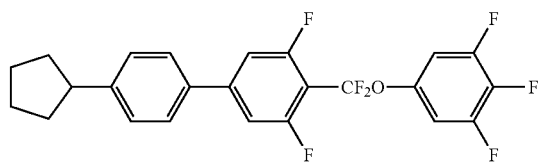

subordinate to formula I14    8

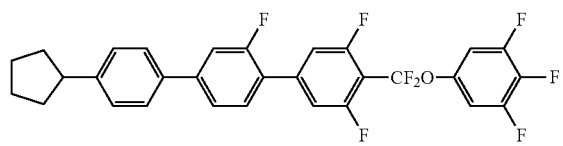

subordinate to formula II-3    7

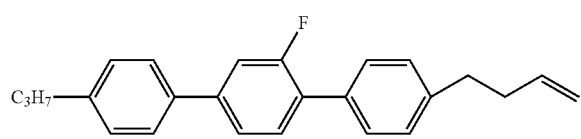

subordinate to formula II-3    4

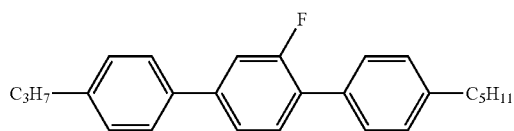

subordinate to formula III-4    11

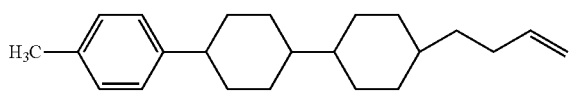

subordinate to formula III-3    4

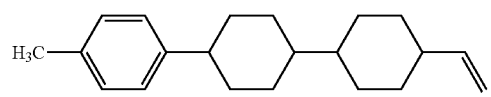

subordinate to formula III-2    11

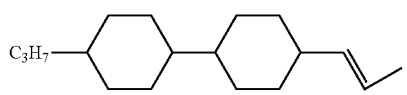    10 subordinate to formula III-1

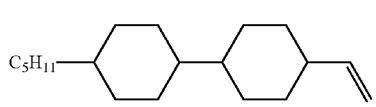    30 subordinate to formula III-1

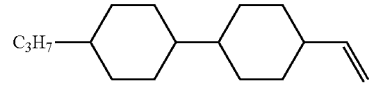    15

The properties of the composition are as shown below:
Δn: 0.101;
cp [° C.]: 83° C.;
Δε: 3.0;
Cr %: 12%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in IPS mode displays.

Example 18

The liquid crystal composition r provided by the present invention is obtained by uniformly mixing various components in the following parts by weight:

subordinate to formula I8    18

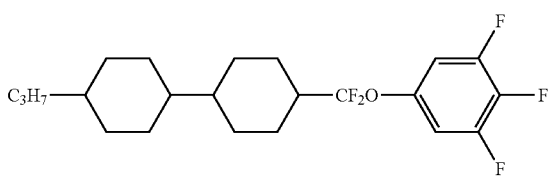

subordinate to formula I5    6

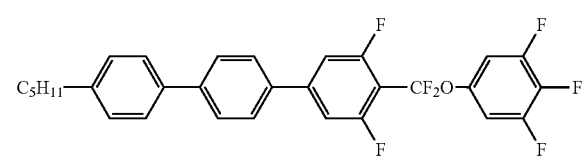

subordinate to formula I5

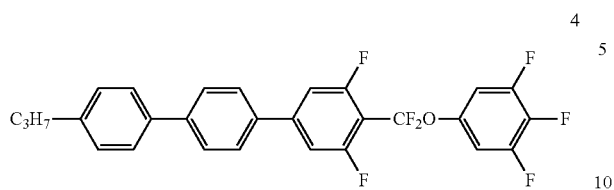

4 subordinate to formula I6

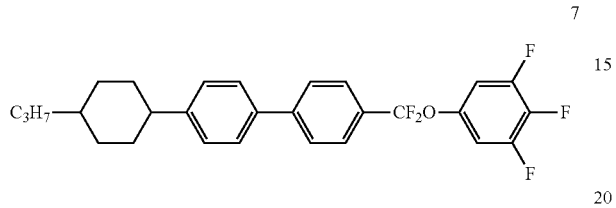

7 subordinate to formula I8

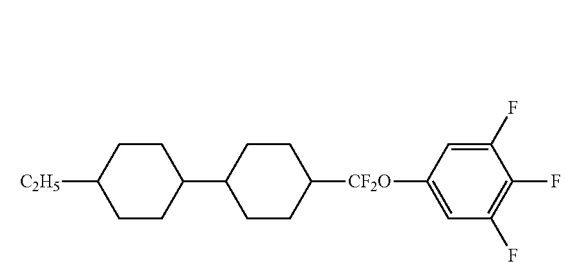

8 subordinate to formula I3

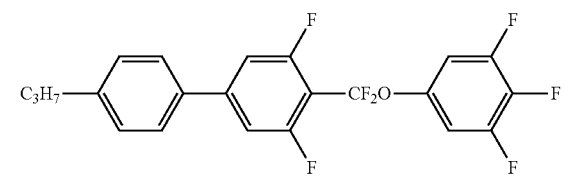

4 subordinate to formula II-13

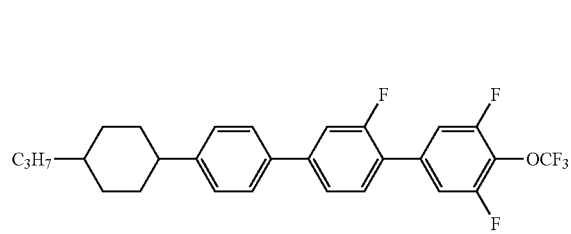

2 subordinate to formula I14

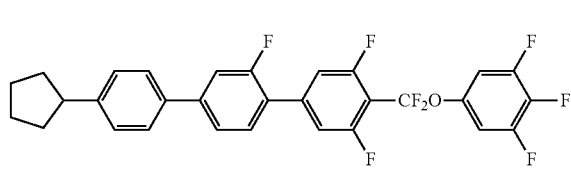

3 subordinate to formula III-1

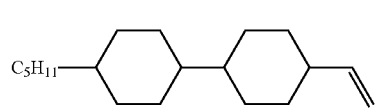

29 subordinate to formula I1

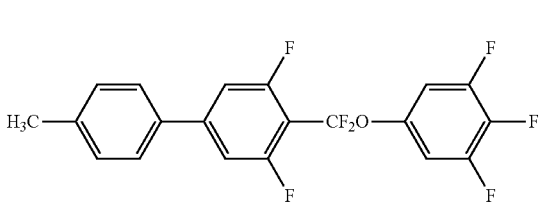

19

The properties of the composition are as shown below:
Δn: 0.122;
cp [° C.]: 72° C.;
Δε: 13.1;
Cr %: 5%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Example 19

The liquid crystal composition s provided by the present invention is obtained by uniformly mixing various components in the following parts by weight:

subordinate to formula I-1

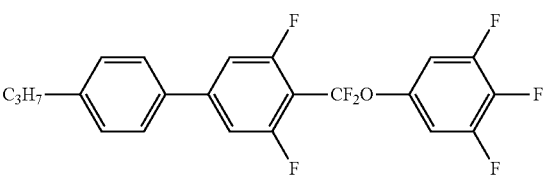

15 subordinate to formula I-1

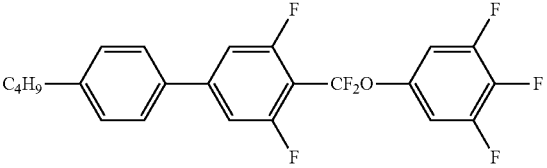

5 subordinate to formula I8

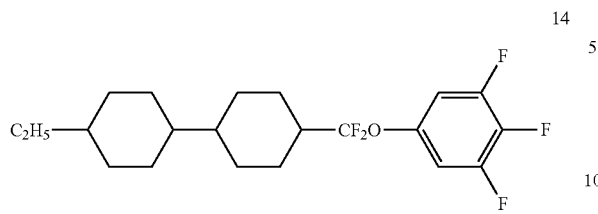

14 subordinate to formula II-1

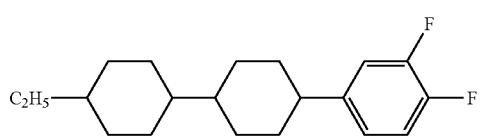

5 subordinate to formula II-1

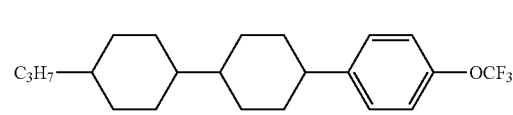

13 subordinate to formula II-1

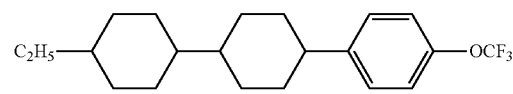

15 subordinate to formula II-4

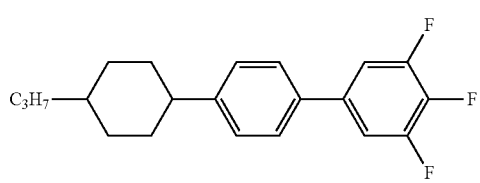

8 subordinate to formula II-4

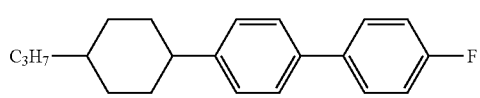

2 subordinate to formula II-4

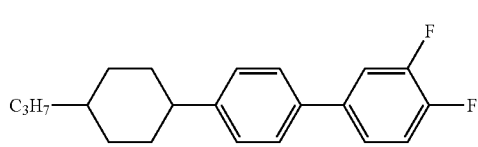

11 subordinate to formula II-3

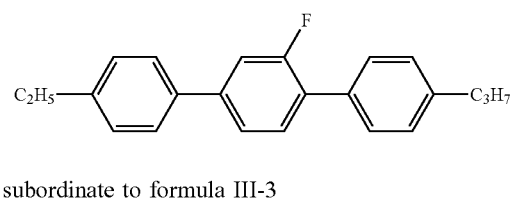

2 subordinate to formula III-3

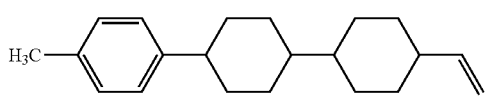

1 subordinate to formula III-1

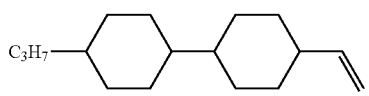

6 subordinate to formula V-6

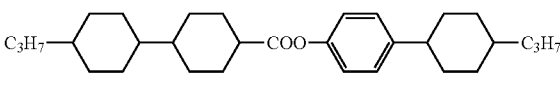

3

The properties of the composition are as shown below:
Δn: 0.110;
cp [° C.]: 90° C.;
Δε: 11.5;
$V_{10}$[v]: 1.49; and
Cr %: 9%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Example 20

The liquid crystal composition t provided by the present invention is obtained by uniformly mixing various components in the following parts by weight:
subordinate to formula I-1

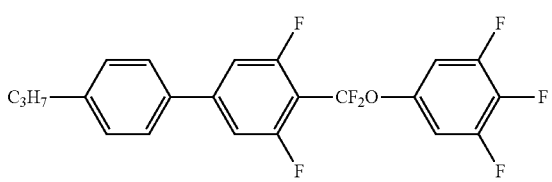

15 subordinate to formula I-36

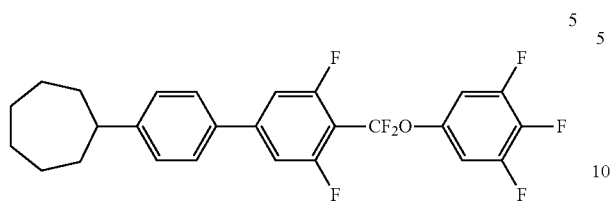

subordinate to formula I8

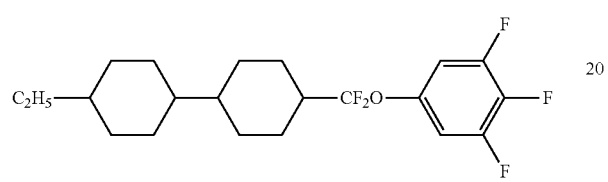

subordinate to formula II-1

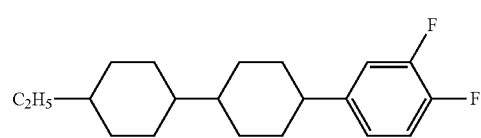

subordinate to formula II-1

subordinate to formula II-1

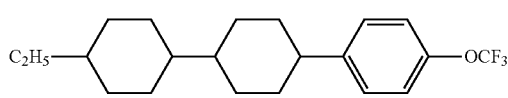

subordinate to formula II-4

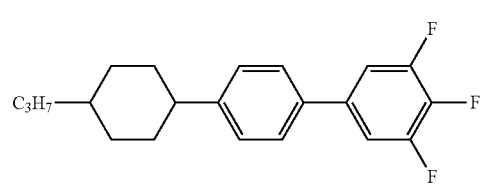

subordinate to formula II-4

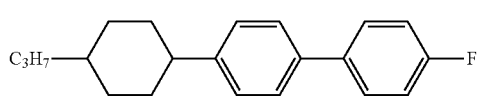

subordinate to formula II-4

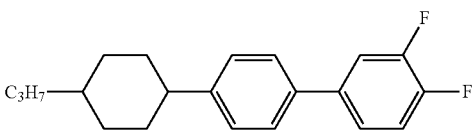

subordinate to formula I11

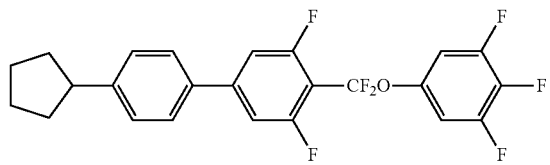

subordinate to formula III-1

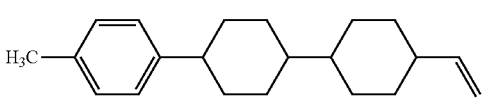

subordinate to formula III-1

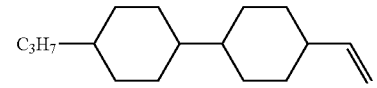

subordinate to formula I-14

The properties of the composition are as shown below:
Δn: 0.140;
cp [° C.]: 85° C.;
Δε: 12.5;
$V_{10}[v]$: 1.40; and
Cr %: 9%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Example 21

The liquid crystal composition u provided by the present invention is obtained by uniformly mixing various components in the following parts by weight:

subordinate to formula I1

12

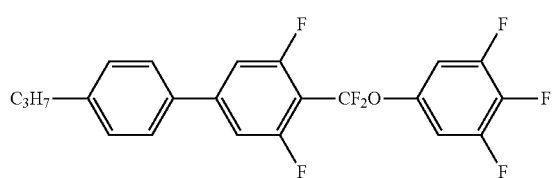

subordinate to formula II-4

9

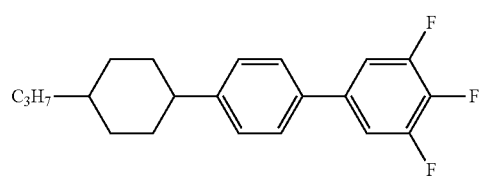

subordinate to formula II-4

8

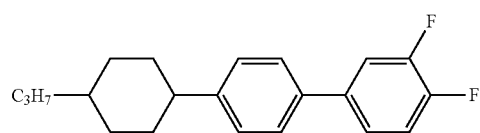

subordinate to formula II-1

13

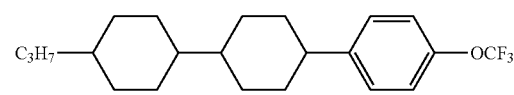

subordinate to formula II-1

15

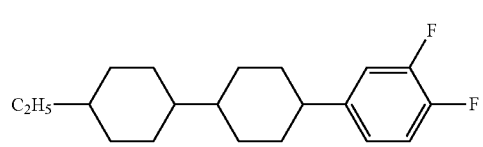

subordinate to formula II-1

11

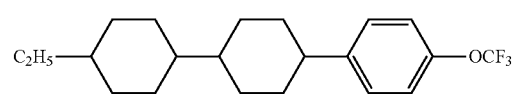

subordinate to formula II-5

9

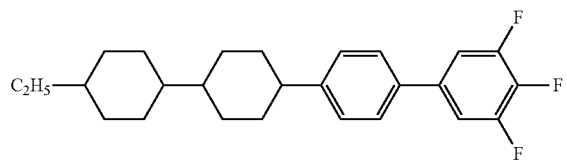

subordinate to formula III-1

23

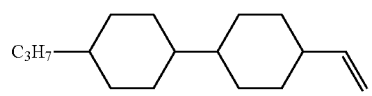

The properties of the composition are as shown below:
Δn: 0.094;
cp [° C.]: 83° C.;
Δε: 8.5;
$V_{10}$[v]: 1.51; and
Cr %: 9%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Comparative Example 9

In example 21,

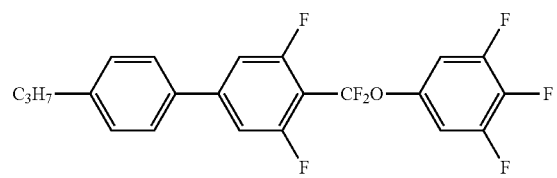

is replaced by the same percent by weight of and the other components are not changed to obtain a liquid crystal composition; and The properties of the composition are as shown below:
Δn: 0.103;
cp [° C.]: 88° C.;
Δε: 8.0;
$V_{10}[v]$: 1.61; and
Cr %: 35.

It can be seen from the above that the change rate of normal temperature-low temperature contrast ratio of this liquid crystal composition is poorer (namely, the change rate is larger), and therefore there is no advantage with regard to a TN mode display requiring a higher change rate of contrast ratio.

Example 22

The liquid crystal composition v provided by the present invention is obtained by uniformly mixing various components in the following parts by weight:

subordinate to formula I1    20

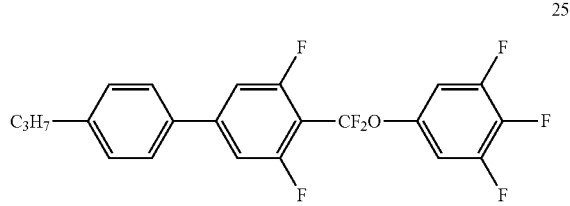

subordinate to formula I8

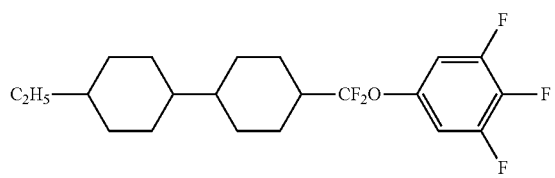

23 subordinate to formula I5

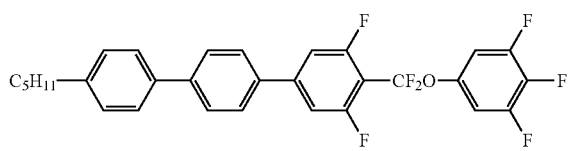

7 subordinate to formula II-4

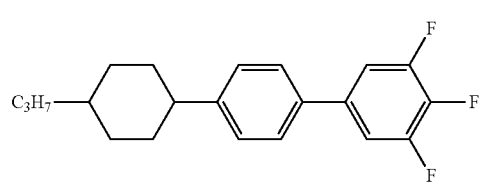

4 subordinate to formula II-4

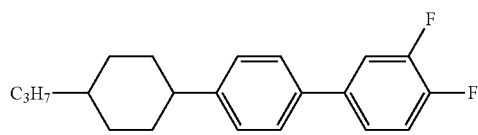

5 subordinate to formula II-1

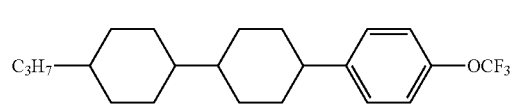

3 subordinate to formula III-1

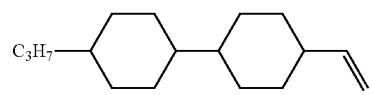

33

The properties of the composition are as shown below:
Δn: 0.093;
cp [° C.]: 54° C.;
Δε: 9.9;
$V_{10}[v]$: 1.1; and
Cr %: 7%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Comparative Example 10

In example 22,

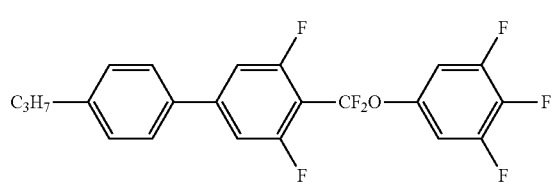

is replaced by the same percent by weight of

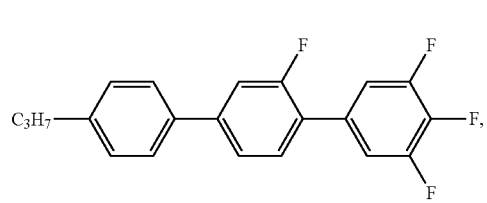

-continued

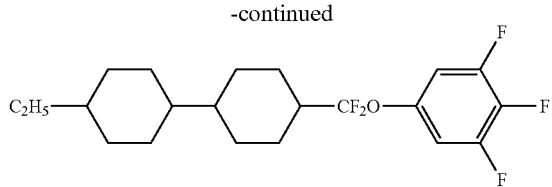

is replaced by the same percent by weight of

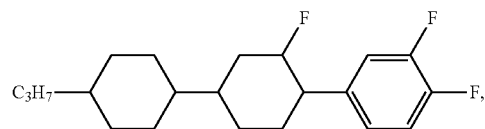

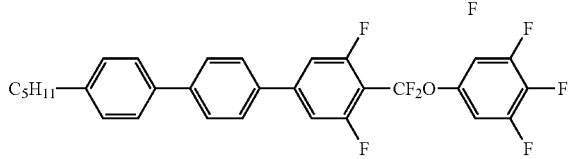

is replaced by the same percent by weight of

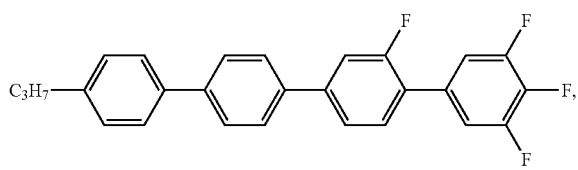

and the other components are not changed to obtain a liquid crystal composition; and
The properties of the composition are as shown below:
Δn: 0.115;
cp [° C.]: 65° C.;
Δε: 7.9;
$V_{10}$[v]: 1.4; and
Cr %: 31%.

It can be seen from the above that the change rate of normal temperature-low temperature contrast ratio of this liquid crystal composition is poorer (namely, the change rate is larger), and therefore there is no advantage with regard to a TN mode display requiring a higher change rate of contrast ratio.

Example 23

The liquid crystal composition w provided by the present invention is obtained by uniformly mixing various components in the following parts by weight:
subordinate to formula I1

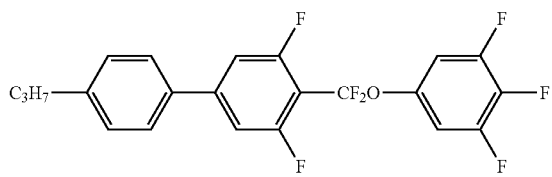

20 subordinate to formula I8

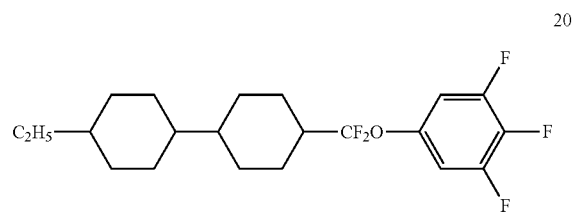

20 subordinate to formula II-4

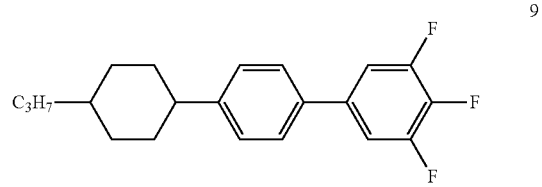

9 subordinate to formula II-4

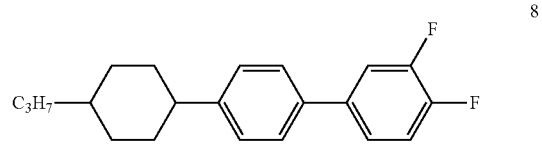

8 subordinate to formula II-1

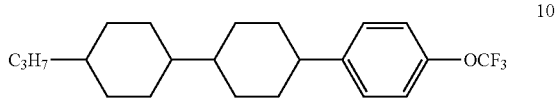

10 subordinate to formula III-1

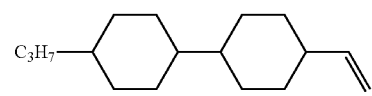

33

The properties of the composition are as shown below:
Δn: 0.088;
cp [° C.]: 59° C.;
Δε: 8.2;
$V_{10}$[v]: 1.4; and
Cr %: 31%.

It can be seen from the above that the liquid crystal composition has an advantageous refractive index, an appropriate dielectric constant, and a very good change rate of normal temperature-low temperature contrast ratio (namely, the change rate is smaller), and is very suitable for use in TN mode displays.

Comparative Example 11

In example 23,

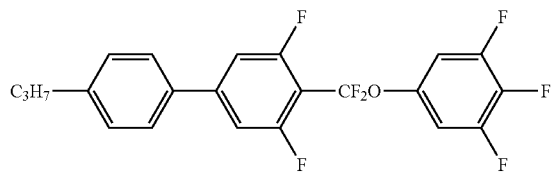

is replaced by the same percent by weight of

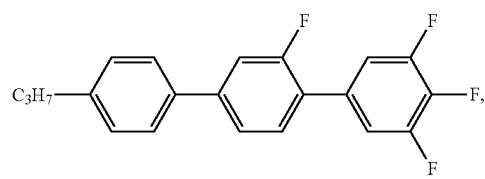

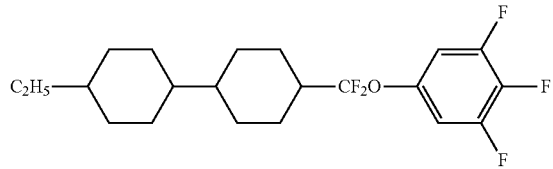

is replaced by the same percent by weight of

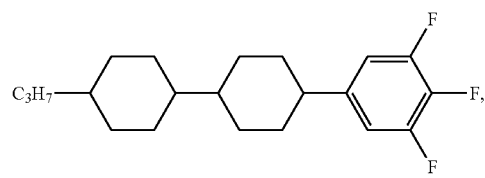

and the other components are not changed to obtain a liquid crystal composition; and The properties of the composition are as shown below:
Δn: 0.103;
cp [° C.]: 65° C.;
Δε: 6.0;
$V_{10}$[v]: 1.6; and
Cr %: 42%.

It can be seen from the above that the change rate of normal temperature-low temperature contrast ratio of this liquid crystal composition is poorer (namely, the change rate is larger), and therefore there is no advantage with regard to a TN mode display requiring a higher change rate of contrast ratio.

INDUSTRIAL APPLICATIONS

The liquid crystal composition provided by the present invention has a property of a high contrast ratio, and especially has a low change rate at a low temperature, that is, the decrease of contrast ratio at a low temperature (such as −20° C.) is smaller as compared to at normal temperature. Furthermore, the composition has suitable properties with regard to practical applications, such as a broader nematic phase range, an appropriate dielectric anisotropy (Δε), optical anisotropy (Δn) and operating voltage, an excellent response time, a high electrical resistivity and voltage holding ratio, a low rotary viscosity. By adjustment of the contents of the various components, the nematic phase liquid crystal compositions provided by the present invention may have various threshold voltages and birefringence properties, and can be manufactured as various systems commonly used for clients, for the convenience of use at different liquid crystal cell thicknesses and different driving voltages.

The invention claimed is:

1. A liquid crystal composition, comprising components A, B, and C;
   wherein said component A is selected from at least one of compounds of formula I;
   said component B is a liquid crystal compound having a dielectric anisotropy of greater than 3; and
   said component C is a liquid crystal compound having a dielectric anisotropy of −3 to 3;

Formula I

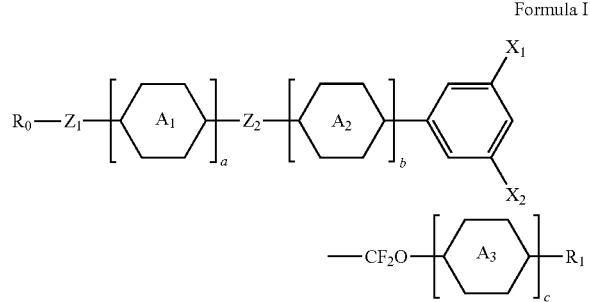

wherein in said formula I, $R_0$ is selected from any one of an H atom, C1-C10 alkyls, fluoro-substituted C1-C10 alkyls, C1-C10 alkoxys, fluoro-substituted C1-C10 alkoxys, C2-C10 alkenyls, fluoro-substituted C2-C10 alkenyls, C3-C8 alkenoxys, and fluoro-substituted C3-C8 alkenoxys;

wherein $R_1$ is
selected from H, Cl, F, —CN, —OCN, —OCF$_3$, —CF$_3$, —CHF$_2$, —CH$_2$F, —OCHF$_2$, —SCN, —NCS, —SF$_5$, C1-C15 alkyls, C1-C15 alkoxys, C2-C15 alkenyls, or C2-C15 alkenoxys;

wherein $X_1$ and $X_2$, which are identical or different, are each selected from either of atoms H and fluorine;

wherein $Z_1$ and $Z_2$, which are identical or different, are each selected from at least one of single bonds, —CH$_2$—CH$_2$—, —(CH$_2$)$_4$—, —CH=CH—, —C≡C—, —COO—, —OOC—, —CF$_2$O—, —OCH$_2$—, —CH$_2$O—, —OCF$_2$—, —CF$_2$CH$_2$—, —CH$_2$CF$_2$—, —C$_2$F$_4$—, and —CF=CF—;

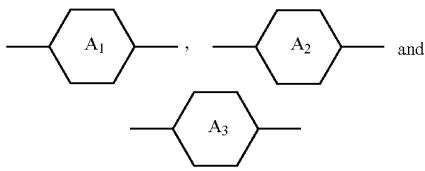

is each selected from at least one of single bonds, and the following groups:

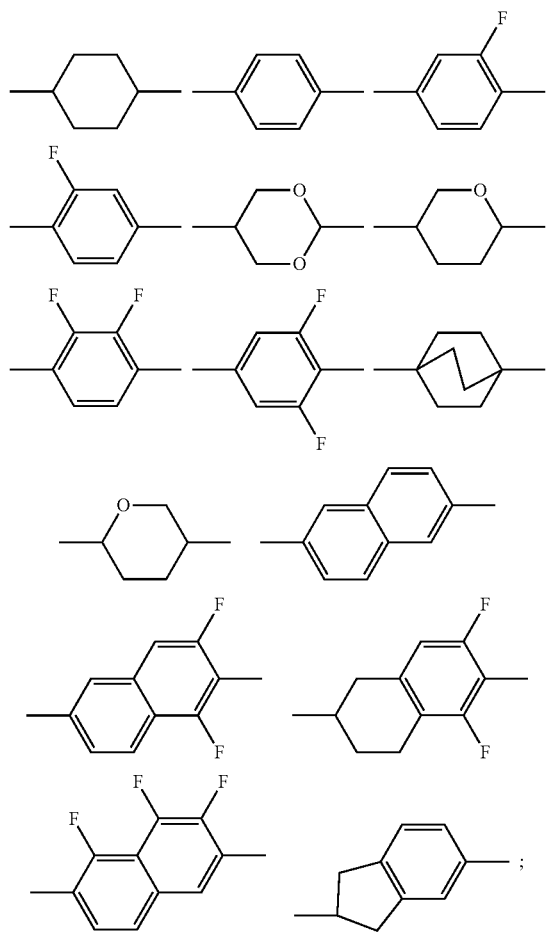

wherein both a and b are an integer selected from 0-3; and wherein c is 1 or 2, and a +b+c≤5.

2. The composition according to claim 1, wherein said liquid crystal composition is composed of components A, B, and C.

3. The composition according to claim 1, wherein a mass ratio of said components A, B, to C is 10-70:10-70:5-70.

4. The composition according to claim 1, wherein the compound as represented by formula I is any one of compounds as represented by I1-I10 and I17 as below:

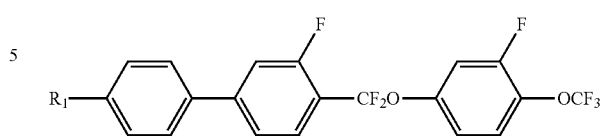

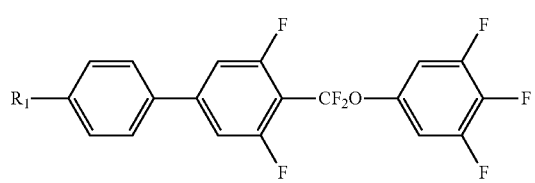

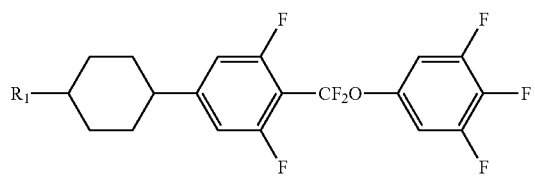

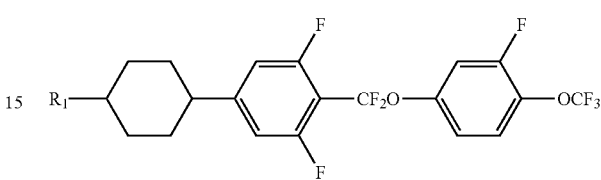

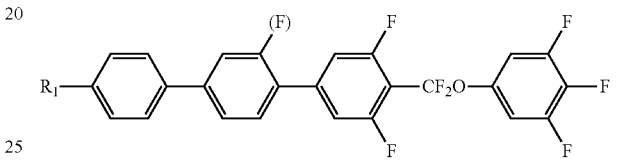

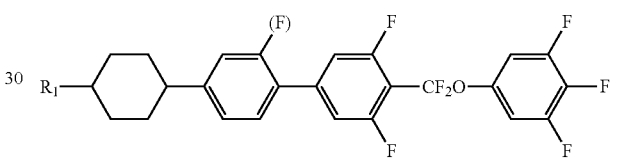

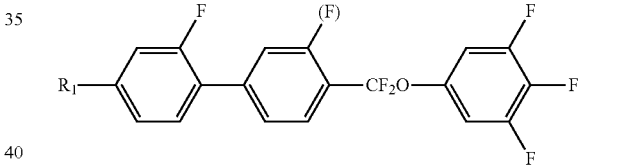

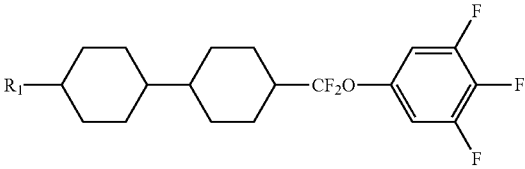

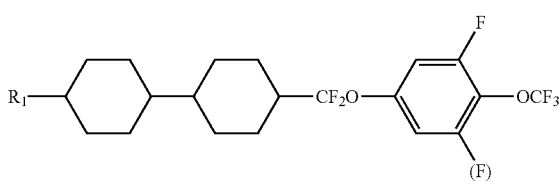

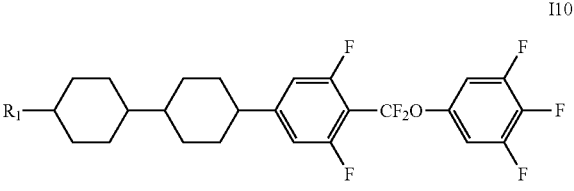

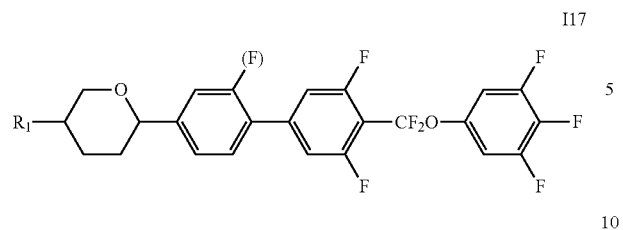
I17 wherein in said formulas I1-I10 and I17, the definition of R₁ is the same as that of the R₁ in the formula I in claim 1;

wherein in said formulas I1-I10 and I17, each —(F) represents —F or —H;

wherein said component B is selected from at least one of compounds as represented by formula II:

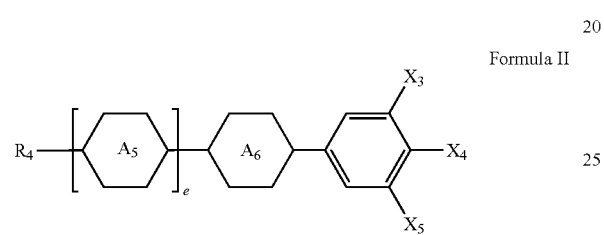
Formula II wherein in said formula II, the definition of R₄ is the same as that of the R₀ in formula I;

wherein the definitions of

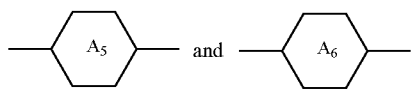

are the same as that of

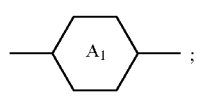

wherein the definitions of X₃ and X₅ are the same as that of the X₁ in said formula I;

wherein the definition of X₄ is the same as that of the R₁ in said formula I;

wherein e is an integer of 0-3;

wherein the compound as represented by the formula II is any one of compounds as represented by formulas II-1 to II-13 as below:

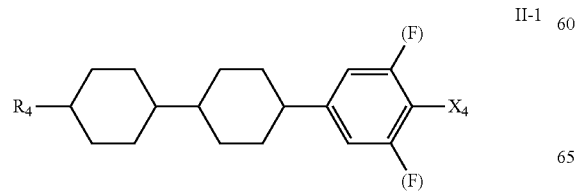
II-1

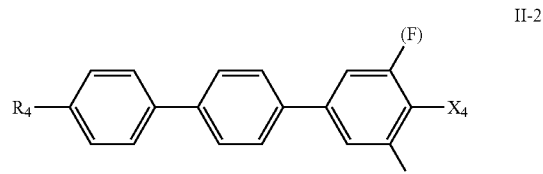
II-2

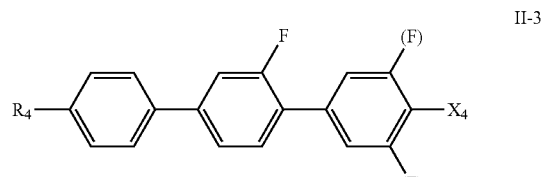
II-3

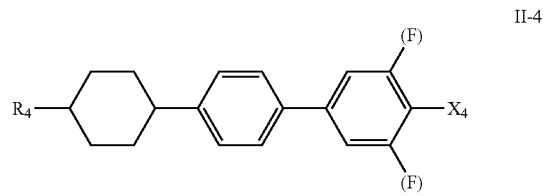
II-4

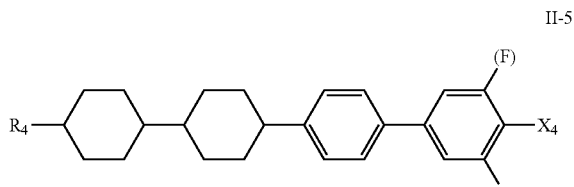
II-5

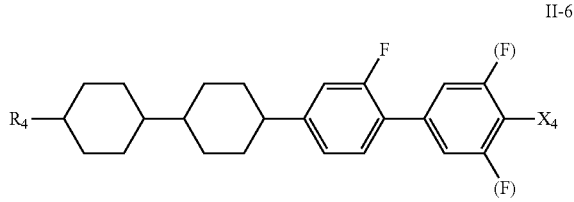
II-6

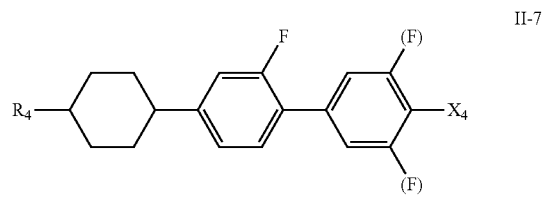
II-7

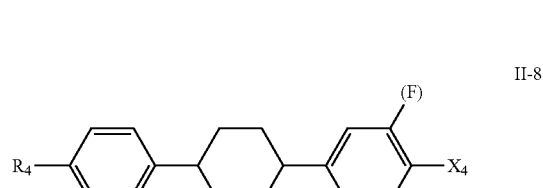
II-8

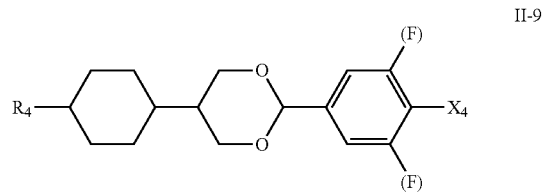
II-9

-continued

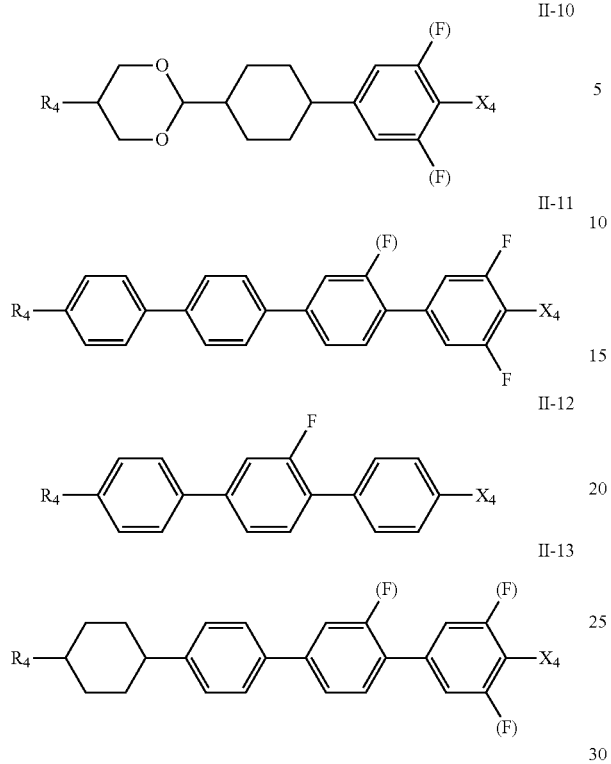

wherein in said formulas II-1 to II-13, the definitions of $R_4$ and $X_4$ are respectively the same as those of the $R_4$ and $X_4$ in said formula II;
wherein —(F) represents —F or —H;
wherein said component C is selected from at least one of compounds as represented by formula III:

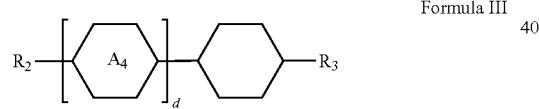

Formula III wherein in said formula III, the definitions of $R_2$ and $R_3$ are the same as that of the $R_0$ in the formula I in claim 1;
wherein the definition of

is the same as that of the

in the formula I in claim 1;
wherein d is an integer of 0-3;
wherein said compound as represented by the formula III is any one of compounds as represented by formulas III-1 to III-10 as below:

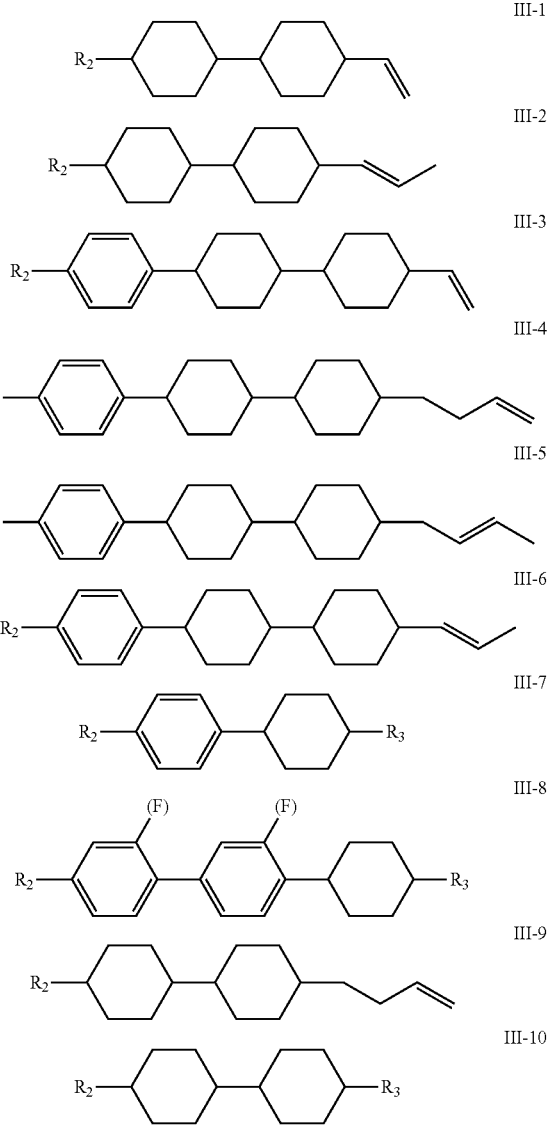

wherein in said formulas III-1 to III-10, the definitions of $R_2$ and $R_3$ are both the same as that of the $R_0$ in the formula I in claim 1;

wherein —(F) represents —F or —H.

5. The composition according to claim 1, wherein said liquid crystal composition further comprises at least one of compounds as represented by formulas IV and V;

Formula IV

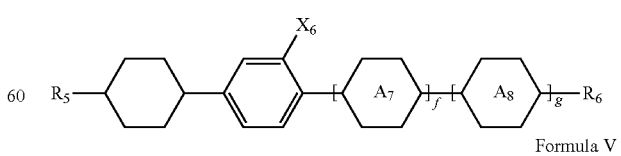

Formula V

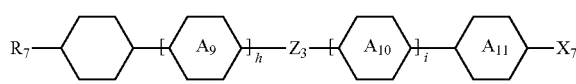

wherein in said formulas IV and V, the definitions of $R_5$ and $R_6$ are the same as that of the $R_0$ in the formula I in claim 1;

wherein the definition of $R_7$ is the same as that of the $R_1$ in the formula I in claim 1;

wherein the definitions of

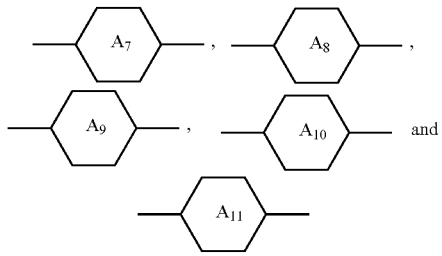

are the same as that of the

in the formula I in claim 1;

wherein $Z_3$ is selected from any least one of —CH$_2$—CH$_2$—, —CH=CH—, —C≡C—, —COO—, —OOC—, —OCH$_2$—, —CH$_2$O—, —CF$_2$CH$_2$—, —CH$_2$CF$_2$—, —C$_2$F$_4$—, and —CF=CF—;

wherein the definition of $X_6$ is the same as that of the $X_1$ in the formula I in claim 1;

wherein the definition of $X_7$ is the same as that of the $X_4$ in the formula I in claim 4; and wherein f, g, h, and i are all integers of 0-3.

6. The composition according to claim 5, wherein a mass ratio of said compound as represented by the formula IV to said compound as represented by the formula V is 0-30:0-40;

wherein a mass ratio of said compound as represented by the formula IV to said compound as represented by the formula III is 0-30:5-70;

and wherein neither a mass of the compound as represented by formula IV nor that of the compound as represented by formula V is 0.

7. The composition according to claim 5, wherein said compound as represented by the formula IV is any one of compounds as represented by formulas IV-1 to IV-5 as below:

IV-1

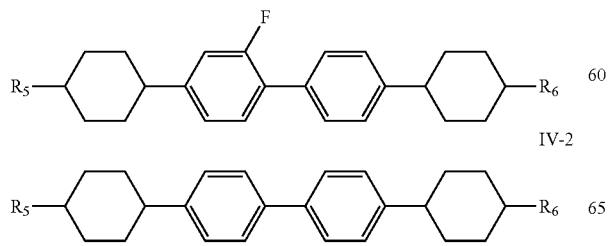

IV-2

IV-3

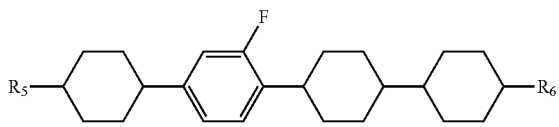

IV-4

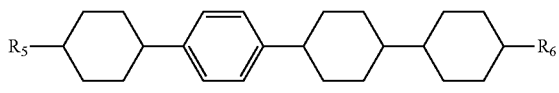

IV-5

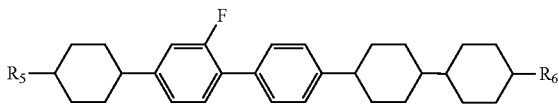

wherein in said formulas IV-1 to IV-5, the definitions of $R_5$ and $R_6$ are both the same as that of the $R_0$ in the formula I in claim 1;

wherein —(F) represents —F or —H;

wherein said compound as represented by the formula V is any one of compounds as represented by formulas V-1 to V-17 as below:

V-1

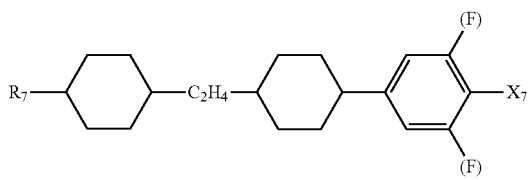

V-2

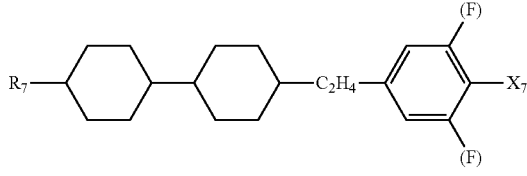

V-3

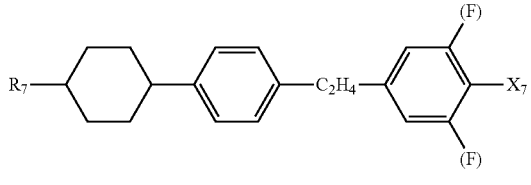

V-4

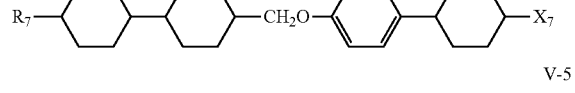

V-5

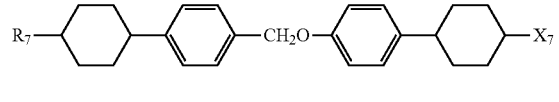

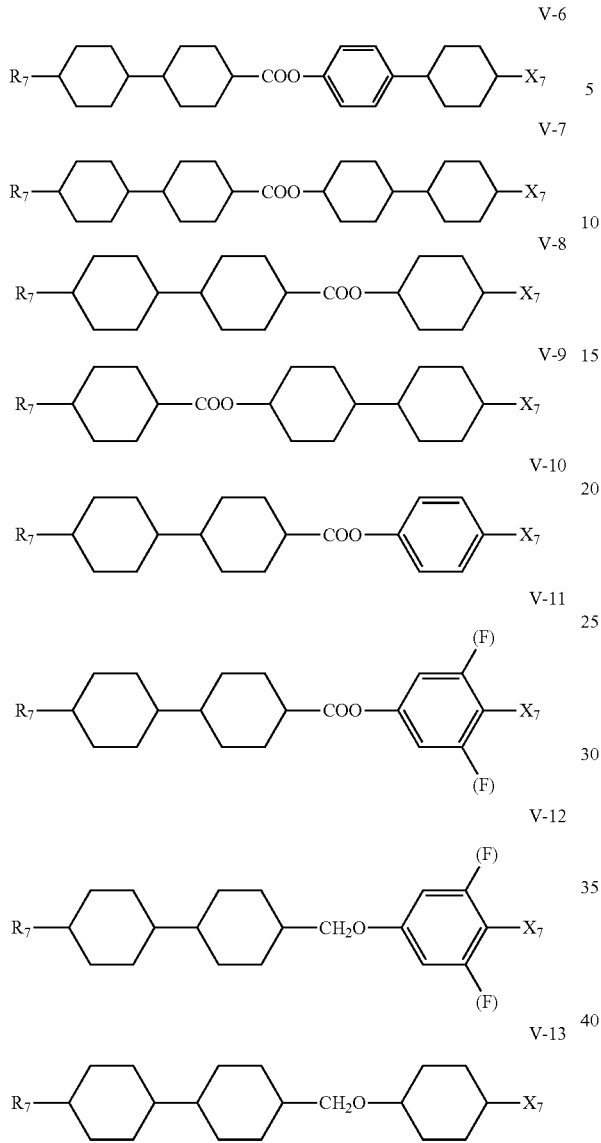
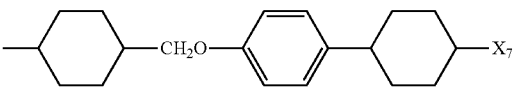
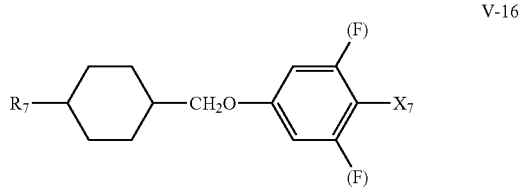
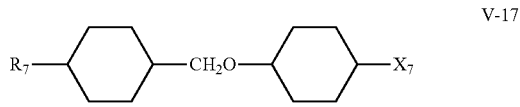

wherein in said formulas V-1 to V-17, the definition of $R_7$ is the same as that of the $R_1$ in the formula I in claim 1; and wherein —(F) represents —F or —H.

8. A liquid crystal display element or liquid crystal display comprising a liquid crystal composition, comprising components A, B, and C;

wherein said component A is selected from at least one of compounds of formula I;

said component B is a liquid crystal compound having a dielectric anisotropy of greater than 3; and said component C is a liquid crystal compound having a dielectric anisotropy of −3 to 3;

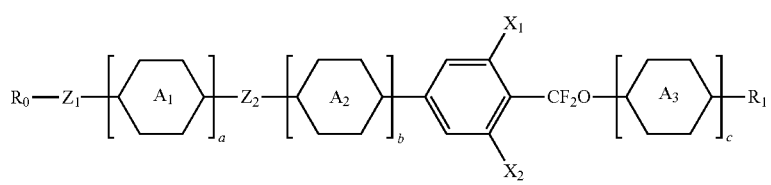

wherein in said formula I, $R_0$ is selected from any one of an H atom, C1-C10 alkyls, fluoro-substituted C1-C10 alkyls, C1-C10 alkoxys, fluoro-substituted C1-C10 alkoxys, C2-C10 alkenyls, fluoro-substituted C2-C10 alkenyls, C3-C8 alkenoxys, and fluoro-substituted C3-C8 alkenoxys;

wherein $R_1$ is selected from H, Cl, F, —CN, —OCN, —OCF$_3$, —CF$_3$, —CHF$_2$, —CH$_2$F, —OCHF$_2$, —SCN, —NCS, —SF$_5$, C1-C15 alkyls, C1-C15 alkoxys, C2-C15 alkenyls, or C2-C15 alkenoxys;

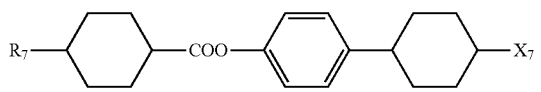

wherein $X_1$ and $X_2$, which are identical or different, are each selected from either of atoms H and fluorine;

wherein $Z_1$ and $Z_2$, which are identical or different, are each selected from at least one of single bonds, —$CH_2$—$CH_2$—, —$(CH_2)_4$—, —CH=CH—, —C≡C—, —COO—, —OOC—, —$CF_2$O—, —O$CH_2$—, —$CH_2$O—, —O$CF_2$—, —$CF_2CH_2$—, —$CH_2CF_2$—, —$C_2F_4$—, and —CF=CF—;

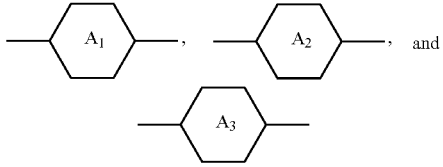

is each selected from at least one of single bonds, and the following groups:

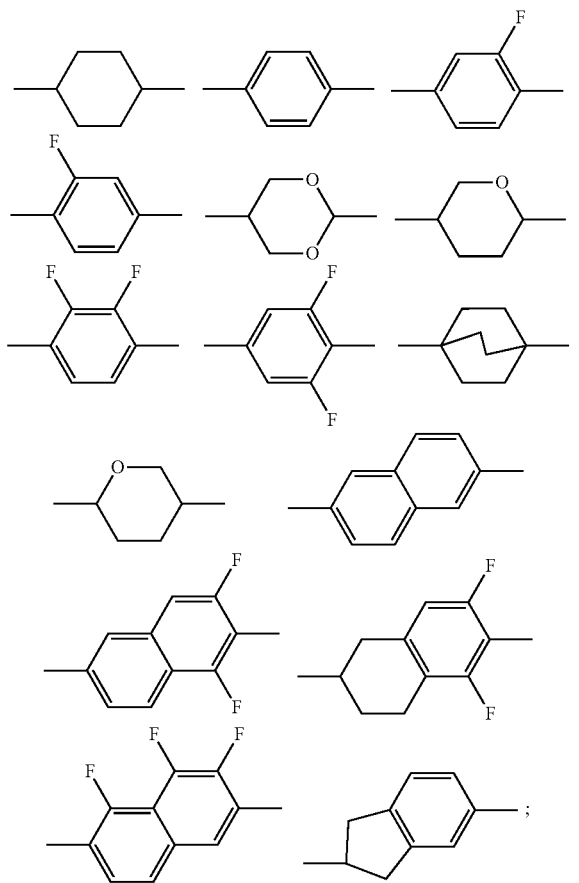

wherein both a and b are an integer selected from 0-3; and c is 1 or 2, and a+b+c≤5, wherein the liquid crystal display element or liquid crystal display is an active matrix display element or display or a passive matrix display element or display.

9. The liquid crystal display element or liquid crystal display according to claim 8, wherein the liquid crystal display element or liquid crystal display is an active matrix liquid crystal display element or display.

10. The liquid crystal display element or liquid crystal display according to claim 8, wherein the active matrix display element or display is a TN-TFT or IPS-TFT liquid crystal display element or display.

11. The composition according to claim 4, wherein said liquid crystal composition further comprises at least one of compounds as represented by formulas IV and V;

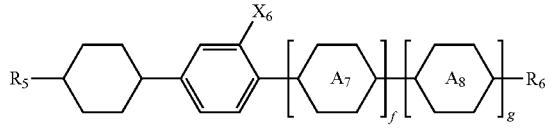

Formula IV

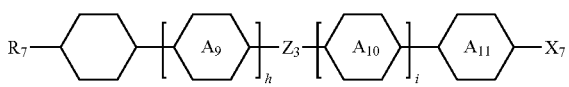

Formula V wherein in said formulas IV and V, the definitions of $R_5$ and $R_6$ are the same as that of the $R_0$ in the formula I in claim 1;

wherein the definition of $R_7$ is the same as that of the $R_1$ in the formula I in claim 1;

wherein the definitions of

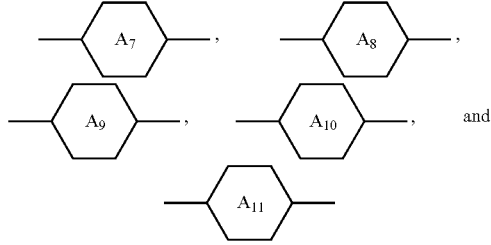

are the same as that of the

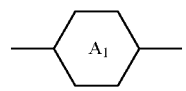

in the formula I in claim 1;

wherein $Z_3$ is selected from any least one of —$CH_2$—$CH_2$—, —CH=CH—, —C≡C—, —COO—, —OOC—, —O$CH_2$—, —$CH_2$O—, —$CF_2CH_2$—, —$CH_2CF_2$—, —$C_2F_4$—, and —CF=CF—;

wherein the definition of $X_6$ is the same as that of the $X_1$ in the formula I in claim 1;

wherein the definition of $X_7$ is the same as that of the $X_4$ in the formula I in claim 4; and wherein f, g, h, and i are all integers of 0-3.

12. The composition according to claim 11, wherein said liquid crystal composition is composed of compounds as represented by formulas I to V, and wherein the compounds represented by formulas I to V are in a mass ratio of 10-70:10-70:5-70:0-30:0-40, wherein neither a mass of the compound as represented by formula IV nor that of the compound as represented by formula V is 0.

13. The composition of claim 1, wherein when $R_1$ is C1-C15 alkyl, C1-C15 alkoxy, C2-C15 alkenyl, —$CH_2$F—, or C2-C15 alkenoxy, at least one —$CH_2$— is —CH=CH—, —C≡C—, —COO—, —OOC—, cyclobutyl, cyclopentyl, —O—, or S; and wherein when at least one —$CH_2$— is —CH=CH—, —C≡C—, —COO—, —OOC—, cyclobutyl, cyclopentyl, —O—, or S, oxygen atoms are not directly connected.

14. The composition of claim 1, wherein when $R_1$ is —$CHF_2$, —$CH_2F$, —$OCHF_2$—, C1-C15 alkyls, C1-C15 alkoxys, C2-C15 alkenyls, or C2-C15 alkenoxys, at least one hydrogen of $R_1$ is substituted with fluorine or chlorine.

15. The liquid crystal display element or liquid crystal display comprising a liquid crystal composition of claim 8, wherein when $R_1$ is C1-C15 alkyl, C1-C15 alkoxy, C2-C15 alkenyl, —$CH_2F$—, or C2-C15 alkenoxy, at least one —$CH_2$— is —CH=CH—, —C≡C—, —COO—, —OOC—, cyclobutyl, cyclopentyl, —O—, or —S; and wherein when at least one —$CH_2$— is —CH=CH—, —C≡C—, —COO—, —OOC—, cyclobutyl, cyclopentyl, —O—, or —S, oxygen atoms are not directly connected.

16. The liquid crystal display element or liquid crystal display comprising a liquid crystal composition of claim 8, wherein when $R_1$ is —$CHF_2$, —$CH_2F$, —$OCHF_2$, C1-C15 alkyls, C1-C15 alkoxys, C2-C15 alkenyls, or C2-C15 alkenoxys, at least one hydrogen of $R_1$ is substituted with fluorine or chlorine.

* * * * *